US011151508B2

(12) United States Patent
Fallgren et al.

(10) Patent No.: US 11,151,508 B2
(45) Date of Patent: Oct. 19, 2021

(54) GROCERY TRANSPORT PACKAGING SYSTEM

(71) Applicant: IFOODBAG AB, Täby (SE)

(72) Inventors: Carl Fallgren, Täby (SE); Magnus Gimåker, Huddinge (SE)

(73) Assignee: IFOODBAG AB, Täby (SE)

( * ) Notice: Subject to any disclaimer, the term of this patent is extended or adjusted under 35 U.S.C. 154(b) by 0 days.

(21) Appl. No.: 15/309,778

(22) PCT Filed: May 8, 2015

(86) PCT No.: PCT/SE2015/000026
§ 371 (c)(1),
(2) Date: Nov. 8, 2016

(87) PCT Pub. No.: WO2015/171036
PCT Pub. Date: Nov. 12, 2015

(65) Prior Publication Data
US 2018/0253686 A1     Sep. 6, 2018

(30) Foreign Application Priority Data

May 8, 2014 (SE) .................................. 1400233-1
Oct. 7, 2014 (SE) .................................. 1451187-7

(51) Int. Cl.
*G06Q 10/08*      (2012.01)
*B65D 30/18*      (2006.01)
(Continued)

(52) U.S. Cl.
CPC ......... *G06Q 10/0832* (2013.01); *B65D 31/08* (2013.01); *B65D 31/10* (2013.01);
(Continued)

(58) Field of Classification Search
CPC .......... H04N 21/2187; H04N 21/6125; H04W 24/10; H04W 24/02; B81B 2201/0257;
(Continued)

(56) References Cited

U.S. PATENT DOCUMENTS 2,447,964 A    8/1948   Slindee
2,784,890 A    3/1957   Chisholm
(Continued)

FOREIGN PATENT DOCUMENTS

CN        1146240 A    3/1997
CN        1225064 A    8/1999
(Continued)

OTHER PUBLICATIONS

Orzolek, Michael D. et al., "Broccoli Production", Penn State Extension, https://extension.psu.edu/broccoli-production, printable version retrieved from https://extension.psu.edu/downloadable/download/sample/sample_id/46/, Jun. 20, 2005, retrieved Feb. 7, 2019 (Year: 2005).*

(Continued)

*Primary Examiner* — George Chen
(74) *Attorney, Agent, or Firm* — Moore & Van Allen PLLC; Henry B. Ward, III

(57) ABSTRACT

A grocery transport system comprising a storage facility (600) for goods; the storage facility comprising one or several storage rooms having a controlled environment in that the temperature and the relative humidity of the air in the storage room is controlled so that it is kept within certain predetermined ranges; wherein the goods comprises a plurality of different types of goods sorted into different temperature ranges (TI, TII, TIll, TIV), each type of goods being stored in a corresponding storage room ($650_{TI}$, $650_{TII}$, $650_{TIII}$, $650_{TIV}$) having a temperature in accordance with the corresponding goods temperature range (TI, TII, TIll, TIV);

(Continued)

a loading facility for enabling chilled or frozen goods is to be packed into closable and sealable containers (20); said loading facility comprising a plurality of said closable and sealable containers (20) for use in the distribution of said chilled or frozen goods in an air atmosphere environment; a delivery vehicle for transporting said closable and sealable containers (20), when loaded with a predetermined amount of chilled or frozen goods, to a delivery destination.

20 Claims, 32 Drawing Sheets

(51) Int. Cl.
*B65D 30/20* (2006.01)
*B65D 33/10* (2006.01)
*B65D 33/25* (2006.01)
*B65D 81/38* (2006.01)
*G06Q 50/28* (2012.01)

(52) U.S. Cl.
CPC ....... *B65D 33/105* (2013.01); *B65D 33/2591* (2013.01); *B65D 81/3823* (2013.01); *B65D 81/3897* (2013.01); *G06Q 50/28* (2013.01)

(58) Field of Classification Search
CPC . B81B 3/0083; B81B 3/0089; G06F 11/3013; G06F 11/302; G06F 11/3409; G06F 11/3466; G06F 17/30817; G06F 17/30867; G06F 21/6245; G06F 21/83; G06F 2221/031; G06F 3/0482; G06F 8/443; G06F 9/542; G06Q 30/02; G06Q 30/0611; G06Q 30/08; H04Q 11/0005; H04Q 2011/0009; H04Q 2011/0016; H04Q 2209/823; H04Q 9/00
See application file for complete search history.

(56) References Cited

U.S. PATENT DOCUMENTS

| | | | |
|---|---|---|---|
| 2,985,355 A | 5/1961 | Read | |
| 3,568,918 A | 3/1971 | Blomqvist | |
| 4,243,171 A | 1/1981 | Prin | |
| 5,167,894 A | 12/1992 | Baumgarten | |
| 5,328,266 A | 7/1994 | Davis | |
| 5,401,102 A | 3/1995 | Faltynek et al. | |
| 5,544,473 A | 8/1996 | Maida et al. | |
| 5,609,293 A | 3/1997 | Wu et al. | |
| 5,735,548 A | 4/1998 | Anderson | |
| 6,030,673 A * | 2/2000 | Andersen | B29C 55/18 428/36.4 |
| 6,721,624 B2 * | 4/2004 | Ostro | B65D 19/38 186/40 |
| 8,247,046 B2 * | 8/2012 | Adams | B32B 27/10 428/34.2 |
| 2002/0004724 A1 | 1/2002 | Eastman | |
| 2003/0232112 A1 | 12/2003 | Whitmore et al. | |
| 2004/0120611 A1 | 6/2004 | Kannankeril et al. | |
| 2004/0209024 A1 | 10/2004 | Finestone et al. | |
| 2006/0091139 A1 | 5/2006 | Grogan et al. | |
| 2007/0084142 A1 | 4/2007 | Matthews | |
| 2007/0087087 A1 | 4/2007 | Kuo et al. | |
| 2009/0076645 A1 * | 3/2009 | Ben-Tzur | A23B 7/00 700/213 |
| 2010/0310195 A1 | 12/2010 | Miller et al. | |
| 2011/0052106 A1 | 3/2011 | Holmes et al. | |
| 2011/0069911 A1 | 3/2011 | Ackerman et al. | |
| 2012/0158606 A1 | 6/2012 | Moudy | |
| 2012/0243808 A1 * | 9/2012 | de Lesseux | B65D 5/60 383/110 |
| 2013/0022714 A1 | 1/2013 | Coderre | |
| 2013/0129261 A1 * | 5/2013 | Jones | B65D 33/2591 383/25 |
| 2013/0236128 A1 | 9/2013 | Bray | |
| 2013/0315507 A1 | 11/2013 | Teixido Vidal et al. | |
| 2014/0270581 A1 * | 9/2014 | Jons | B65D 33/25 383/37 |
| 2014/0294322 A1 | 10/2014 | Truslow et al. | |

FOREIGN PATENT DOCUMENTS

| | | |
|---|---|---|
| CN | 2780660 Y | 5/2006 |
| CN | 102047276 A | 5/2011 |
| CN | 202030130 U | 11/2011 |
| CN | 102514817 A | 6/2012 |
| DE | 7334448 U | 12/1973 |
| DE | 2853061 A1 | 6/1980 |
| DE | 8132891 U1 | 6/1982 |
| DE | 3144702 A1 | 5/1983 |
| DE | 8904678 U1 | 6/1989 |
| DE | 102007037397 A1 | 8/2008 |
| EP | 0105052 A1 | 4/1984 |
| EP | 0709300 A1 | 5/1996 |
| EP | 0721395 B1 | 6/1998 |
| EP | 1094944 B1 | 9/2004 |
| EP | 2368706 A1 | 9/2011 |
| EP | 2602208 A1 | 6/2013 |
| FR | 2847234 A1 | 5/2004 |
| GB | 140966 A | 4/1929 |
| GB | 449656 A | 7/1936 |
| GB | 632705 A | 12/1949 |
| GB | 1013656 A | 12/1965 |
| GB | 1333661 A | 10/1973 |
| GB | 1373428 A | 11/1974 |
| GB | 2264074 A | 8/1993 |
| GB | 2316669 A | 3/1998 |
| TW | 1304044 B | 12/2008 |
| WO | 8810214 A1 | 12/1988 |
| WO | 9426621 A1 | 11/1994 |
| WO | 9615954 A1 | 5/1996 |
| WO | 2006010732 A1 | 2/2006 |
| WO | 2010018306 A1 | 2/2010 |
| WO | 2010018307 A1 | 2/2010 |
| WO | 2014187582 A1 | 11/2014 |
| WO | 2015147776 A1 | 10/2015 |
| WO | 2015171034 A1 | 11/2015 |
| WO | 2015183973 A1 | 12/2015 |

OTHER PUBLICATIONS

Klinklow, Nattida, et al. "Development of a Kraft Paper Box Lined with Thermal-Insulating Materials by Utilizing Natural Wastes." Key Engineering Materials. vol. 545. Trans Tech Publications Ltd, 2013, https://www.scientific.net/KEM.545.82.pdf (Year: 2013).*
International Search Report for International Patent Application No. PCT/SE2015/000026 dated Nov. 16, 2015.
Written Opinion for International Patent Application No. PCT/SE2015/000026 dated Nov. 16, 2015.
International Preliminary Report on Patentability for International Patent Application No. PCT/SE2015/000026 dated Oct. 10, 2016.
XP55292957A BL—Kraft paper retrieved from "https://en.wikipedia.org/w/index.php?title=Kraft_paper&oldid=730901444".
International Search Report for corresponding International Patent Application No. PCT/SE2015/000026 dated Nov. 16, 2015.
Written Opinion of the International Preliminary Examining Authority for corresponding International Patent Application No. PCT/SE2015/000026 dated Jun. 8, 2018.
Written Opinion of the International Searching Authority for corresponding International Patent Application No. PCT/SE2015/000026 dated Nov. 16, 2015.
Internatonal Preliminary Report on Patentability for corresponding International Patent Application No. PCT/SE2015/000026 dated Nov. 16, 2015.
Communication Relating to the Results of the Partial International Search for corresponding International Patent Application No. PCT/SE2015/000026.

(56) References Cited

OTHER PUBLICATIONS

International Search Report for related International Patent Application No. PCT/SE2016/050410 dated Jul. 20, 2016.
Written Opinion of the International Searching Authority for related International Patent Application No. PCT/SE2016/050410 dated Jul. 20, 2016.
International Search Report for related International Patent Application No. PCT/SE2016/000064 dated Jul. 7, 2017.
Written Opinion of the International Searching Authority for related International Patent Application No. PCT/SE2016/000064 dated Jul. 7, 2017.
International Search Report for related International Patent Application No. PCT/SE2016/050409 dated Jul. 20, 2016.
Written Opinion of the International Searching Authority for related International Patent Application No. PCT/SE2016/050409 dated Jul. 20, 2016.
International Search Report for related International Patent Application No. PCT/SE2015/000024 dated Aug. 14, 2015.
Written Opinion of the International Preliminary Examining Authority for related International Patent Application No. PCT/SE2015/000024 dated May 23, 2016.
Written Opinion of the International Searching Authority for related International Patent Application No. PCT/SE2015/000024 dated Aug. 14, 2015.
International Preliminary Report on Patentability for related International Patent Application No. PCT/SE2015/000024 dated Sep. 7, 2016.
Swedish Office Action issued for related Swedish Patent Application No. 1400232-3 dated Jan. 9, 2015.
First Office Action, together with a Search Report, issued by the State Intellectual Property Office of China for corresponding Chinese Patent Application No. 201580023911.9 dated May 11, 2018 (English language translation attached).
Chinese Office Action issued for Chinese Application Serial No. 2016800781126 dated Dec. 17, 2019.
European Search Report issued by the European Patent Office for Patent Application No. EP20171876.4 dated Oct. 8, 2020.
Extended European Search Report issued by the European Patent Office for Application No. 19165296.5, dated Nov. 11, 2019.
Office Action issued by the Chinese Patent Office for Chinese Application No. 2019108831330, dated Jan. 5, 2021.
Search Report issued by the Chinese Patent Office for Chinese Application No. 2019108831330. The Search Report was completed on Dec. 25, 2020, and issued with the Office Action issued by the Chinese Patent Office for Chinese Application No. 2019108831330, dated Jan. 5, 2021.
Non-Final Office Action issued for U.S. Appl. No. 15/774,232 dated Jul. 10, 2020.
Office Action issued by the United States Patent and Trademark Office for U.S. Appl. No. 15/774,232, dated Apr. 19, 2021.

\* cited by examiner

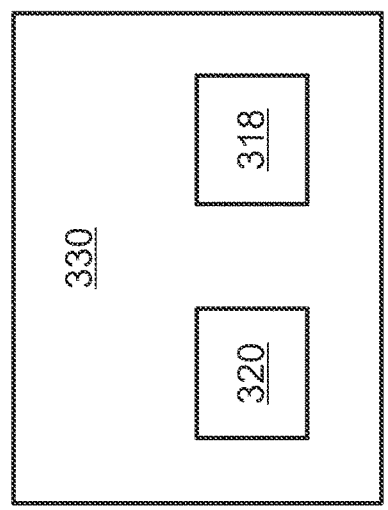
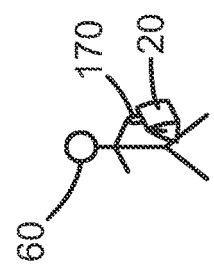
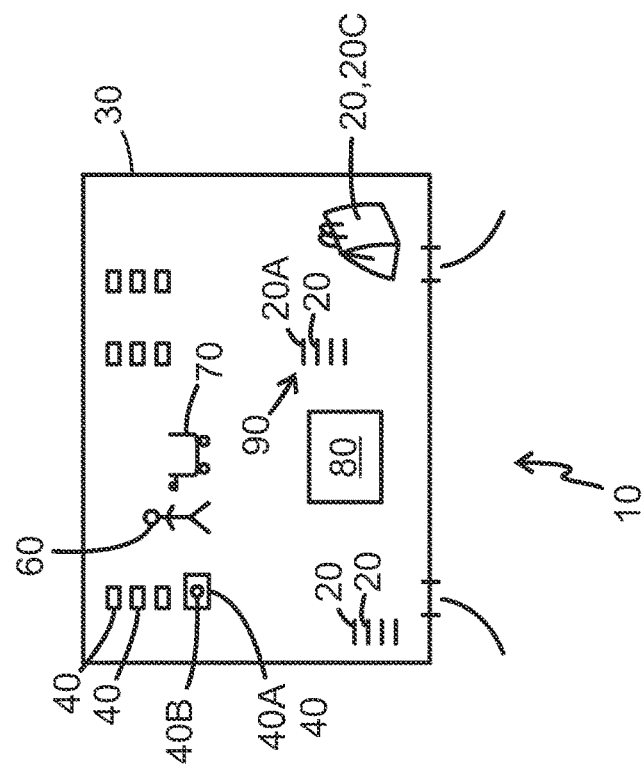
FIG. 1

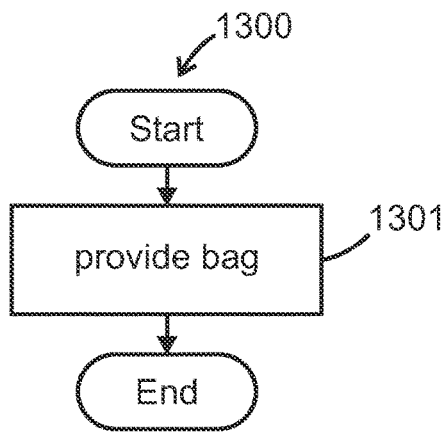
FIG. 30A
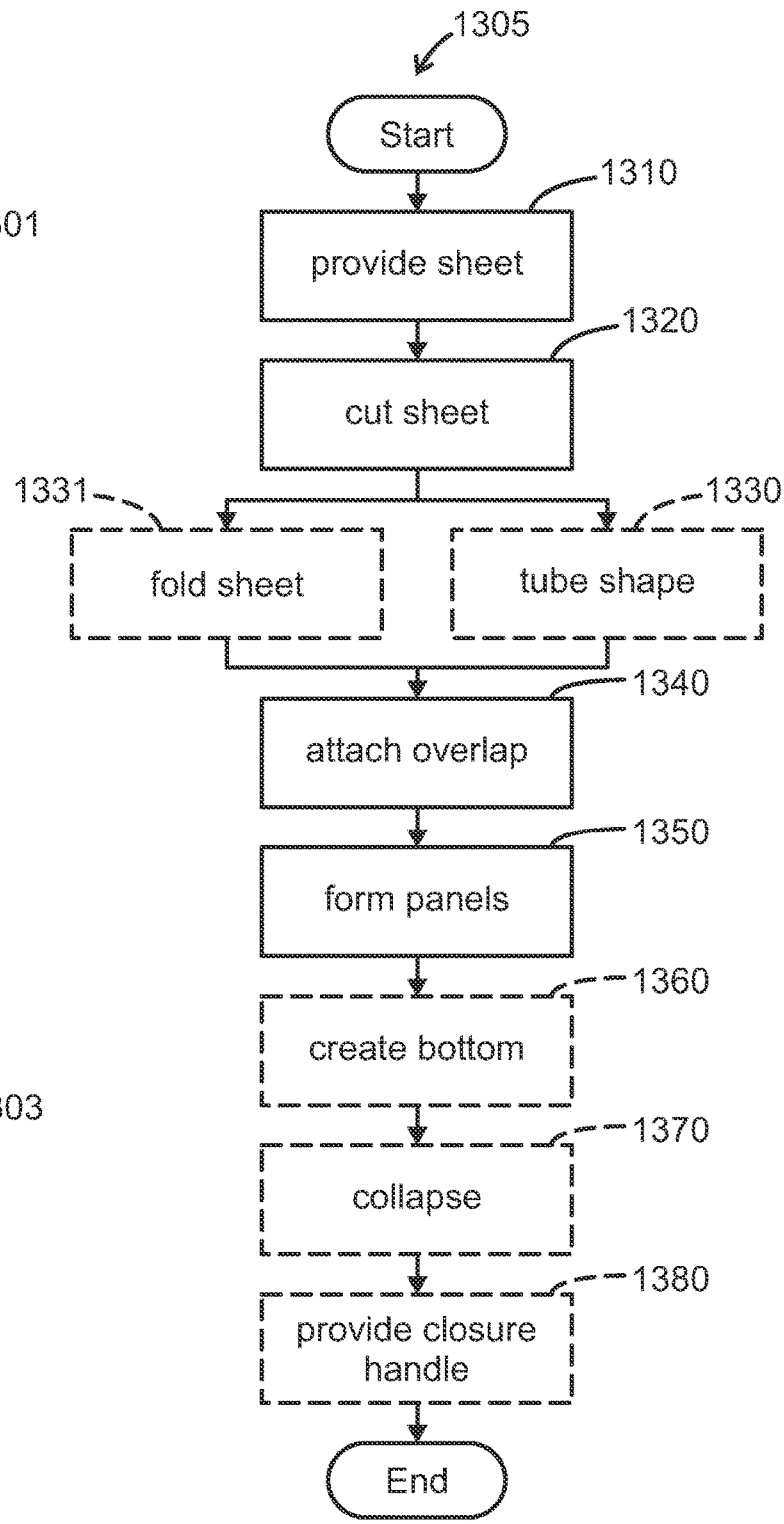
FIG. 30B
FIG. 31

GROCERY TRANSPORT PACKAGING SYSTEM

TECHNICAL FIELD OF THE INVENTION

The present application relates to a container for transporting chilled or frozen goods. The present application also relates to a collapsible handle-carryable grocery carrier bag. It also relates to a method for providing a collapsible carrier bag, and to a method for providing a carrier bag, and to a method of delivering groceries. The present application also relates to a handle-carryable grocery carrier bag package It also relates to a kit of parts including a carrier bag, and to a grocery transport system.

DESCRIPTION OF RELATED ART

Grocery stores are retail stores that primarily sells food. A piece of grocery, or a food item, in a modern grocery store may be provided in a separate package, the size of a grocery package being adapted to contain an amount of food intended to be convenient for the customer. Thus, the grocery store customer may select to purchase food by selecting a plurality of food item packages. The purchasing process typically involves the customer collecting several food item packages in a physical transportation cart and the transportation of the cart to a check-out or cash register for paying. Once the customer has purchased the collected food item packages, the customer faces the problem of transporting the collected grocery items from the grocery store. Accordingly, grocery stores commonly provide carrier bags for enabling their customers to carry the groceries from the store in a convenient manner.

The German Utility Model Application DE 89 04 678 discloses such a carrier bag for groceries. The carrier bag according to DE 89 04 678 is made solely of paper and it has handles attached to the open upper part of the side walls for enabling convenient carrying of the grocery carrier bag. According to DE 89 04 678, the production of a paper bag involves forming a tubular paper web from a planar piece of paper by placing two edges so that they overlap. The overlapping area is glued so as to form the tubular paper web. The tubular paper web is folded to form a carrier bag having four sides and a square bottom. The carrier bag embodiment disclosed in DE 89 04 678 also has two handles made of reinforced paper strips. Each handle is made by a folding a paper strip to form a U-shape. The two end portions of the U-shaped handle strip of a handle are glued, at a distance a from each other, to the exterior surface of one side wall of the carrier bag.

Another carrier bag is disclosed by US 2013/0315507. More particularly, US 2013/0315507 discloses a bag, made of paper, essentially characterized in that the handle for grabbing and transporting it is built into its own body, formed by some die cut holes. The die cut holes are located at a sufficient distance from the top edge of the paper bag to allow performing some folds to close the bag in a way such that the die cut holes are just below the folds allowing for the users fingers to go through in order to grab the bag.

SUMMARY

In view of the state of the art, a problem to be addressed by an aspect of the invention, is how to achieve an improved, yet cost-efficient, transportation of goods using a container.

This problem is addressed by a grocery transport system comprising a storage facility (600) for goods; the storage facility comprising one or several storage rooms having a controlled environment in that the temperature and the relative humidity of the air in the storage room is controlled so that it is kept within certain predetermined ranges; wherein the goods comprises a plurality of different types of goods sorted into different temperature ranges (TI, TII, TIII, TIV), each type of goods being stored in a corresponding storage room ($650_{TI}$, $650_{TII}$, $650_{TIII}$, $650_{TIV}$) having a temperature in accordance with the corresponding goods temperature range (TI, TII, TIII, TIV);

a loading facility for enabling chilled or frozen goods is to be packed into closable and sealable containers (20); said loading facility comprising a plurality of said closable and sealable containers (20) for use in the distribution of said chilled or frozen goods in an air atmosphere environment;

a delivery vehicle for transporting said closable and sealable containers (20), when loaded with a predetermined amount of chilled or frozen goods, to a delivery destination, wherein such a container comprises:

a wall adapted to enclose an interior storage space for transporting chilled and/or frozen goods, the wall being shaped and adapted to form said interior storage space to a volume of at least ten metric litres; said wall comprising:

a) a layer of a material having a thermal conductivity of less than 0.2 W/(K*m); and b) a substantially water vapour impermeable membrane bonded to at least one side of said material layer; and c) a closable opening such that the container in its closed state substantially seals the interior storage space from the environment so as to minimize or prevent entry of air from the environment into the interior storage space; and wherein said material layer has a tensile strength exceeding 0.133 Newton/square millimeter.

BRIEF DESCRIPTION OF THE DRAWINGS

For simple understanding of the present invention, it will be described by means of examples and with reference to the accompanying drawings, of which FIG. 1 is a schematic illustration of an environment 10 in which embodiments of a grocery bag 20 may be used.

In FIG. 6 the folds of the paper walls are illustrated, and several parts on the inside of the carrier bag are also indicated.

FIG. 28A-B are flowcharts of a method for providing a carrier bag.

FIG. 29 illustrates of a method for providing a transport container.

FIG. 30 is a flowchart of a method for providing a handle.

FIG. 31 is a flowchart of a method for providing closure means for a transport container.

FIGS. 37A-N are illustrations of possible steps of how the pre-determined pattern from FIG. 36 can be formed and folded to arrive at a bag.

FIG. 38 is an illustration of an example of a pre-determined pattern.

FIG. 45A-E are illustrations of different kinds of attaching a closure device.

DETAILED DESCRIPTION OF EMBODIMENTS

Figure 2:
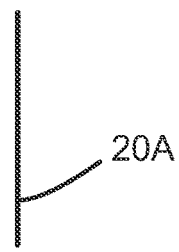
FIG. 2 is an elevational view of an embodiment of a single collapsed grocery carrier bag 20A.

In the following description similar features in different embodiments will be indicated by the same reference numerals.

FIG. 1 is a schematic illustration of an environment 10 in which embodiments of a container 20 for goods may be used. According to an embodiment, the container 20 is a grocery bag 20. The environment may include a grocery store 30, wherein a large number of grocery items 40 are provided. A piece of grocery 40, or a food item 40, in a modern grocery store 30 may be provided in a separate package 40A, the size of a grocery package 40A being adapted to contain an amount of packaged food 40B intended to be convenient for the customer.

Thus, a grocery store customer 60 may select to purchase food by selecting a plurality of food item packages 40. The purchasing process may typically involve the customer walking through the grocery store while collecting several food item packages 40 in a physical transportation cart 70, and transporting the cart to a check-out 80, or cash register 80, for paying.

The grocery packages 40 collected by a customer 60 may comprise fresh produce, such as fruit or mushroom, which may be provided in separate portion sized packages or containers 40A. Fresh produce may be provided at a cool temperature of about 15-18 degrees Centigrade, being held in a slightly cooled part of the grocery store. Thus, some grocery goods may be provided at a first, cool, temperature range of about 15-18 degrees Centigrade.

The grocery may comprise dairy products, such as milk, cream and butter. The dairy products may be provided in separate individual packages, and they may be provided in fridges at a temperature of about 6-8 degrees Centigrade. An individual dairy product package may typically range in size from around 100 grams to about 4 kg. Dairy product packages intended for use in private household commonly have a size of between 200 grams to 2 kg. For example milk may be provided in a carton package, such as a Tetra Pak® package containing e.g. 1 litre of milk, weighing about 1 kg. Thus, some grocery goods may be provided at a second, cold non-freezing, temperature range. The cold non-freezing temperature range may be a range of about +6 to +8 degrees Centigrade. Alternatively, the cold non-freezing temperature range may be a range of about +1 to +4 degrees Centigrade.

The grocery, which may be collected by the customer, may also comprise frozen food packages 40, provided in a freezer within the grocery store. Thus, the frozen food items 40B, for delivery at a temperature of e.g. about −18 degrees Centigrade, may be collected by the customer directly from a freezer. The frozen food 40B may be separately packaged e.g. in a carton box 40A. The frozen food may, for example include frozen fish, meat, or vegetables. The frozen food may have been frozen in a raw state, or, alternatively, it may be provided in a prepared manner such that it is ready to eat after thawing or heating. Thus, some grocery goods may be provided at a freezing temperature range of about −18 degrees Centigrade, or colder. In general, frozen goods does not suffer any harm from being chilled to a lower temperature than −18 degrees Centigrade, and accordingly frozen grocery goods may be provided at a freezing temperature in a range of between −25 to −40 degrees Centigrade. Providing frozen goods within such a low temperature range advantageously extends the time required for the frozen goods to warm towards minimum freezing temperatures, such as e.g. −10 or −4 degrees Centigrade.

In order to achieve cost-efficient handling of the goods 40, sold in the grocery store, the grocery store typically receives a large variety of food items, each food item typically being received in bulk, i.e. an individual received food item type is received as a large number of smaller packages. As mentioned above, the smaller packages are adapted to contain an amount of packaged food 40B intended to be convenient for the customer, who typically buys just one or a few packs of each item.

Similarly, it is important to provide the grocery bags 20 in bulk to the grocery store, so as to allow cost-efficiency. Accordingly, the grocery bag 20 should preferably be collapsible. The collapsible grocery bag 20 may advantageously be delivered in bulk to the grocery store, thus requiring a very small storage volume, thereby contributing to cost-efficiency. Hence, a large plurality of collapsible grocery bags may advantageously be delivered in a collapsed state 20A, thereby enabling transportation of the carrier bag in a substantially flat state 20A. In this manner, a large plurality of collapsible grocery bags may be conveniently provided at a location in the grocery store. In this manner, customers can conveniently collect and bring a desired number of grocery bags for transporting groceries.

According to another embodiment, the container 20 may be shaped in such a manner that plural containers 20 can be piled on top of each other in a space conservative manner. An example of such a space saving shape is a cone shaped container. In this manner plural cone shaped containers may be stacked by placing one cone container on top of the other such that the space required for storing ten containers is only slightly larger than the space required for storing one cone container. According to an embodiment the container may be shaped as a truncated cone such that there is provided a substantially flat bottom area inside the truncated cone container, the cone wall leaning outwardly from the bottom area. In this manner the truncated cone container may also be stacked or piled so that one container fits inside the next substantially identical container, thus enabling transport of a large number of stacked containers within a very small space. This feature of the container advantageously contributes to enable transporting containers 20 in bulk at a low cost.

The collapsed grocery bag 20A comprising kraft paper, as described below, has a balanced rigidity and flexibility allowing it to be easily expanded. In its expanded state 20C the carrier bag provides an interior storage space which is sufficiently large for transporting a plurality of grocery packages, even when the individual grocery packages are larger than 1 litre. According to some embodiments, the carrier bag has a volume of between 10 litres and 50 litres in the expanded state of the carrier bag.

Having collected the desired combination of grocery packages 40 in the physical transportation cart 70, the customer 60 may transport the cart to a check-out 80, or cash register 80, for paying.

With reference to FIG. 1, the customer 60 may collect a collapsed grocery carrier bag 20A from a pile 90 of collapsed grocery carrier bags 20A. The customer 60 may then unfold the grocery carrier bag 20A it to its open expanded state 20B (See FIG. 6, FIG. 7 and FIG. 8), so that it is ready be loaded with groceries.

FIG. 2 is an elevational view of an embodiment of a single collapsed grocery carrier bag 20A.

Figure 3:
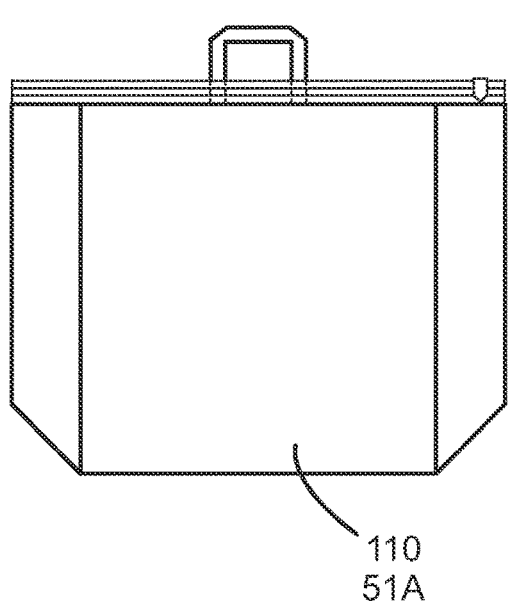
FIG. 3 is a front view of the collapsed grocery carrier bag 20A.

FIG. 3 is a front view of the collapsed grocery carrier bag 20A; and

Figure 4:
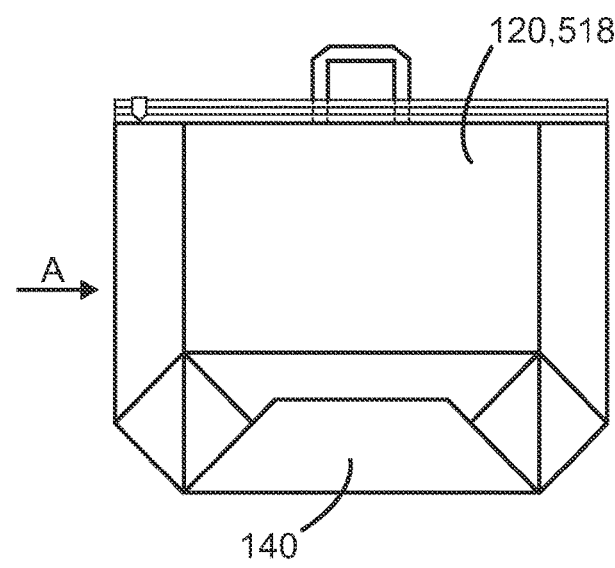
FIG. 4 is a rear view of the collapsed grocery carrier bag 20A.

FIG. 4 is a rear view of the collapsed grocery carrier bag 20A.

Figure 5:
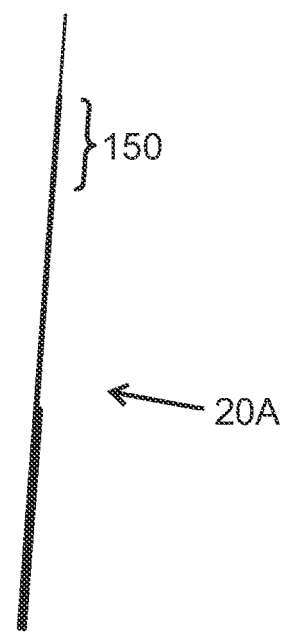
FIG. 5 is a side view of the collapsed grocery carrier bag 20A, as seen in the direction of arrow A in FIG. 4.

FIG. 5 is a side view of the collapsed grocery carrier bag 20A, as seen in the direction of arrow A in FIG. 4.

Figure 6:
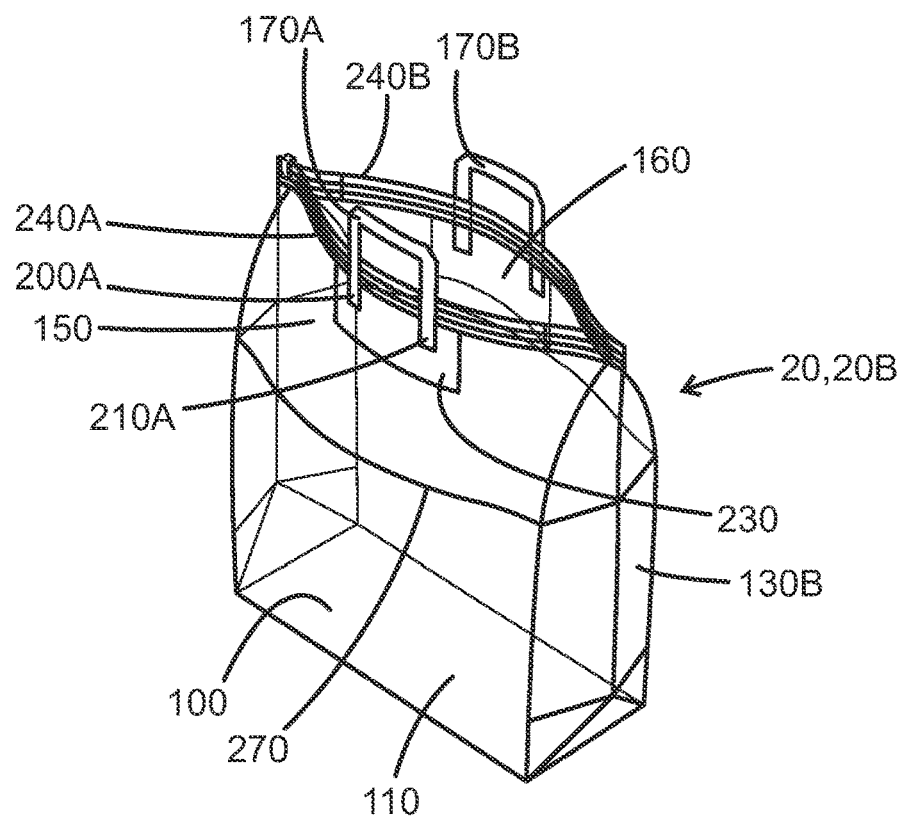
FIG. 6 is an elevational view of the expanded grocery carrier bag 20 in an open expanded state 20B.

FIG. 6 is an elevational view of the expanded grocery carrier bag 20 in an open expanded state 20B. In FIG. 6 the folds of the paper walls are illustrated, and several parts on the inside of the carrier bag are also indicated.

Figure 7:
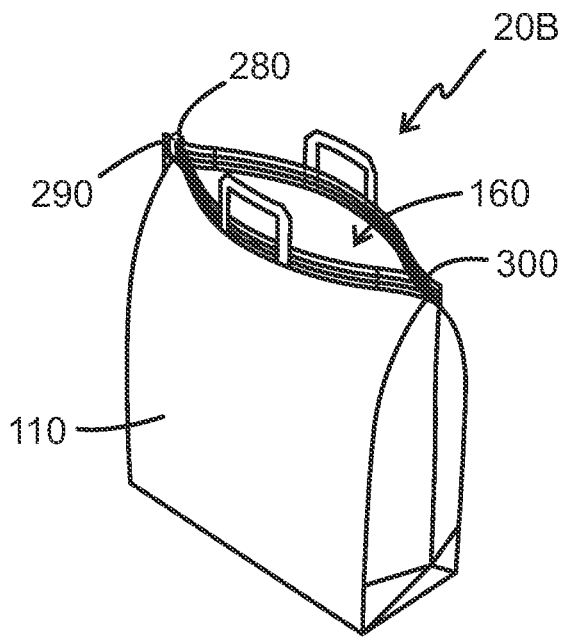
FIG. 7 is another elevational view of the expanded grocery carrier bag 20 in an open expanded state 20B, illustrating an exterior look of an embodiment of the expanded grocery carrier bag 20, 20B.

FIG. 7 is another elevational view of the expanded grocery carrier bag 20 in an open expanded state 20B, illustrating an exterior look of an embodiment of the expanded grocery carrier bag 20, 20B.

Figure 8:
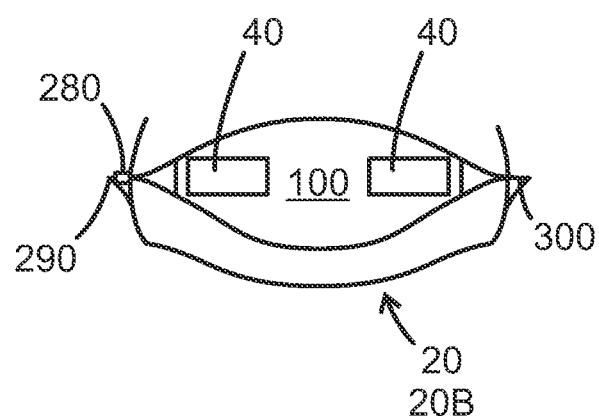
FIG. 8 is a top plan view of the expanded grocery carrier bag 20 in an open expanded state 20B.

FIG. 8 is a top plan view of the expanded grocery carrier bag 20 in an open expanded state 20B.

When the expanded grocery carrier bag 20 has been filled with chilled or frozen grocery packages 40, the expanded grocery carrier bag 20 can be closed.

Figure 9:
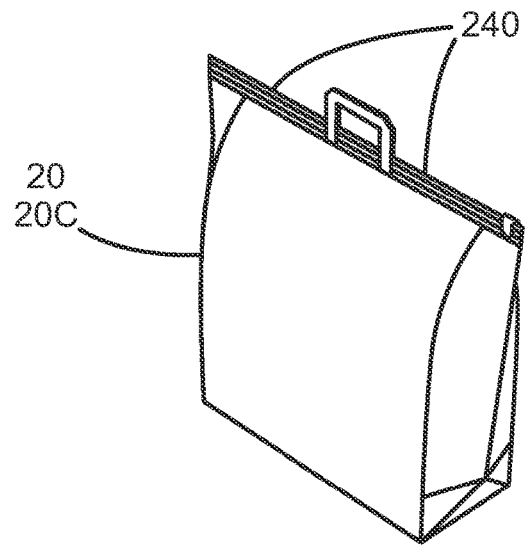
FIG. 9 is an elevational view of the expanded grocery carrier bag 20 in a closed expanded state 20C.

FIG. 9 is an elevational view of the expanded grocery carrier bag 20 in a closed expanded state 20C, illustrating an exterior look of an embodiment of the expanded grocery carrier bag 20 in its closed state 20C.

Figure 10:
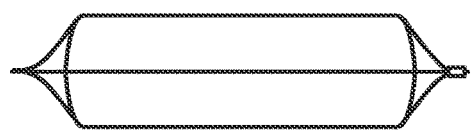
FIG. 10 is a top plan view of the expanded grocery carrier bag 20 in the closed expanded state 20C.

FIG. 10 is a top plan view of the expanded grocery carrier bag 20 in the closed expanded state 20C.

Figure 11:
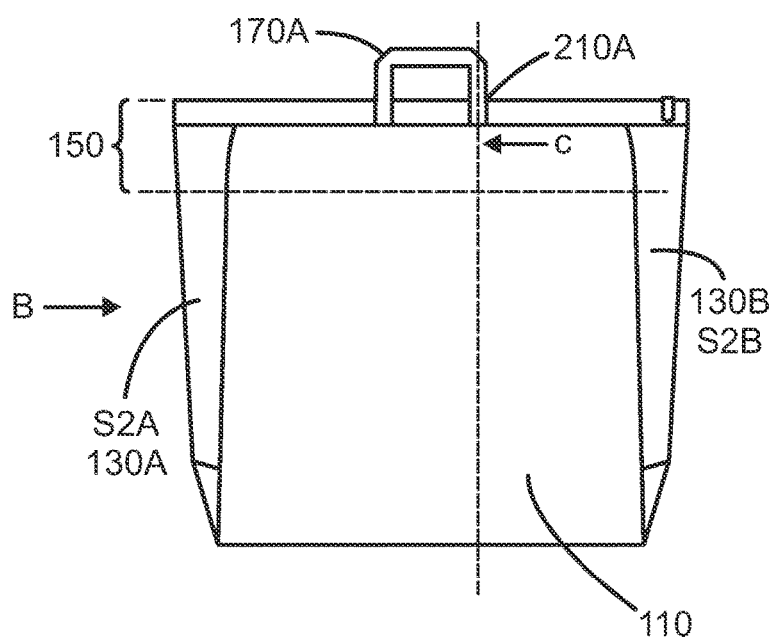
FIG. 11 is a front view of the expanded grocery carrier bag 20 in the closed expanded state 20C.

FIG. 11 is a front view of the expanded grocery carrier bag 20 in the closed expanded state 20C.

Figure 12:
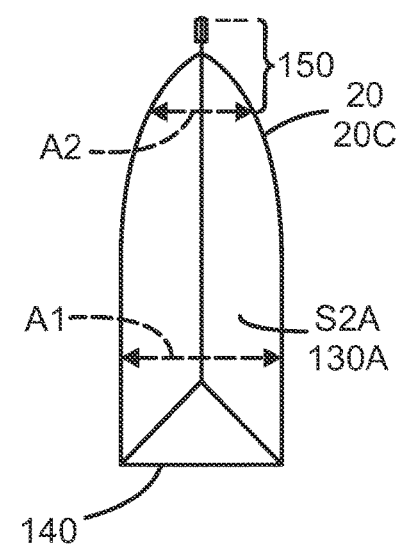
FIG. 12A is a side view of the expanded grocery carrier bag 20 in the closed expanded state 20C, as seen in the direction of arrow B in FIG. 11.
FIGS. 12B-D illustrate that a lowered density of the paper layer, with a maintained surface weight, will lead to an increased thermal resistance of the kraft paper wall.

FIG. 12A is a side view of the expanded grocery carrier bag 20 in the closed expanded state 20C, as seen in the direction of arrow B in FIG. 11.

As illustrated in FIG. 12A, the expanded grocery carrier bag 20 in the closed expanded state 20C may have a larger cross-sectional area A1 near the bottom panel 140 and a smaller cross-sectional area A2 near the closed opening, i.e. in the vicinity of the rim portion 150. As schematically illustrated in FIG. 1, the grocery carrier bag 20 in its closed expanded state 20C may have a generally tapered shape, having a larger cross-sectional area near the bottom panel and a smaller cross-sectional area near the opening.

Accordingly, an embodiment of the collapsible handle-carryable grocery carrier bag is suitable for use in an air atmosphere environment. The carrier bag has a collapsed state 20A (See FIGS. 2, 3 and 4) for enabling transportation of the carrier bag in a substantially flat state.

As mentioned above, the carrier bag may also have an expanded state 20B, 20C such that the carrier bag, in its expanded state, provides an interior storage space 100 (FIGS. 6 and 8) for transporting chilled and/or frozen grocery packages 40 (See FIG. 8). The carrier bag may comprise a paper layer being shaped and folded so as to form a front wall panel 110, S1A (See FIG. 3),
a back wall panel 120, S1B (See FIG. 4),
two side wall panels 130A, S2A, 130B, S2B (See FIG. 11); and
a bottom panel 140 (See FIG. 4).

The wall panels, i.e. the front wall panel 110, the back wall panel 120, the two side wall panels 130A and 130B and the bottom panel 140 may cooperate to form said interior storage space 100. The interior storage space 100 may be of a volume larger than 10 litres in the expanded state of the carrier bag. The volume depends on the dimensions of the bottom panel and the wall panels.

A rim portion 150 of the wall panels 110, 120, 130A and 130B facing away from the bag bottom panel 140 may provide a bag opening 160 (FIG. 6 and FIG. 7). The carrier bag may further comprise a first handle 170A being associated with said rim portion 150, 150A of said front wall panel S1A. The first handle 170A may be shaped and dimensioned to allow gripping by a human hand such as to enable convenient carrying of the grocery carrier bag. In some businesses where carrier bags are utilized, it is considered necessary for a carrier bag to be provided with a handle, since a handle-carryable grocery carrier bag is considered to be a fundamental customer convenience requirement. Thus, in some cases, a grocery bag which is capable of being carried by means of a handle, or a pair of handles, is considered to be a fundamental customer convenience requirement. According to some embodiments, the carrier bag is therefore advantageously provided with an integrated handle, or an integrated pair of handles such that a handle-carryable grocery carrier bag is supplied. This solution advantageously allows a person to carry the loaded bag by the built-in handle, or handles, in a convenient and ergonomically advantageous manner.

As mentioned above, the carrier bag may have an open expanded state 20B (FIG. 6 and FIG. 7) for loading and/or unloading grocery packages to be transported, and a closed expanded state 20C (See FIG. 9 and FIG. 10). In its closed expanded state 20C, the carrier bag may provide a substantially closed interior storage space 100. The bag opening 160 (FIGS. 6 and FIG. 7) is a closable opening which, in the closed expanded state (FIG. 9) of the carrier bag may cooperate with the wall panels and the bottom panel so as to minimize or prevent entry of air from the environment into the interior storage space. Hence, the substantially closed interior storage space may advantageously be used for transporting chilled and/or frozen grocery packages, since the carrier bag, in its closed expanded state 20C, may exhibit a very good ability to maintain a low temperature of chilled or frozen items that are stored in the closed interior storage space.

A Container Wall

The advantageous cold keeping properties of embodiments of the container 20 is believed to rely on a combination of container features. For example, in the carrier bag 20, the choice of material forming the front wall panel S1A, the back wall panel S1B, the side wall panels S2A, S2B; and the bottom panel contributes to the advantageous cold keeping properties. It is to be noted that the design of the container walls is not limited to the above shape. Instead, the word wall is to be understood as a material forming the boundaries of the interior storage space of the container 20. The wall or walls of the container 20 forms the boundaries of the interior storage space for transporting chilled and/or frozen goods.

According to some embodiments the walls of the container 20 comprise a kraft paper layer 180. Kraft paper is a material which is available at a reasonable cost, and it is readily available in large quantities. Additionally, kraft paper bags, such as the carrier bag disclosed in DE 89 04 678, are mass produced at low cost using readily available production machines. Accordingly, embodiments of the carrier bag 20 may be produced using such readily available machines, or by just some minor modifications to existing kraft paper bag production machines. This availability of existing paper bag production machines, in conjunction with embodiments of the bag design enabling the use of such existing production machines for the production of kraft paper carrier bags having a chill conserving function contribute to enabling an advantageously low production cost. Thus, the fact that existing manufacturing machines can be used contributes to enabling cost effective manufacture of the chill conserving kraft paper bag according to embodiment of the invention. This is particularly important for facilitating market entry, i.e. for enabling market introduction and sales of kraft paper carrier bags according to embodiments of the invention in the short term to medium time frame, since use of existing machines contributes to enabling the low production cost. Embodiments of methods for the production of kraft paper carrier bags are discussed further below in this document. Moreover, Kraft paper is advantageous in that it is biodegradable and environmentally friendly.

The kraft paper layer 180 may have a surface weight in the range between 40 and 240 grams per square metre, and a density lower than 1200 kg per cubic metre. The surface weight of the kraft paper may be selected in dependence on the tensile strength to which the bag will be exerted when in use. In this connection it is noted that a carrier bag may be produced in various sizes, such as e.g. a ten litre bag, a twenty litre bag, a thirty litre bag, a forty litre bag, or a fifty litre bag. It is possible to use kraft paper with as low surface weight as 40 g/square metre and a density lower than 1200 kg/cubic metre, at least for the small size bags of ten or twenty litre storage space, when the small size bag will be used for carrying lower weights. The maximum weight of the goods to be transported will, to some extent, be limited by the size of the bag.

Figure 13:
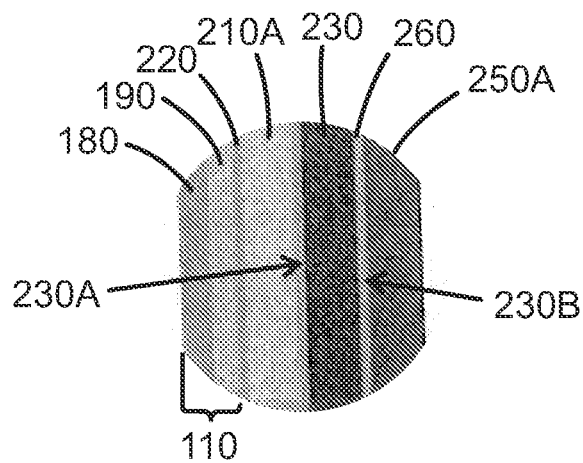
FIG. 13 is a cross-sectional view of the wall material at a point indicated by arrow C in FIG. 11.

Thus, the walls, including the bottom panel, may comprise a kraft paper layer 180 (FIG. 13). It has been found that a grocery bag having a Kraft paper layer having a surface weight of between 60 and 160 grams per square metre generally provides a satisfactory strength while also providing sufficient flexibility so as to be user friendly. According to preferred embodiments of the kraft paper bag, the kraft paper is selected to have a surface weight of at least 60 g/square metre and a density lower than 1000 kg/cubic metre.

According to a preferred embodiment of the Kraft paper grocery bag the Kraft paper layer has a surface weight of between 100 and 140 grams per square metre, and a density lower than 1000 kg/cubic metre.

The inventors have considered the following in terms of choice of kraft paper quality:

A) An increased surface weight of the paper, with an unchanged paper density, leads to an increased thickness of the paper layer. Since the internal thermal resistance $R_{tw}$ of a wall, in terms of heat conduction, is proportional to the wall thickness, the increased thickness of the paper layer advantageously increases the thermal resistance of the kraft paper wall thereby leading to reduced conduction of heat through the container wall from the environment.

B) Moreover, it is noted that a lowered density of the paper layer, with a maintained surface weight, will advantageously lead to an increased thermal resistance of the kraft paper wall, thereby leading to reduced conduction of heat through the container wall from the environment when the bag is in use. In fact, the effect on thermal resistance is advantageously two-fold when the density of the paper layer is lowered with a maintained surface weight, since this will lead to I) an increased wall thickness, and
II) an increase of the amount of air being trapped inside the kraft paper.

Figure 12B:
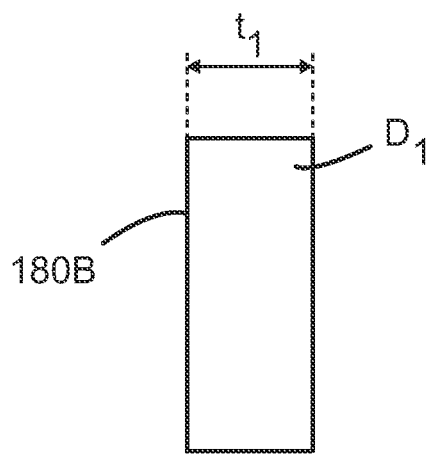

This is illustrated with reference to FIG. 12B, FIG. 12C, and FIG. 12D. FIG. 12B illustrates a portion of a kraft paper wall layer 180B, having a wall thickness $t_1$ and a density $D_1$. The thermal resistance Rtw1 of the wall is a function of the thickness t1 and the density D1:

$$R_{tw1}=f(t_1,D_1)$$

Figure 12C:
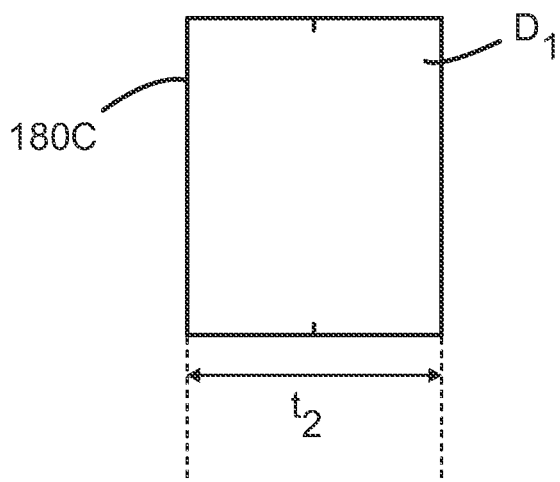

With reference to FIG. 12C, the wall 180C has been made with a larger thickness $t_2=K_1*t_1$, K being a number larger than 1. The thermal resistance $R_2$ will be increased proportionally to $$R_{tw2}=f(t_2,D_1)=K_1*R_{tw1}$$

Figure 12D:
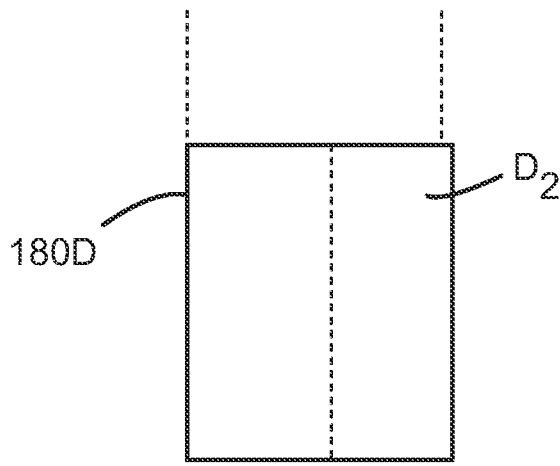

With reference to FIG. 12D, a wall 180D has been made with the larger thickness $t_2$ and it also has a decreased density $D_2=K_2*D_1$, $K_2$ being a number smaller than 1. Thus, in comparison to the wall 180B of FIG. 12B, the thermal resistance $R_{tw3}$ will first be increased proportionally to the increase in thickness and then it will also be further increased due to the decreased density.

$$R_{tw3}=f(t_2,D_2)>K_1*R_{tw1}$$

When the density is decreased, there will be a larger proportion of air in the kraft paper layer. The following assumption may be made for the purpose of understanding the effect of a changed density: The proportion of gas $P_G$, such as nitrogene or air, in the kraft paper layer may be expressed as:

$$P_G=V_G/V_{tot}=(D_{mean}-D_{fib})/(D_{gas}-D_{fib})$$

Assuming a mean density of the paper fibres and the gas contents (the apparent density of the kraft paper) of, for example, 901 kg/m³ and an air density of 1.2 kg/m³, the proportion of air in the kraft paper is about 40%. At NTP, i.e. Normal Temperature and Pressure dry air has a density of 1,204 kg/m³.

In this connection it is noted that air has a very low heat conductivity of about 0.024 W/(m K), and thus an increased proportion of air in the kraft paper proves to have a dramatic effect in terms reducing heat conductivity of the kraft paper layer.

C) An increased surface weight of the kraft paper in combination with a lower density leads to a yet a further increase of the internal thermal resistance of the kraft paper wall.

Thus, the inventors concluded that, when designing a kraft paper bag, it may be done by a procedure as follows:

S1. First select a surface weight of the kraft paper in dependence on the tensile strength to which the bag will be exerted when in use.

S2. Reduce the density of the selected paper layer, with a maintained surface weight, so as to achieve an increased thermal resistance of the kraft paper wall.

S3. When a reduced density of the kraft paper may have a somewhat weakening effect on the tensile strength, the surface weight selected in step 1, may be increased by a safety margin so as to ensure the integrity of the paper bag when in use.

The tensile strength needed is generally higher for a larger bag, since a larger bag will enclose a larger volume, and weight, of goods. Thus, when transporting a certain amount of frozen or chilled goods, an appropriate size container should the selected. The bag size should be selected sufficiently large that the chilled goods fits inside, of course, but for optimum chill conserving ability of the bag, the chilled or frozen goods should preferably fill more than 30% of the inside volume of the container 20. Hence, when packing chilled goods into the container, the container size should be selected sufficiently small so that, when packed with the cold or frozen goods, the cold or frozen goods fill up more than 30% of the inside volume of the selected container 20. The selection of an appropriate size container contributes to the chill conserving properties of the packed container, since the thermal resistance of the wall is decreased in dependence on an increased wall surface area.

A kraft paper layer advantageously provide a good tensile strength and it also contains a certain amount of air or gas, thus contributing to the thermal insulation capacity of the container 20.

Another embodiment comprises non-woven as wall material. This advantageously enables a non-expensive bag with a material having high air content, and it is therefore a good alternative. Non-woven material may comprise slender fibers which are not woven or knitted but are kept together in other ways, such as by entanglement. Non-woven materials may include textile-like materials. Here below there is a list of other suitable materials:

Conventional textiles

Film of foamed/porous thermoplastic. The thermoplastic may be a conventional oil-based plastic such as polyethylene, polypropylene or polyurethane. It is also possible to use a bio-based plastic, polylactic acid (PLA)

Film of foamed/porous rubber (rubber can be of many types, but neoprene (chloroprene rubber) are preferred. Said non-woven materials and conventional textiles have a tensile index value exceeding 50 kNm/kg.

All these container wall materials are selected to have a thermal conductivity value less than 0.2 W/(m·K):

$$\lambda<0.2 \text{ W}/(\text{m·K}).$$

An Insulating Air Gap

Preferably, bag size should be selected such that an air gap is allowed to form between the inner surface of the container and the outer surface of the cold or frozen goods. Such an air gap is advantageous in that the air gap renders extra insulation against the exterior environment, which may be warm. According to an embodiment, the middle portion of interior the surface of the bag bottom may be marked so as to indicate that it is a loading zone for chilled goods. This advantageously indicates to the user of the chill container that goods to be transported should preferably be placed within the indicated area for optimum chill conserving effect during transport. In this manner a simple marking of the bag bottom will be indicative of a three-dimensional bag loading zone volume within the bag, the bag loading zone volume being separated from the side wall(s) of the bag by an air gap.

According to another embodiment, there is provided a number of strips, e.g. kraft paper strips, having lengths commensurate with a width and a breadth of the paper bag; the strips being attached to the inner surfaces of the walls such that, when the bag is in its expanded state, the strips are arranged to stretch from wall to wall. In this manner the strips may advantageously provide a visual indication of the loading zone volume of the bag. The strips may also advantageously provide support for goods to be transported so as to prevent such goods from leaning against the bag wall when the bag is transported.

According to an embodiment, the middle portion of interior the surface of the bag bottom may be marked so as to indicate that it is a loading zone for chilled goods (as described above), and the strips may be attached and positioned to the bag walls so that when goods-to-be-transported is stacked on the marked loading zone on the bag bottom (which may lead to the marked bottom area being covered), the paper strips will still indicate the loading zone volume of the bag.

Thus, for optimum cold conserving properties of the packed container, the container size should be selected sufficiently small so that, when packed with the cold or frozen goods, the cold or frozen goods fill up more than 30% of the inside volume of the selected container 20, while also allowing for an air gap to be formed between the cold or frozen goods and the inner surface of the container wall or walls.

Moreover, the kraft paper layer 180 may have a substantially water vapour impermeable membrane 190 bonded to at least one side of the kraft paper layer.

A Membrane 190 on the Wall

According to an embodiment the polymer membrane layer 190 may comprise Low-density polyethylene (LDPE). The LDPE membrane may have a density in the range from 910 to 940 kg/m3. The LDPE-membrane layer may have an air permeability of less than 0.35 μm/(Pa·s) in accordance with ISO 5636-3:2013.

According to a preferred embodiment the polymer membrane layer 190 may comprise a biodegradable plastic, such as e.g. Polylactic acid (PLA), polyhydroxyallkanoates (PHAs) such as poly-3-hydroxybutyrate (PHB). The polymer membrane layer 190 may alternatively comprise a biodegradable plastic such as polyhydroxyvalerate (PHV), or polyhydroxyhexanoate (PHH), polybutylene succinate (PBS), polycaprolactone (PCL), polyvinyl alcohol (PVA). The polymer membrane layer 190 may alternatively comprise biodegradable plastics such as a starch based plastics, plastics based on natural oils and fats (fatty acid esters obtained by transesterification of naturally occurring fats and oils).

The polymer membrane layer 190 may alternatively comprise a biodegradable plastic such as a cellulose-based plastics (e.g. cellulose acetate).

The polymer membrane layer 190 comprising a biodegradable plastic as defined above may be extrusion coated on a kraft paper layer.

Alternatively a biodegradable plastic as defined above may be dispersion coated on a kraft paper layer. The dispersion coated biodegradable plastic can advantageously be recycled in a conventional paper recycling process.

The use of biodegradable plastic for the polymer membrane layer 190 is preferred since it may be combined with a wall material having a sufficient tensile strength and also being biodegradable, such as e.g. kraft paper, thus rendering a kraft paper carrier bag which not only provides outstanding chill retaining properties, but also is fully biodegradable.

According to another embodiment, the polymer membrane layer 190 comprises a non-biodegradable plastic which may be produced from fossil oil. Such a plastic membrane advantageously provides a good water vapour barrier.

FIG. 13 is a cross-sectional view of the wall material at a point indicated by arrow C in FIG. 11. FIG. 13 is illustration of an embodiment of material layers at rim portion 150 of the front wall 110 at a position where the handle strip is attached to the front wall 110. According to an embodiment the water impermeable and water vapour impermeable membrane 190 may be provided on the side of the kraft paper layer 180 facing the interior of the bag, as illustrated in FIG. 13. According to an embodiment, the water vapour impermeable membrane 190 is distributed over substantially all of the surface on one side of the paper layer 180. According to an embodiment the water vapour impermeable membrane 190 comprises a polymer. According to an embodiment the polymer layer 190 may be a layer of PE or Polyethylene.

As shown, e.g. in FIG. 6, the first handle 170A may comprise a paper strip formed in a U-shape and having two paper strip end portions 200A and 210A. The paper strip end portions 200A and 210A of the first handle 170A may be attached to said rim portion 150 of said front wall panel 110, S1A. With reference to FIG. 13, the paper strip end portion 210A may be attached to the membrane 190 by means of a glue layer 220.

A first substantially planar reinforcement sheet 230 (See FIGS. 6 and 13) having a certain size may be provided in order to distribute the lifting force from the first handle paper strip end portions to a larger surface area of the front wall panel 110, S1A. The first substantially planar reinforcement sheet 230 may have a first sheet surface 230A and a second sheet surface 230B on opposite sides of the substantially planar reinforcement sheet 230. The first reinforcement sheet 230 may be attached to the paper strip end portion 210A of the first handle 170A and to said rim portion 150 of said front wall panel 110, S1A such that said paper strip end portion 210A of the first handle 170 is located between the front wall panel 110, S1A and the reinforcement sheet 230.

The first surface 230A of the first reinforcement sheet 230 faces the paper strip end portion 210A of the first handle 170A and said rim portion 150 of the front wall panel 110, S1A. The first surface 230A of the first reinforcement sheet 230 may be bonded to the paper strip end portion 210A and to said rim portion 150 of said front wall panel 110 S1A so as to distribute lifting force from said paper strip end portions to said front wall panel via said first reinforcement sheet.

With reference to FIG. 6 in conjunction with FIG. 9, the bag opening 160 is closable by means of a mechanical interlock 240, or closure device 240 attached to said rim portion 150. The closure device 240, in the closed expanded state of the carrier bag, cooperates with the wall panels and the bottom panel to minimize or prevent air from the environment from entering the interior storage space. The closure device 240 includes a first elongated closure element 240A, and a second elongated closure element 240B.

Figure 14:
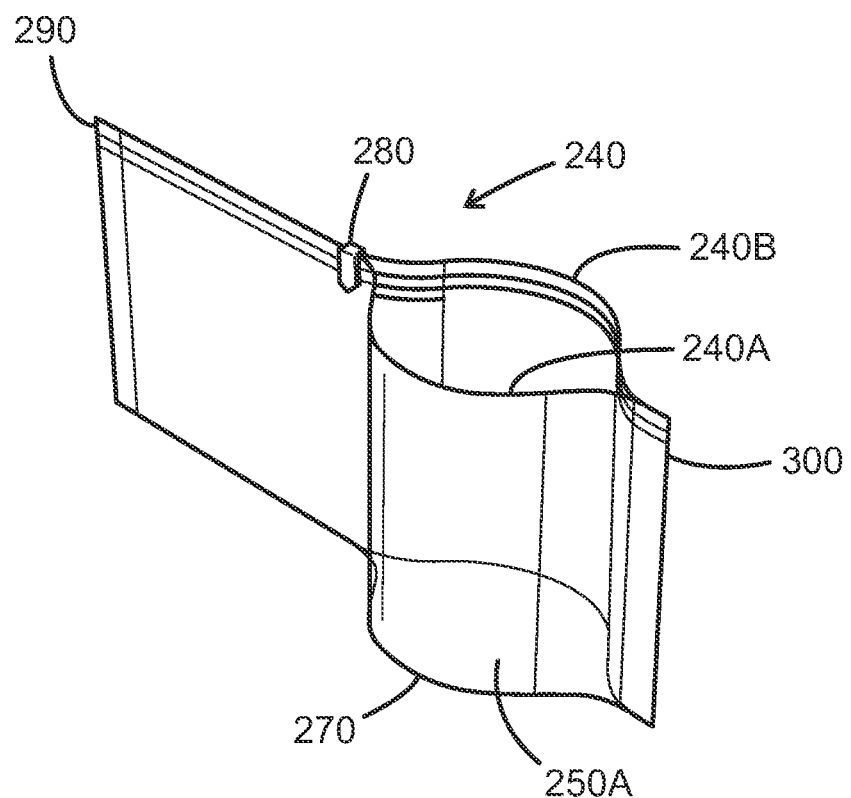
FIG. 14 is an illustration of an embodiment of the closure device 240.

FIG. 14 is an illustration of an embodiment of the closure device 240. The first elongated closure element 240A is integrated with a second substantially planar reinforcement sheet 250A, the second reinforcement sheet 250A having a predetermined area extension which is larger than the above mentioned certain size of the first substantially planar reinforcement sheet 230. The second substantially planar reinforcement sheet 250A may be attached to the first reinforcement sheet 230 and to the rim portion 150 of said front wall panel 110, S1A such that the first reinforcement sheet 230 is located between the front wall panel 110, S1A and the second substantially planar reinforcement sheet 250A. The second substantially planar reinforcement sheet 250A may be attached by a glue layer 260. According to an embodiment the second substantially planar reinforcement sheet 250A comprises polymer material. According to another embodiment the second substantially planar reinforcement sheet comprises paper.

The second substantially planar reinforcement sheet being bonded to the second sheet surface of the first substantially planar reinforcement sheet advantageously achieves two effects. On the one hand, the elongated closure device is thereby attached to the bag wall, and on the other hand the second substantially planar reinforcement sheet 250A also acts to distribute lifting force from said first substantially planar reinforcement sheet to said front wall panel via said second reinforcement sheet, the lifting force originating from the handle when the bag is carried by lifting the handle 170A (See FIG. 6). As illustrated in FIGS. 14 and 6, the second substantially planar reinforcement sheet 250A may have a lower edge 270, and the second substantially planar reinforcement sheet 250A may have a physical extension of between 10% and 30% of the height of a wall panel 110.

The second substantially planar reinforcement sheet 250A may be attached to an interior surface of the rim portion 150 of the front panel 110 and to a part of an interior surface of the rim portion 150 of a side panel, as shown in FIG. 6.

The paper strip end portions of the first handle and said first reinforcement sheet are sized and dimensioned so as to withstand a force exceeding 100 Newton.

The kraft paper layer comprises a certain amount of air being trapped within the kraft paper layer. This trapped air is believed to contribute to good insulating property of the bag walls and bag bottom. In fact, embodiments of the carrier bag have been tested and the tests included a measurement with an Infra-red camera for a duration of more than 24 hours, while the closed carrier bag was placed in a warm room at a temperature of 25° Centigrade. The bag was placed such that the bottom panel 140 was placed on the floor, and the bag was standing with the rim portion 150 facing upwards. During this testing, the temperature on the outer surface of a closed carrier bag was detected and the temperature development was registered as time passed. The closed carrier bag was packed with a number of chilled and frozen grocery packages. Whereas, these measurements indicated that outer surface of the lower part of the bag side walls stayed colder than the outer surface of the upper rim portion 150, the tests also indicated that it was not possible to detect, from the outer surface temperature as detected with the IR camera the shape of the grocery bag contents. In other words, individual frozen or chilled packages 40 which were positioned in the interior storage space 100 (FIG. 8) could not be distinguished by measurements of the outer surface temperature of the bag wall. This was considered to indicate that the material of the wall is an efficient isolator for infrared radiation i.e. heat radiation.

A Kraft paper layer of more than 140 grams per square metre may be advantageous for certain uses of the carrier bag, but the embodiment of the grocery carrier bag intended for use in grocery stores, allowing end user customers to pack their groceries into the bag, will preferably have a Kraft paper layer of 140 grams per square metre, or less than 140 grams per square metre. This is because the Kraft paper layer of more than 140 grams per square metre may be experienced to be a bit too stiff, whereas a Kraft paper layer of 140 grams per square metre or less than 140 grams per square metre will be more flexible, and thus more convenient to handle.

Figure 15:
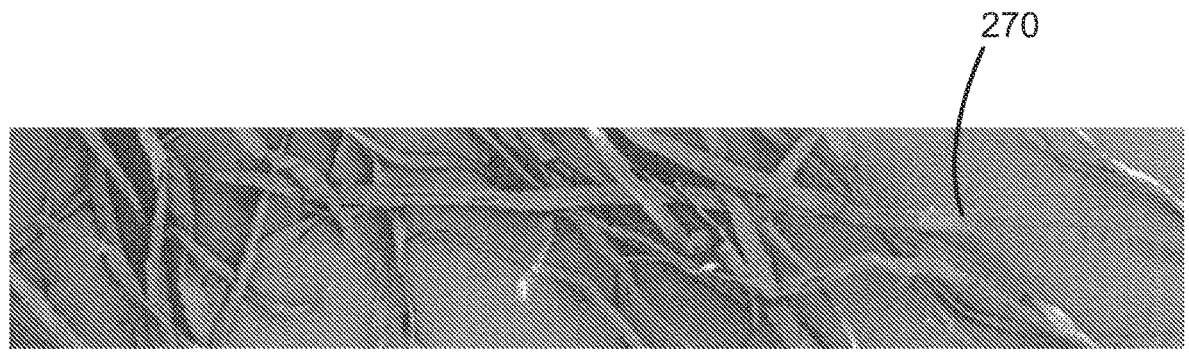
FIG. 15 is an illustration of Kraft Pulp Fibres.

FIG. 15 is an illustration of Kraft Pulp Fibres. According to an embodiment the kraft paper layer may comprise a plurality of Kraft Pulp Fibres 270 which are arranged one above the other so as to form plural air gaps within the kraft paper layer. According to one embodiment the kraft paper layer comprises a plurality of Kraft Pulp Fibres which are arranged one above the other so as to form plural air gaps within the kraft paper layer, and at least some of the Kraft Pulp Fibres have a length in the range between 1 and 3 mm and/or a width in the range between 10 and 50 micrometer. At at least some of the plural air gaps have a volume exceeding 200 000 cubic micrometers according to that embodiment.

According to an embodiment the substantially water vapour impermeable membrane is bonded to the side of the kraft paper layer facing the outside of the bag. This solution advantageously allows user to place bag on ground even when its rainy and wet without causing deteriorated strength of the bag, since the water vapour impermeable membrane may prevent or minimize the absorption, by the kraft paper, of any water deposited on the exterior surface of the bag.

Closability of Container Opening

Figure 16:
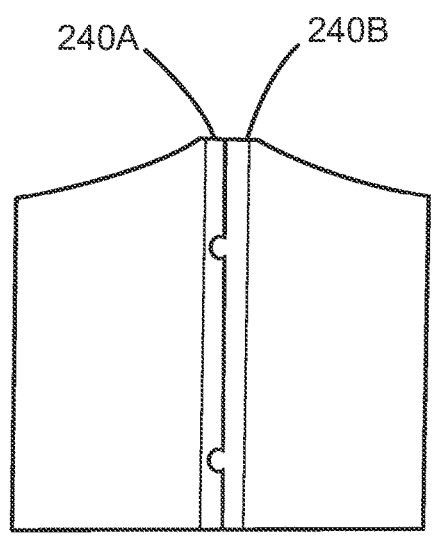
FIG. 16 is an illustration of an embodiment of the first elongated closure element 240A, and the second elongated closure element 240B.

FIG. 16 is an illustration of an embodiment of the first elongated closure element 240A, and the second elongated closure element 240B. The first elongated closure element 240A, and the second elongated closure element 240B are adapted to mate with each other in the closed state. According to an embodiment the first elongated closure element 240A comprises an elongated cavity having lips forming a slit along its length, so as to enable a mating protrusion to enter the slit between the lips. The lips of the elongated cavity may be compliant so as to close around the protrusion so as to hold once it has entered into the cavity. According to an embodiment the first elongated closure element 240A comprises at least two elongated cavities provided in parallel so as to receive at least two corresponding elongated protrusions of the second elongated closure element 240B which are provided in parallel.

According to an embodiment an elongated cavity of the first elongated closure element 240A forms an elongated tubular hollow which is adapted to receive the protrusion of the second elongated closure element 240B.

Figure 17A:
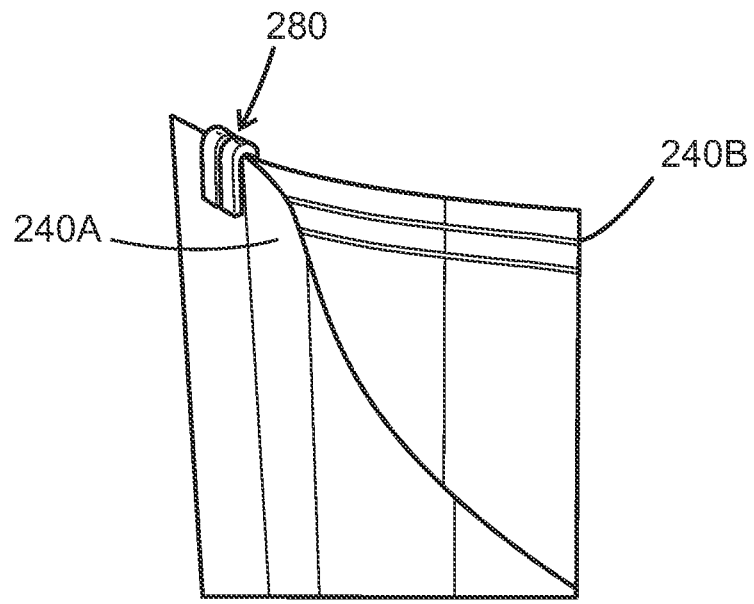
FIG. 17A is a perspective view of a part of the closure device 240 shown in FIG. 14.
Figure 17B:
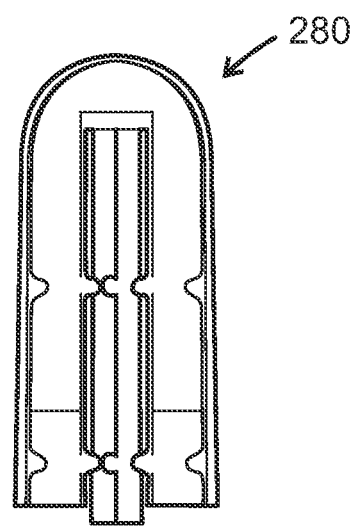
FIG. 17B is a side view of the closure device 240.

FIG. 17A is a perspective view of a part of the closure device 240 shown in FIG. 14. FIG. 17B is a side view of the closure device 240.

A movable pressure device 280, also referred to as "runner" 280, may be provided, according to an embodiment, for the purpose of forcing the protrusion of the second elongated closure element 240B to enter into the elongated tubular hollow of the first elongated closure element 240A. This solution provides for an advantageously simple handling of the bag 20. In particular, a customer, having loaded chilled groceries into the bag 20, may easily close the bag by simply sliding the movable pressure device 280 from one edge 290 to the other edge 300 (see FIG. 14 in conjunction with FIG. 8 or 7). In this manner, the customer may easily close and substantially seal the interior storage space from the environment so as to minimize or prevent entry of air from the environment into the interior storage space Whereas frozen groceries which are thawed at a quick pace often exhibit a decreased flavour and/or a decreased quality, the inventor has noted that when such frozen groceries are allowed to thaw only very slowly, the flavour and/or quality of the grocery product is substantially maintained. Moreover, the inventor noted that frozen food or groceries may actually be allowed to thaw so as to reach a temperature of around zero degrees centigrade, or even a bit above zero degrees centigrade, and then be refrozen, while maintaining its initial flavour and/or quality completely intact or substantially intact. In this connection it is noted that the grocery bag 20 exhibits an ability to maintain the frozen state of initially frozen groceries during a remarkably long time, thereby maintaining the initial quality and/or flavour of the initially frozen food stored in the bag.

With reference to FIGS. 1, 7 and 8 a customer 60 may easily close the carrier bag 20, e.g. by sliding the "runner" or slider 280, thereby achieving a closed and sealed state 20C of the carrier bag, as shown in FIG. 9. With reference to FIG. 1 the customer 60 may then carry the bag 20 by lifting the handles 170 and thus bring the frozen or chilled groceries to a destination 330, such as e.g. a freezer 310 or fridge 320 in the customer's home.

Figure 18:
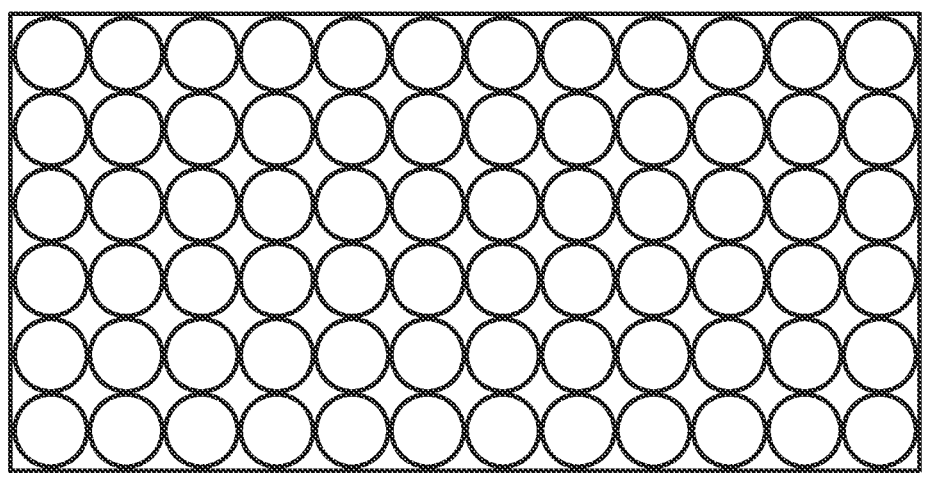
FIG. 18 is an illustration of an embodiment of an insulator device.

FIG. 18 is an illustration of an embodiment of an insulator device. The insulator device may be arranged and positioned on at least a portion of the bottom panel in the interior storage space 100 of the bag 20 so as to reduce heat transfer through the bottom panel. According to an embodiment the insulator device comprises a piece of material being shaped and adapted to provide cellular air cushions so as to reduce heat transfer through said bottom panel.

According to an embodiment the insulator device comprises paper and a substantially water vapour impermeable material. This solution advantageously enables the insulator device to withstand a damp or wet environment without absorbing water. According to an embodiment the substantially water vapour impermeable material of the insulator device comprises at least one layer of a polymer material.

According to another embodiment the insulator device comprises at least one layer of a plastic material. This solution advantageously enables the insulator device to withstand a damp or wet environment without absorbing water. According to an embodiment the insulator device comprises BubbleWrap®.

Figure 19:
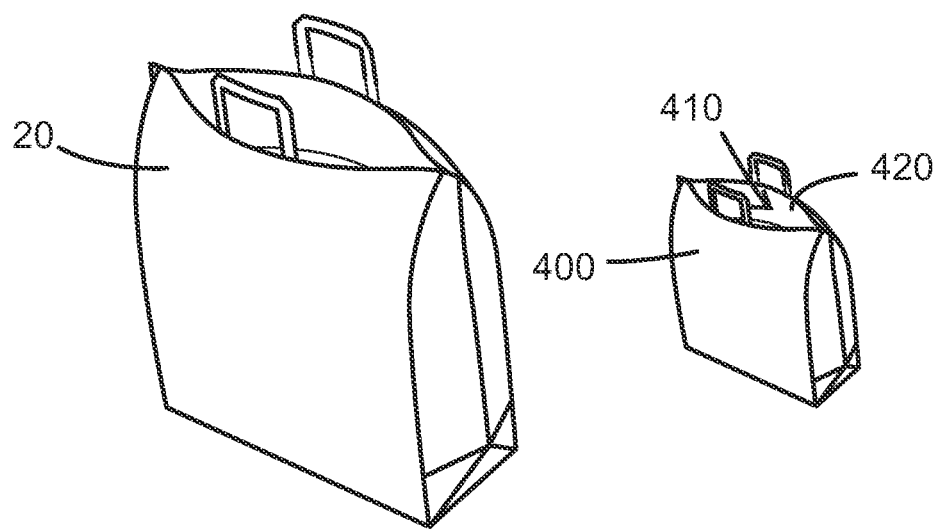
FIG. 19 is an elevational view of an embodiment of the expanded grocery carrier bag in an open expanded state, placed next to an embodiment of a collapsible grocery inner chill bag.

FIG. 19 is an elevational view of an embodiment of the expanded grocery carrier bag 20 in an open expanded state 20B, placed next to an embodiment of a collapsible grocery inner chill bag 400.

The collapsible grocery inner chill bag 400 is suitable for use inside of the carrier bag 20. In likeness to the grocery carrier bag 20, the inner chill bag 400 may have:
- a collapsed state 20A for enabling transportation of the inner chill bag in a substantially flat state, and
- an expanded state such that the inner chill bag, in its expanded state, provides a second interior storage space 410 for transporting chilled and/or frozen grocery packages. The inner chill bag 400 may comprise:
- inner walls and an inner bottom cooperating to form said second interior storage space; wherein a second rim portion of the inner walls facing away from the inner bottom provides an inner bag opening 420. The inner chill bag 400 may have an open expanded state for loading and/or unloading grocery packages to be transported, and
  - a closed expanded state such that the inner chill bag, in its closed expanded state, provides a substantially closed second interior storage space for transporting chilled and/or frozen grocery packages. The inner bag opening 420 may be closable opening which, in the closed expanded state of the inner chill bag 400 cooperates with said inner walls and said inner bottom so as to minimize or prevent entry of air from the environment into the second interior storage space. According to an embodiment the collapsible grocery inner chill bag 400, in its expanded state, is shaped and dimensioned to fit inside of the carrier bag 20.

Figure 20:
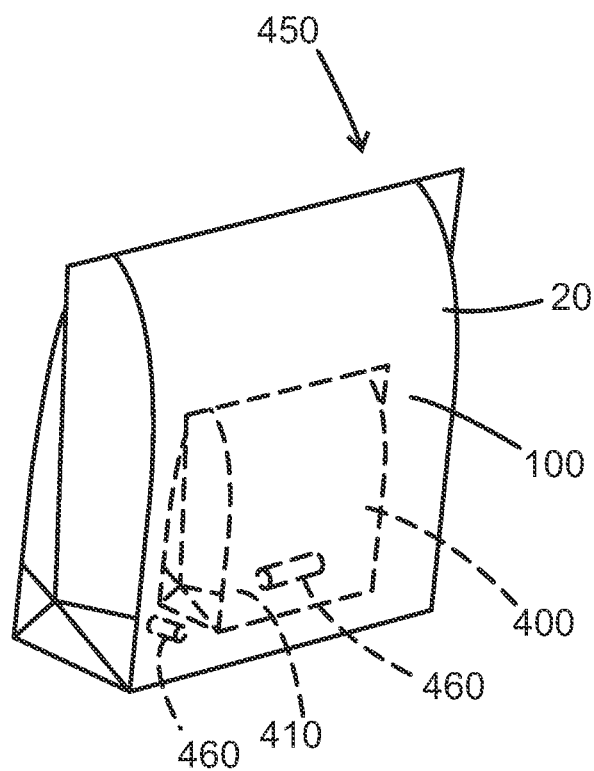
FIG. 20 is an elevational view of an embodiment of a handle-carryable grocery carrier chill bag package.

FIG. 20 is an elevational view of an embodiment of a handle-carryable grocery carrier chill bag package 450. The chill bag package 450 illustrated in FIG. 20 includes an expanded grocery carrier bag 20 in the closed expanded state 20C, and the collapsible grocery inner chill bag 400, in its expanded state; the inner chill bag 400 being shaped and dimensioned to fit inside of the carrier bag 20.

An embodiment of the handle-carryable grocery carrier chill bag package 450 may thus comprise a collapsible handle-carryable grocery carrier chill bag 20 and a collapsible grocery inner chill bag 400. Hence, the handle-carryable grocery carrier chill bag package, in use, may include the collapsible grocery inner chill bag 400 in its closed expanded state; and the collapsible handle-carryable grocery carrier chill bag 20 in its closed expanded state, wherein the collapsible grocery inner chill bag is placed in the interior storage space 100 of the collapsible handle-carryable grocery carrier chill bag 20.

This solution advantageously enables the packing of frozen grocery packages in the second interior storage space 410. This solution therefore enjoys a high thermal resistance from a frozen grocery package in the second interior storage space to the environment outside of the outer handle-carryable grocery carrier bag, since any air inside of the first interior storage space 100 functions as insulation between the second interior storage space and the environment outside of the outer handle-carryable grocery carrier bag. Additionally, there are double barriers for minimizing or preventing entry of air from the environment outside of the outer handle-carryable grocery carrier bag into the second interior storage space when both of the bags are in their closed expanded states, since the second interior storage space is sealed by the closed inner bag as well as by the closed outer bag.

As mentioned above, the interior of the bag 20, when in use, may be initially chilled by the low temperature of frozen or chilled grocery packages which are placed in the interior storage space 100. Although this is sufficient for maintaining the frozen or chilled state of frozen or chilled grocery packages for an extended period of time, the inventor realized that this time period may be further extended.

According to an embodiment, there is provided a means 460 for cooling the interior of the bag 20 so as to enable a further extended period of time during which the frozen or chilled state of frozen or chilled grocery packages is maintained.

According to an embodiment the handle-carryable grocery carrier chill bag package 450 may, in use, further comprise a means 460 for cooling the interior 100 of the bag 20 and/or for cooling the second interior storage space 410.

According to an embodiment of the means 460 for cooling the interior of the bag, there is provided a cooling agent. A piece of dry ice is an embodiment of such a cooling agent.

Dry ice is the solid form of carbon dioxide. The chemical formula of carbon dioxide is $CO_2$. Thus a carbon dioxide molecule comprises two oxygen atoms bonded to a single carbon atom. It is colourless, non-flammable, and slightly acidic. Carbon dioxide can change from a solid to a gas with no intervening liquid form, through a process called sublimation. The opposite process is called deposition, where $CO_2$ changes from the gas to solid phase (dry ice). At earth atmospheric pressure, sublimation/deposition occurs at −78.5° C. Its enthalpy of sublimation is 571 kJ/kg (25.2 kJ/mol).

The density of dry ice varies, but usually ranges between about 1.4 and 1.6 g/cm3. The low temperature and direct sublimation to a gas makes dry ice an effective coolant, since it is colder than water ice and leaves no residue as it changes state. According to an embodiment of the Dry Ice cooling agent, there is provided pellets of dry ice, the size of the pellets being suitable for placing in the interior storage space 100 of the bag 20, when the bag 20 is in use as a chill bag. Thus, as the dry ice pellets gradually change from a solid form to gaseous carbon dioxide with no intervening liquid form (sublimation) there is a corresponding energy consumption of 571 kJ/kg which causes a decrease of the temperature of any food packages surrounding the dry ice pellets. The dry ice may be provided in a piece of a suitable size, dependent on the amount of refrigeration desired. According to an embodiment, a single piece of dry ice may comprise one kilogram of dry ice. According to another embodiment, a single piece of dry ice may comprise e.g. 10 grams of dry ice. According to yet another embodiment, a single piece of dry ice may comprise e.g. 100 grams of dry ice. Such relatively small pieces of dry ice may be referred to as dry ice pellets. One or several dry ice pellets may be used simultaneously in the interior storage space 100 of the chill bag 20, dependent on duration of the period of time it is desired to keep the interior storage space 100 at freezing temperatures.

According to another embodiment of the means for cooling the interior of the bag, there is provided a pressurized container holding a gas.

According to an embodiment, the container may hold pressurized air.

According to another embodiment the container may hold pressurized carbon dioxide gas. The container may be embodied by a cylinder. Thus, the cooling means may comprise a cylinder in which carbon dioxide gas is stored under pressure. The pressurized cylinder may be provided with a valve. According to an embodiment, the valve of the pressurized cylinder is adjustably settable between a completely closed state and a state in which the valve allows pressurized carbon dioxide gas to flow out from the pressurized cylinder. According to a preferred embodiment the valve is settable to a predetermined amount of openness, so as to attain a suitable amount of cooling effect.

According to an embodiment, a user may take a pressurized cylinder having a closed valve, and the user may set the valve to the predetermined amount of openness so as to activate the pressurized cylinder cooling means. The activated pressurized cylinder cooling means is placed in the interior storage space 100 of the chill bag 20, together with frozen or chilled grocery packages.

As the carbon dioxide gas, or air, exits from the pressurized cylinder and enters the comparatively much lower pressure (earth atmospheric pressure) in the interior storage space 100 of the chill bag 20 there is a corresponding drop in the temperature of the exiting gas, thus causing a cooling effect. Additionally, the carbon dioxide, or air, slowly seeping out of the pressurized cylinder may cause a slight increase in the pressure of the air inside of the chill bag 20. This slight increase in the pressure of the air inside of the chill bag 20 may advantageously further minimize or prevent entry of air from the environment into the interior storage space 100 of the chill bag 20. According to an embodiment of the bag 20, there is provided a valve in one of the walls of the bag 20 so as to prevent any build-up of any significant pressure in the bag 20. The valve may be a check valve adapted to allow passage of air only in the direction from the interior storage space 100 of the chill bag 20 to the surrounding environment.

Hence, the cylinder containing pressurized carbon dioxide gas may interact with the chill bag 20 such that when a grocery package comprising frozen food is transported in said interior storage space the grocery bag is adapted to minimize or prevent entry of air from the environment into the interior storage space (100) by providing a controlled flow of gaseous carbon dioxide from the interior storage space to the environment. This solution may advantageously further minimize or prevent the occurrence of condensation within the interior storage space (100).

According to an embodiment, cylinder containing pressurized carbon dioxide may be kept in a freezer at a temperature of about −18° C. (degrees Centigrade). The carbon dioxide pressure in the pressurized cylinder may then be about 18 bar. In this manner, the low initial temperature pressurized cylinder will also contribute to maintaining a frozen or chilled state of any grocery package comprising frozen food being transported in the interior storage space 100 of the chill bag 20. According to an embodiment, the pressurized carbon dioxide cylinder may contain e.g. 2 kg of carbon dioxide at 0.75 kg of carbon dioxide per litre of cylinder volume. According to another embodiment, the pressurized carbon dioxide cylinder may contain carbon dioxide at 0.67 kg of carbon dioxide per litre of cylinder volume. According to an embodiment the pressurized carbon dioxide cylinder may contain less than 0.5 kg of carbon dioxide at a filling level of less than 0.75 kg of carbon dioxide per litre of cylinder volume. According to an embodiment the pressurized carbon dioxide cylinder may initially contain less than 0.5 kg of carbon dioxide at a filling level of less than 0.67 kg of carbon dioxide per litre of cylinder volume. One or several pressurized carbon dioxide cylinders may be used simultaneously in the interior storage space 100 of the chill bag 20, dependent on duration of the period of time it is desired to keep the interior storage space 100 at freezing temperatures.

According to yet another embodiment of the means for cooling the interior of the bag, there is provided an ice pack for retaining a frozen temperature for an extended period of time. According to an embodiment of the cooling means, the ice pack may comprise a sachet containing a gel that can be frozen and that retains a frozen temperature for an extended period of time. According to an embodiment, an ice pack may comprise a sachet made of PE material, and the gel filled sachet may have a weight of about 100 grams (0.1 kg). One or several ice packs may be used simultaneously in the interior storage space 100 of the chill bag 20, dependent on duration of the period of time it is desired to keep the interior storage space 100 at freezing temperatures.

A Container Production Method

FIG. 28A shows a flowchart of a method 1300 for providing a carrier bag. The method 1300 starts with step 1301. In step 1301 a carrier bag is provided, wherein said carrier bag has a carrier bag enclosure formed by a front wall panel S1A, a back wall panel S1B, two mutually opposing side wall panels S2A, S2B. Said carrier bag further has a substantially rectangular bottom portion BP. Said wall panels and said bottom portion BP of said carrier bag cooperate to form said enclosure. A portion of said wall panels facing away from said bag bottom comprises a closable enclosure opening. After step 1301 the method 1300 ends.

FIG. 28B shows a flowchart of a method 1302 for providing a carrier bag. The method 1302 starts with step 1303. In step 1303 a collapsible carrier bag is provided, wherein said collapsible carrier bag has a collapsed state for enabling transportation of the carrier bag in a substantially flat state, and an expanded state for transporting food items in a carrier bag enclosure which, in the expanded state of the carrier bag, has a volume larger than 10 litres. Said carrier bag further can have a front wall panel S1A, a back wall panel S1B, two mutually opposing side wall panels S2A, S2B. Said carrier bag further can have a substantially rectangular bottom portion BP. Said wall panels and said bottom portion BP of said carrier bag can cooperate to form an enclosure. This enclosure can be a carrier bag enclosure. A portion of said wall panels facing away from said bag bottom can comprise a closable enclosure opening.

FIG. 29 shows a method 1305 for providing a transport container. Said transport container can be a collapsible carrier bag.

Figure 36A:
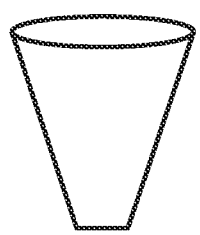
FIG. 36 is an illustration of an example of a pre-determined pattern.
Figure 36B:
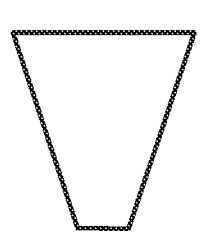
Figure 39:
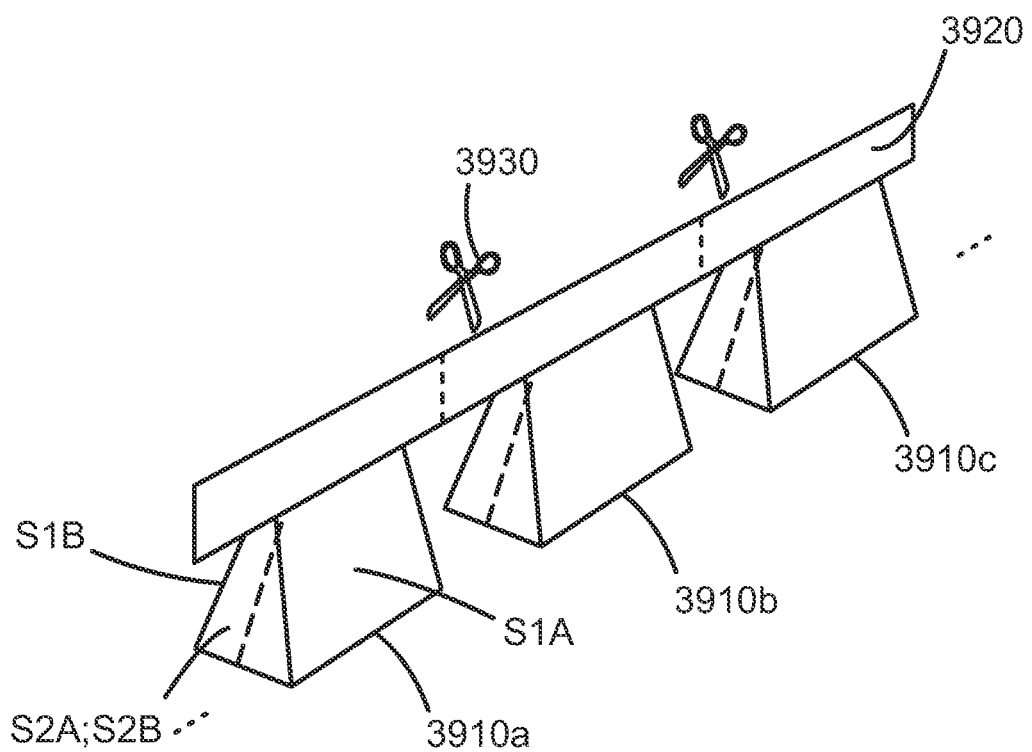
FIG. 39 is an illustration of an example of a pre-determined pattern.

The method 1305 will be illustrated in several examples which can be seen in FIGS. 36-46. FIGS. 36, 38, and 39 show examples of pre-determined patterns. The pre-determined patterns there can then be formed and folded to provide a bag as will be described in the following. In FIGS. 36, 38, and 39 solid lines show the outer borders of the pre-determined patterns and possible cuts in these patterns. In the other figures out of FIGS. 36-46, solid lines show the borders of the bag, or the bag-to-be respectively, or parts thereof, as seen from the viewing direction. In the three-dimensional views, solid lines can also show lines where the bag or the bag-to-be has been folded. The dashed lines show possible folding edges in FIGS. 36-44. In FIGS. 48-49 dashed lines show elements or parts of elements which are covered by another element when seen in the viewing direction. The areas delimited by dotted lines in FIGS. 36-44 show areas which are described in the following. These areas might be delimited by folding edges and/or borders of a sheet or other physical borders. These areas might, however, also be thought areas which do not necessarily have physical borders, as can for example be seen by the horizontal lines of the triangles 4030a, 4030b, 4030c, 4030d in FIG. 36. It should be understood that the dotted lines delimitating these areas are basically always drawn slightly outside the areas which they should delimit in the figures. This is to make the dotted lines visible in the figures, as they otherwise often might be covered by solid lines and/or dashed lines.

Figure 40:
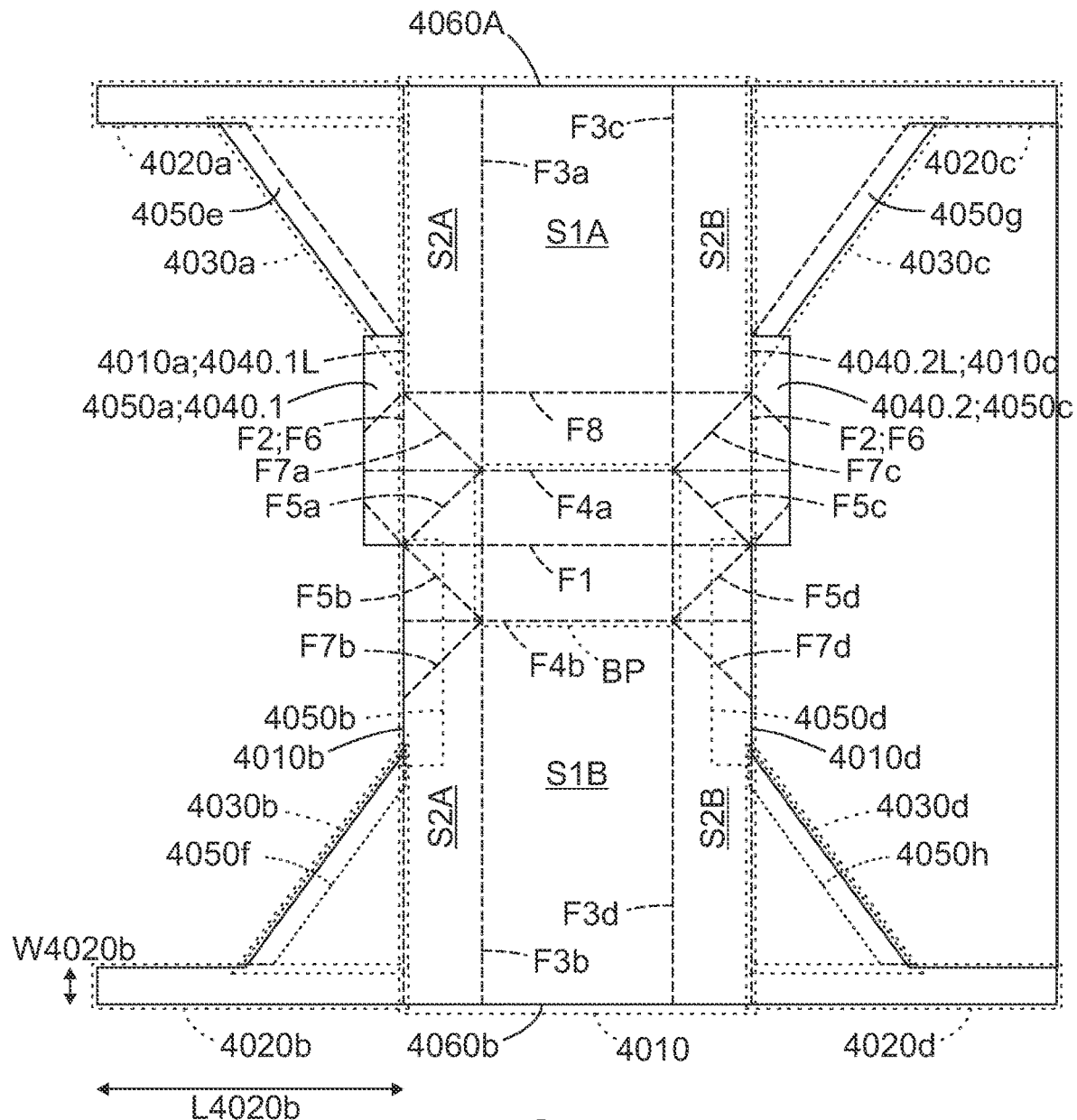
FIG. 40 shows a protrusion at a front panel.
Figure 41:
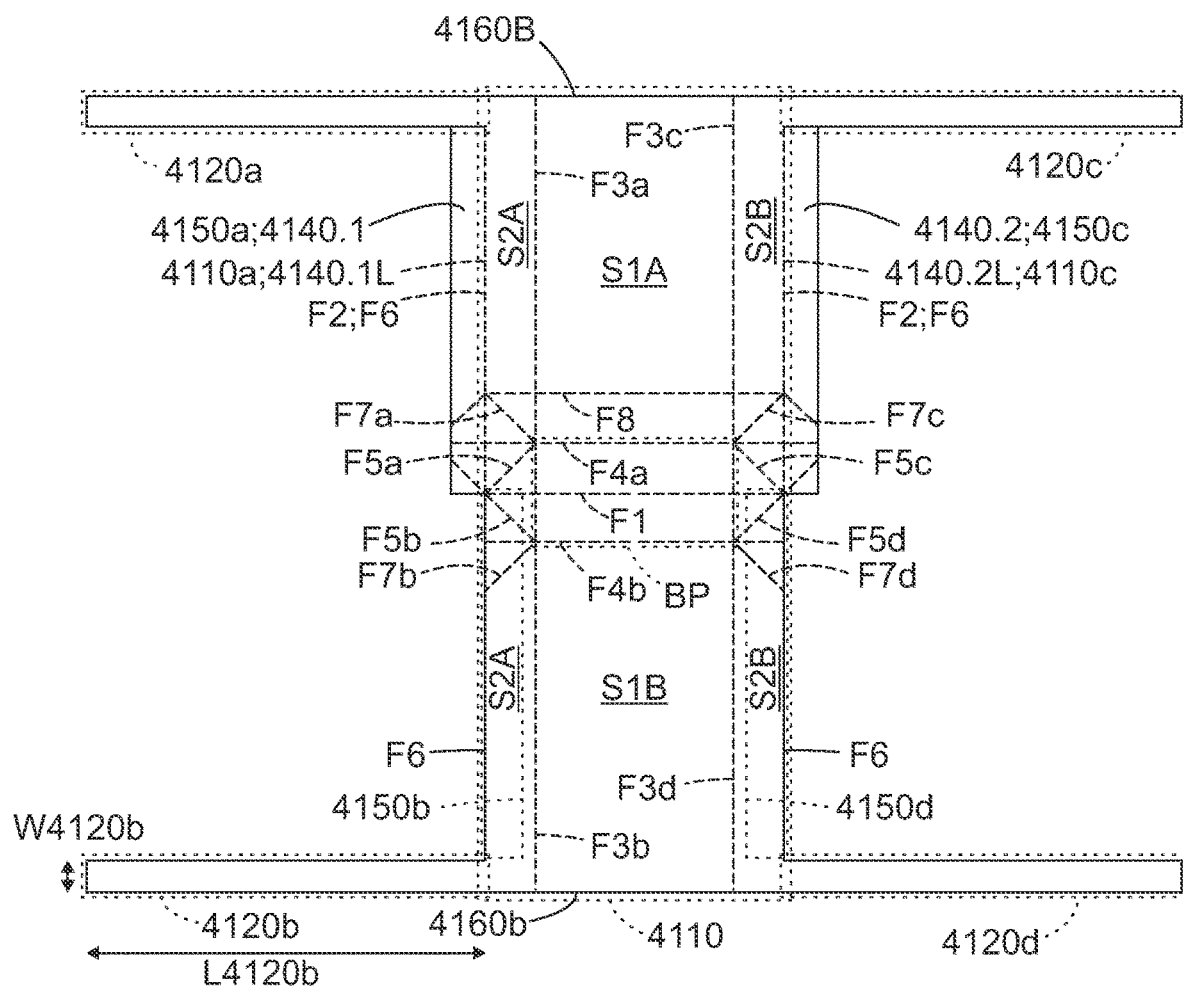
FIG. 41 shows a side view of a protrusion.
Figure 42:
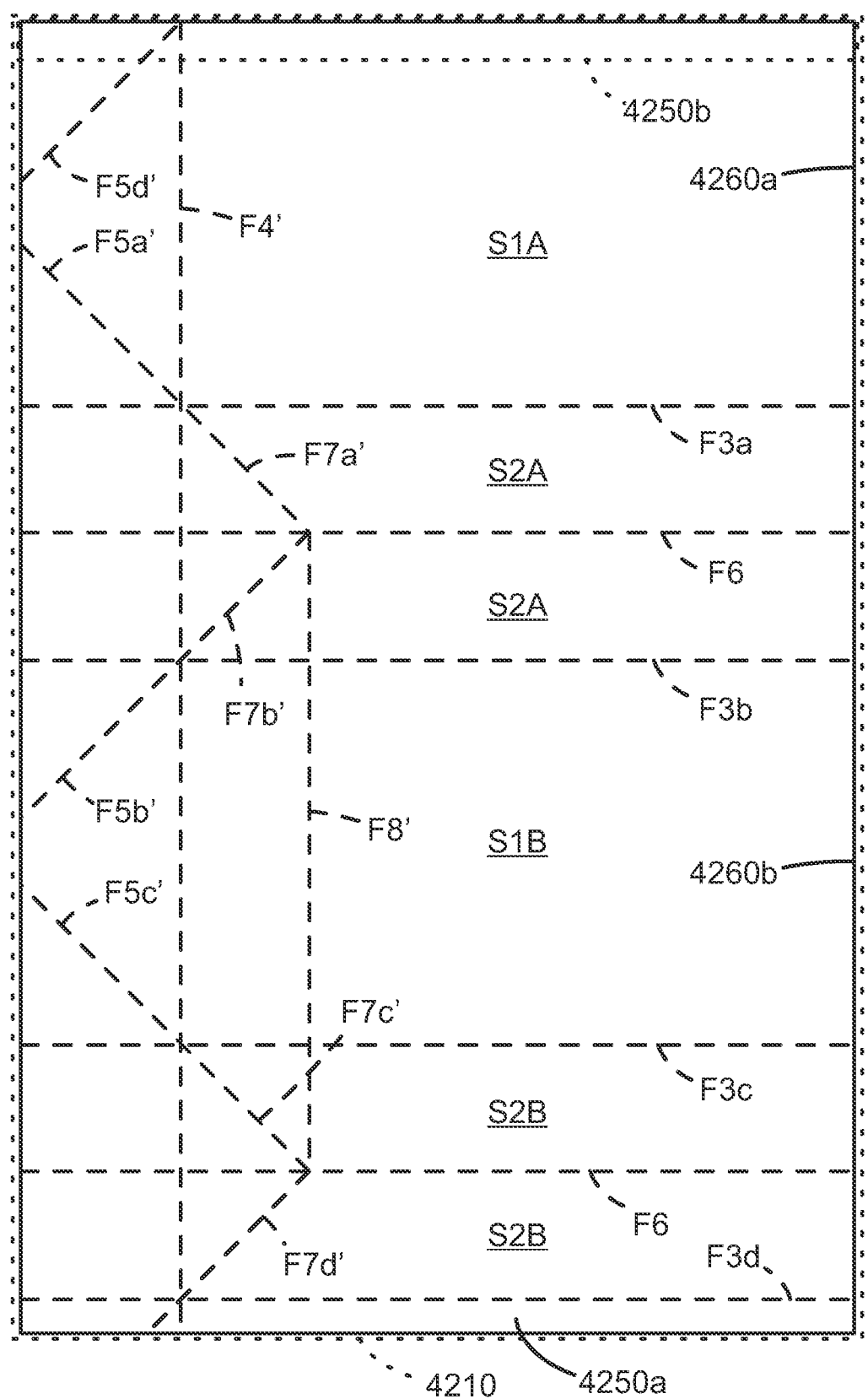
FIGS. 42A-C are illustrations of examples of handles.
Figure 43:
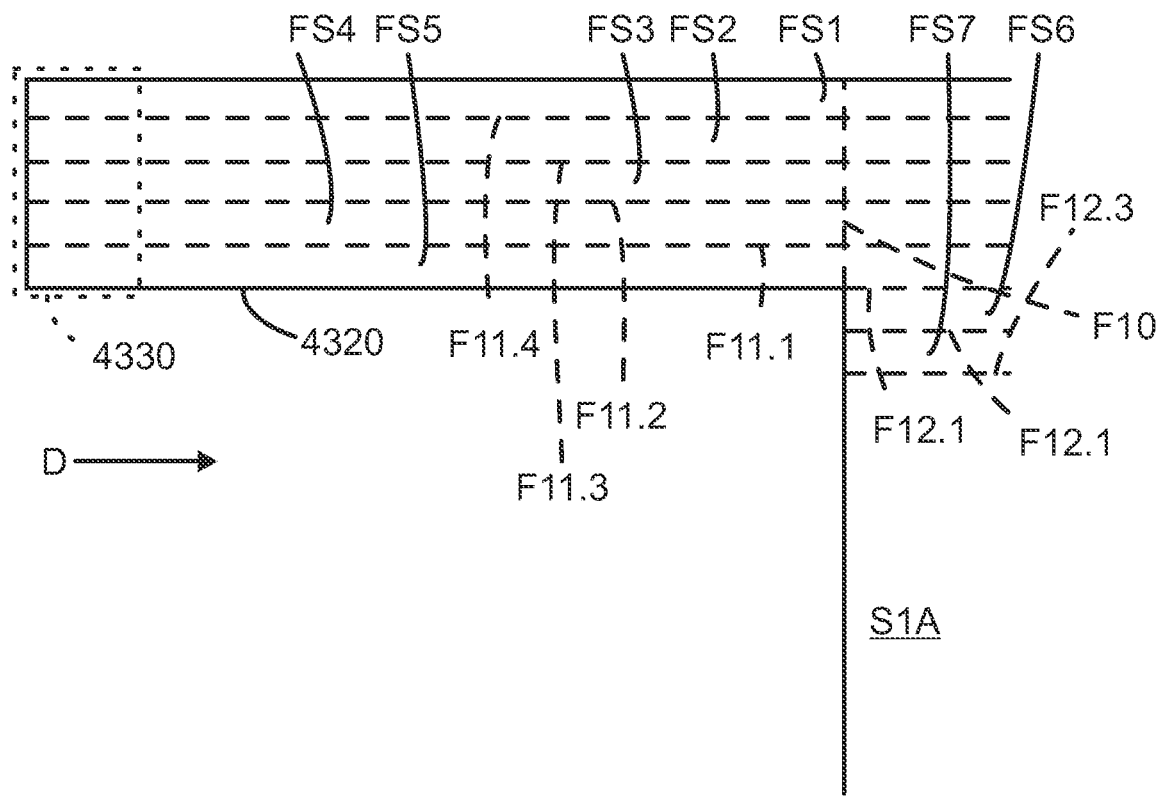
FIG. 43A is an illustration of a flat state of a carrier with a handle.
FIG. 43B is an illustration of bag is in an expanded state.

The half dashed lines in FIG. 37A-37N show some lines along which the bag or the bag-to-be has been folded and which are covered by other elements when seen in the viewing direction. All figures out of FIGS. 36-46 are front view, except FIGS. 37F, 37H, 37J, 37L, and 37N which are elevated views of the bag, or the bag-to-be and thus provide a three-dimensional view. FIG. 41 is another example and shows a side view in the viewing direction D of FIG. 40. The side view is, however, of a different state of the part of the bag which is shown in FIG. 40. This will be explained in more detail later on.

FIGS. 37A-N show possible steps of how the pre-determined pattern from FIG. 36 can be formed and folded to arrive at a bag. The bag can be a flattened bag according to the invention. The figures are in a possible chronological order, where the elevated views correspond to the front views above them. FIG. 37N is an alternative to what is shown in FIG. 37F. One of the big differences between FIG. 36 and FIG. 38 are said triangles 4030a, 4030b, 4030c, 4030d which are not present in FIG. 38. The pattern in FIG. 38 could, however be formed and folded in a corresponding way as is shown in FIG. 37A-37M when one would remove the triangles from these figures. Since the triangles are well visible in FIG. 37A-37M and it would be clear how to fold the pattern when it does not have triangles, an explicit sketch of the folding procedure of FIG. 38 is omitted.

In FIG. 37A-37N, only examples of the most important folding edges for the current steps of the method 1305 are shown for not overloading the figures. These shown folding edges correspond preferably to the folding edges in FIG. 36. The dashed arrows indicate the directions towards which areas along the shown folding edges can be folded in preferred examples. Straight solid arrows without reference numbers show directions in which the bag or the bag-to-be can be pulled or pushed, depending on the direction of the arrows.

When looking at FIG. 36 or FIG. 38, the area which is delimitated by the uppermost horizontal solid line and by the folding edges F3a, F3c, and F4a can at the end of method 1305 form the front panel S1A of the bag. The area which is delimitated by the lowermost horizontal solid lines and the folding edges F3b, F3d, and F4b can at the end of method 1305 form the back panel S1B of the bag. The two areas which are delimitated by the folding edges F6 on the left side of the figure, F3a, F4a, and by the uppermost horizontal line, respectively by the folding edges F6 on the left side of the figure, F3b, F4b, and by the lowermost horizontal line can at the end of method 1305 form one side panel S2A of the bag. The two areas which are delimitated by the folding edges F6 on the right side of the figure, F3c, F4a, and by the uppermost horizontal line, respectively by the folding edges F6 on the right side of the figure, F3d, F4b, and by the lowermost horizontal line can at the end of method 1305 form another side panel S2B of the bag. The bottom portion BP can at the end of method 1305 be formed by the area which is delimitated by the folding edges F4a, F4b, and the two vertical folding lines of which the folding edges F3a and F3b, and F3c and F3d, respectively, are part of.

In FIG. 39 the front panel S1A, the back panel S1B, and the side panels S2A, S2B can at the end of the method 1305 be delimitated on one side by the folding edge F4' and on another side by the leftmost solid vertical line in the figure. The front panel S1A can further be delimitated by the folding edge F3a and by the uppermost solid horizontal line of the figure. The back panel S1B can further be delimitated by the folding edges F3b and F3c. One side panel S2A can further be delimitated by the folding edges F3a and F3b. Another side panel S2B can further be delimitated by the folding edges F3c and F3d. The area delimitated by the folding edge F4', by the leftmost solid vertical line, by the uppermost horizontal line, and by the lowermost horizontal line can be part of the bottom portion BP of the bag. The outer portions of the bottom portion can at the end of method 1305 preferably be constituted by the folding edge F4'. In one example the bottom portion BP will at the end of method 1305 have a substantially rectangular shape with the four sides of the rectangular shape being constituted by the section of F4' between the uppermost horizontal solid line and folding edge F3a, by folding edge F3a and folding edge F3b, by folding edge F3b and folding edge F3c, and by folding edge F3c and folding edge F3d, respectively.

The method 1305 starts with step 1310.

In step 1310 a sheet is provided. The provided sheet may be a substantially planar sheet of a multilayer material. Said substantially planar sheet has a first sheet surface and a second sheet surface on opposite sides of the substantially planar sheet. The multilayer material comprises preferably a layer of kraft paper having a substantially water vapour impermeable membrane bonded to at least one side of the kraft paper layer. The method 1305 continues with step 1320.

In step 1320, said sheet is cut. The cut is done according to a pre-determined pattern so that a resulting planar sheet has at least two edges. Some examples of pre-determined patterns are given in FIGS. 36-39.

In one example, the pre-determined pattern is substantially rectangular 4210. An example is shown in FIG. 39. In one example, the pre-determined pattern comprises a substantially rectangular base pattern 4010, 4110, further comprising at least one protrusion 4020, 4120 at or close to at least one of the corners of the rectangular base pattern. In one example said at least one protrusion 4020, 4120 is at least two protrusions 4020a, 4020c; 4020a, 4020b; 4120a, 4120c; 4120a, 4120b; . . . In one example said at least one protrusion 4020, 4120 is at least four protrusions 4020a, 4020b, 4020c, 4020d; 4120a, 4120b, 4120c, 4120d. In one example two protrusions are at or close to two corners of the rectangular base pattern 4010, 4110. In one example four protrusions are at or close to the four corners of the rectangular base pattern 4010, 4110. In one example said at least one protrusion 4020, 4120 comprises at least one protrusion having a substantially rectangular form, for example two protrusions 4020a, 4020c; 4020a, 4020b; 4120a, 4120c; 4120a, 4120b; . . . or four protrusions 4020a, 4020b, 4020c, 4020d; 4120a, 4120b, 4120c, 4120d having a substantially rectangular form. A shorter side of said protrusions 4020, 4120 is preferably oriented parallel or at least substantially parallel to a long side of the substantially rectangular base pattern 4020, 4120. As a result the long sides of said protrusions 4020, 4120 are preferably parallel or at least substantially parallel to a short side of the substantially rectangular base pattern 4020, 4120. The long sides of the protrusions 4020, 4120 are preferably much longer than the short sides of the protrusions 4020, 4120. This is in one example for enabling forming a handle of the protrusions 4020, 4120, as will be described later on in more details. In one example the long sides are at least twice, thrice, four times, six times, or eight times as long as the short sides. An example is shown in FIG. 38. Examples of short sides in FIG. 36 and FIG. 38 are W4020b and W4120b. Examples of long sides in FIG. 36 and FIG. 38 are L4020b and L4120b. It should be understood that also the other protrusions 4020, 4120 in these figures have corresponding long and short sides, which are however, not especially denoted in the figures for not overloading them.

Even other shapes of protrusions or base patterns are possible. In one example the protrusion has the shape of a rectangle 4020 with an attached triangle 4030. In one example one side of the triangle attaches the longer side of the rectangle and another side of the triangle attaches the longer side of the base pattern. An example can be seen in FIG. 36. Such a pattern would allow a more convenient opening of the bag when in use. This can be seen in FIG. 37N, where such a bag has a larger opening on the top compared to the size of the bottom. This might make it especially easy to put products in the bag. It has also the advantage that the protrusion attaches to a side panel S2A, S2B, or another part of the bag-to-be, along a longer line than without a triangle. This might distribute lifting forces better between handle/and or closure and the bag and thus increase the stability of the bag.

In one example the shape of a substantially rectangular base pattern extends on its shorter sides into a bottle-like shape, i.e. a shape which narrows, and thus has a diameter which is shorter than the short side of the substantially rectangular base pattern, and then extends again. After extending again it can have a diameter which is longer than the short side of the substantially rectangular base pattern.

In one example the pre-determined pattern comprises at least one or two openings 4510. This at least one or two openings 4510 have preferably such a size that the four fingers of a human hand, preferably of a grown-up person, easily can get through at least one or two of these openings. The openings 4510 are then intended to provide the handle 4520, 4530 when the carrier bag is used.

In one example the pre-determined shape comprises two additional rectangular or substantially rectangular shapes 4040.1, 4040.2; 4140.1, 4140.2 which are attached to the substantially rectangular base pattern 4010, 4110. The two additional rectangular shapes 4040.1, 4040.2; 4140.1, 4140.2 preferably have long sides 4040.1L, 4040.2L; 4140.1L, 4140.2L which are equal or less than half of a long side of the rectangular base pattern 4010, 4110. The two additional rectangular shapes 4040.1, 4040.2; 4140.1, 4140.2 are preferably oriented in such a way that one of their long sides 4040.1L, 4040.2L; 4140.1L, 4140.2L attaches to one of the long sides 4010a, 4010b; 4010c, 4010d; 4110a, 4110b; 4110c, 4110d of the rectangular base pattern 4010, 4110 each. The two additional rectangular shapes 4040.1, 4040.2; 4140.1, 4140.2 are preferably also situated in such a way that at least half 4010b, 4010d, 4110b, 4110d of each long side 4010a, 4010b; 4010c, 4010d; 4110a, 4110b; 4110c, 4110d of the rectangular base pattern 4010, 4110 is not covered by the two additional rectangular shapes 4040.1, 4040.2; 4140.1, 4140.2. The not-covered half 4010b, 4010d, 4110b, 4110d of each long side of the rectangular base pattern 4010, 4110 is preferably connected and thus not intercepted by one of the two additional rectangular shapes 4040.1, 4040.2; 4140.1, 4140.2.

The pre-determined pattern is preferably arranged in such a way that an overlap 4050, 4150, 4250 will be provided in step 1340. This overlap 4050, 4150, 4250 will be constituted by a first overlap area 4050a, 4050c, 4050e, 4050g; 4150a, 4150c; 4250a and a second overlap area 4050b, 4050d, 4050f, 4050h; 4150b, 4150d; 4250b. The first overlap area 4050a, 4050c, 4050e, 4050g; 4150a, 4150c; 4250a is preferably on the first sheet surface and the second overlap area 4050b, 4050d, 4050f, 4050h; 4150b, 4150d; 4250b preferably on the second sheet surface. The first and the second overlap area are preferably equal in size. One example of how an overlap will be provided is given in step 1330. In another example, said two additional rectangular shapes 4040.1, 4040.2; 4140.1, 4140.2 are one part of the overlap which is referred to in step 1340. The first sheet surface parts of the two additional rectangular shapes 4040.1, 4040.2; 4140.1, 4140.2 are, for example, a first overlap area 4050a, 4050c; 4150a, 4150c.

After step 1320 an optional step 1331 and/or an optional step 1330 is performed. In step 1330 said sheet is formed or folded into a substantially tubular shape. The tubular shape is preferably such that the at least two edges overlap so as to allow a first overlap area 4250b of the first sheet surface to meet a second overlap area 4250a of the second sheet surface. The first sheet surface forms then an interior surface of the-bag-to-be. It should be understood that in another example the reference 4250a could denote the first overlap area and the reference 4250b the second overlap area. Performing a forming or folding into a tubular shape can give the advantage that only one first overlap area 4250b and only one second overlap area 4250a are needed, thus only requiring a small number of production steps when these areas are attached to each other.

In step 1331 said sheet is folded. In one example said folding is performed in such a way that substantial parts of the base pattern overlap each other. In one example, at least 60% of the area of the base pattern overlaps each other. In one example, the amount of the area of the base pattern which overlaps each other is at least 70%, at least 80%, at least 90%, or at least 95%. In case the pre-determined shape is substantially rectangular 4210 or has a substantially rectangular base pattern 4010, 4110, the sheet is preferably folded along a line F1 which is parallel or at least substantially parallel to the short sides of the rectangular shape 4010, 4110, 4210. Said line F1 is preferably equidistant or at least substantially equidistant from the short sides of said rectangular shape 4010, 4110, 4210. In one example the folding is performed in such a way that approximately half of the rectangular base pattern 4010, 4110 covers the other half of the rectangular base pattern 4010, 4110. The folding is preferably done in such a way that a part of the first sheet surface faces to another part of the first sheet surface. An example of the result of such a folding is given in FIG. 37A and FIG. 37B.

The step of folding can also comprise providing folding edges on the base pattern 4010, 4110. In one example, when the pre-determined pattern comprises said two additional rectangular shapes 4040.1, 4040.2; 4140.1, 4140.2, folding edges F2 are provided basically where these two additional rectangular shapes 4040.1, 4040.2; 4140.1, 4140.2 attach to the rectangular base pattern 4010, 4110. Further examples of folding edges which can be provided are described in relation to step 1350 or to step 1360. It should be understood that the kind of folding edges being described there easily could be provided already in step 1331.

After the optional steps 1330 and/or 1331 the step 1340 is performed.

In step 1340 the first overlap area 4050a, 4050c, 4050e, 4050g; 4150a, 4150c; 4250a is attached to the second overlap area 4050b, 4050d, 4050f, 4050h; 4150b, 4150d; 4250b. An example is shown in FIG. 37B. In case the pre-determined base pattern comprises said two additional rectangular shapes 4040.1, 4040.2; 4140.1, 4140.2, the second overlap area 4050b, 4050d, 4050f, 4050h; 4150b, 4150d; 4250b can be constituted a part of the second sheet surface of the rectangular base pattern 4010, 4110, which part has approximately the same shape as said two additional rectangular shapes 4040.1, 4040.2; 4140.1, 4140.2. Said part is preferably constituted by the part of the rectangular base shape 4010, 4110 which can be achieved when mirroring said two additional rectangular shapes 4040.1, 4040.2; 4140.1, 4140.2 at the long sides 4040.1L, 4040.2L; 4140.1L, 4140.2L of the rectangular base pattern 4010, 4110 and on said line F1 in step 1331. However, many other possibilities are possible of what can be the first and the second overlap area. The attaching is in one example done by gluing. In one example the attaching is done by melt-bonding.

In one example, parts or the whole of the protrusions 4020a, 4020b, 4020c, 4020d; 4120a, 4120b, 4120c, 4120d are attached on overlap areas. In one example, some of the protrusions, for example 4020a, 4020b; 4120a, 4120b have a different length than the other protrusions, for example 4020c, 4020d; 4120c, 4120d. The protrusions with the longer length can then provide a first overlap area and the protrusions with the shorter length can then provide a second overlap area. The first overlap area corresponds in one example to the area formed by the length difference between the protrusions with the longer and the shorter length. The second overlap area can in this example correspond to an area of corresponding size at the protrusions with the shorter length. This is described in more detail in relation to 43. After step 1340 the method continues with step 1350.

In step 1350 the sheet is formed or folded so as to form outer surfaces of the transport container. Said outer surfaces are in one example a front panel S1A, a back panel S1B, and two mutually opposing side panels S2A, S2B of the-bag-to be. An example is shown in FIG. 37C-37F. It should be understood that folding edges corresponding to those in FIG. 37C and FIG. 37D are present on the other side of the bag-to-be. These corresponding folding edges are shown in FIG. 36. The corresponding edges are preferably folded as well, as is indicated by the dashed arrows in FIG. 37C and FIG. 37D which indicate preferably different folding directions for the folding edges shown in the figures and the corresponding folding edges on the other side of the bag-to-be. FIG. 37N is an alternative example of how FIG. 37F could look like. In FIG. 37F, for example, the protrusions could have been directly attached to each other, for example for providing a very stable connection between protrusions and the side panels of the bag. In FIG. 37N the triangular protrusions are not attached to each other, except via the previous described overlap areas. This allows a greater opening of the bag. The outer parts of the protrusion which have a substantially rectangular shape might well be attached to each other also in FIG. 37N. Similar alternatives as between FIG. 37F and FIG. 37N could easily be presented for FIGS. 37H, 37J, and 37L, but are not shown here since the difference in shape of the bag would correspond to the difference in shape of the bag between FIG. 37F and FIG. 37N. In one example the forming or folding of the sheet is done in such a way that a substantially cuboid-like base-form is achieved. In one example this is done in such a way that a substantially parallelepiped-like base-form is achieved. The surface area of the parallelepiped-like base-form comprises preferably four substantially rectangular areas. These four substantially rectangular areas are on four different sides of the parallelepiped-like base-form. In the following we will refer to the parallelepiped-like base-form as the cuboid is a special form of it.

The front panel S1A and the back panel S1B of the bag-to-be are preferably two mutually opposing sides of the parallelepiped. The two mutually opposing side panels S2A, S2B of the-bag-to be are preferably two mutually opposing sides of the parallelepiped. In one example the front panels S1A, the back panel S1B, and the two mutually opposing side panels S2A, S2B have substantially rectangular shapes. One side of each side panel S2A, S2B attaches to a side of the front panel S1A and one side of each side panel S2A, S2B attaches to a side of the back panel S1B. Preferably, the attaching sides between the side panels S2A, S2B and the front panel S1A and the back panel S1B comprise folding edges F3, for example folding edges F3a, F3b, F3c, and F3d.

In one example a mid-fold F6 is provided in each of the side panels S2A, S2B. The mid-fold F6 of a side panel runs in one example in a direction substantially parallel to a fold where that side panel S2A, S2B connects with the front panel S1A, for example fold F3. In one example the mid-folds F6 are provided at a later step, for example at step 1370.

In one example no bottom and no closure are provided yet. Thus two opposing sides of the parallelepiped-like base-form are in one example not covered by the sheet in step 1350.

In another example, especially if a folding along said line F1 in step 1330 was performed, only one side of the parallelepiped-like base-form is not covered by the sheet in step 1350. In that case the sheet is folded along a folding edge F4 which is substantially parallel to said line F1 in step 1330. This folding edge F4 is on all four panels of the bag to be. Although the folding edge F4 usually will be continuous or close to continuous when the providing of the bag is finished, the folding edge F4 might not be continuous at this point yet. Thus, the folding edge F4 does in one example comprise two folding edges F4a and F4b. The folding is preferably in such a way that the folding is towards the first sheet surface at the front panel S1A and the back panel S1B. The folding is preferably in such a way that the folding is towards the second sheet surface along the side panels S2A, S2B. After that folding, a bottom panel will be provided in addition to the other four panels S1A, S1B, S2A and S2B. For achieving that, preferably four additional folding edges F5, for example F5a, F5b, F5c, and F5d, are provided. These four additional folding edges F5 are preferably towards the first sheet surface. These four additional folding edges preferably start from the points where the folding edge F4 intercepts the folding edges F3 and end at an end point of the line F1. The end point of line F1 is preferably the end point which is closest to the start of the respective folding edge F4.

The method can continue with the optional step 1360.

Figure 32:
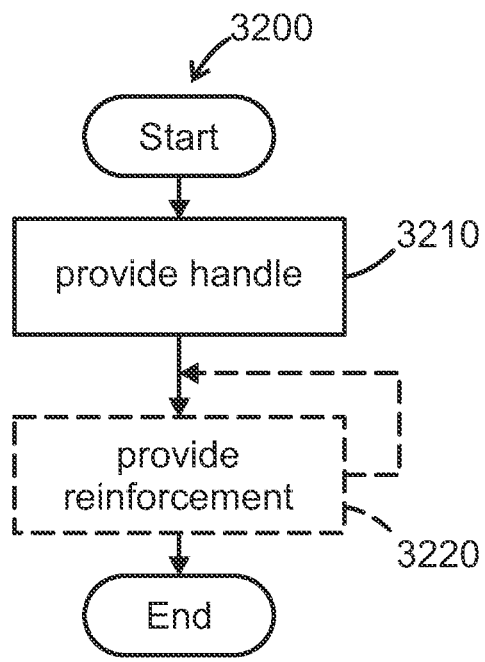
FIG. 32A is an elevated view of a cone shaped container in its expanded state.
FIG. 32B is an illustration of a cone shaped container in its flat state.

In step 1360 a bottom is created. An example is given in FIG. 37E-FIG. 37J. The creation of the bottom is done in by forming or folding the multilayer sheet so as to create a bottom portion BP of the bag-to-be. The bottom portion BP connects the panels S1A, S1B, S2A, and S2B. Thereby a semi-manufactured bag is obtained, which in an expanded state exhibits four wall panels, a bag bottom panel and a bag opening. The bag opening is preferably formed by an opening rim of the four wall panels facing away from the bag bottom. If, for example, a transport container according to FIG. 32A and FIG. 32B is provided, a creation of the bottom might not be necessary.

In one example, the forming of the bag bottom comprises folding the sheet along a folding edge F4', F4 which is substantially perpendicular to the folding edges F3. In one example, at least some of the folding described here, is already performed at an earlier step, for example at step 1330. This could, for example, be a folding along the folding edge F4.

In one example the folding along the folding edge F4' is towards the first sheet surface. Further, additional four folding edges F5', for example F5a', F5b', F5c', and F5c' are provided. These four addition folding edges F5' preferably start at the interception of the folding edge F4' with the folding edges F3. These four additional folding edges F5' preferably enclose an angle of substantially 45 degrees to the folding edge F4'. These four folding edges are situated on the bottom portion BP. In one example, after folding along the four folding edges F5, F5', overlapping areas due to that folding are attached, for example via bonding or gluing.

In one example, the distance between the folding edge F4' and a bottom edge of the sheet is larger than the length of the folding edge F4' on the side panels S2A, S2B. By that it is assured that there will be overlapping portions of the parts of the sheets which attach to the front panel S1A and the back panel S1B and which are folded along the folding line F4'. These overlapping portions are preferably attached, for example via bonding or gluing.

In one example, in case a folding along the folding edge F4 has been previously performed towards the second sheet surface, this folding is now performed in the reverse direction. After that a substantially rectangular bottom portion BP is achieved. Overlapping portions due to the folding in the reverse direction are in one example attached, for example via bonding or gluing.

Creating a bottom of a pre-determined pattern like in FIG. 36 or in FIG. 38 has the advantage that there will be no gap at the bottom of the bag. As can be seen from these figures, the bottom portion BP comprises a connected substantially rectangular part of the sheet which covers the whole bottom portion BP. This is in contrast to the bottom portion from a pre-determined pattern like in FIG. 39, where one first has to overlap some parts of the pre-determined pattern to cover the whole bottom portion. An advantage of having no gap in the bottom portion is that no way is provided for moisture from the ground to enter the space of the bag through the bottom portion BP. Further, an air exchange will be prevented as well. In one example, creating the bottom area comprises adding additional elements to the bag to be. This additional element can for example be an insulator device. The insulator device can comprise a piece of material being shaped and adapted to provide cellular air cushions so as to reduce heat transfer through said bottom panel BP. According to an embodiment, the insulator device comprises paper and a substantially water vapour impermeable material. In one embodiment the substantially water vapour impermeable material of the insulator device comprises at least one layer of a polymer material. The insulator device can, for example, be put in the bag through the bag opening. The insulator device can have substantially the same from and size as the bottom panel BP. In such a way it can cover the whole bottom panel BP after inserting it. This could make the bag and/or the insulator device to withstand a damp or wet environment without absorbing water. The insulator device can be attached to the bottom panel BP from the inside of the bag. The insulator device can also be put loosely on the bottom panel BP from the inside of the bag. The insulator device can also be attached to the bottom panel BP from the outside of the bag.

The method continues with step 1370.

In step 1370 the semi-manufactured bag is collapsed. An example is given in FIG. 37K-M. This collapsing is done by folding along a folding edge where the front panel S1A connects with the bottom panel, for example along folding edge F4. In case not being provided before, a mid-fold F6 in each of the side panels S2A, S2B can be provided, the mid-fold F6 of a side panel running in a direction substantially parallel to a fold where that side panel S2A, S2B connects with the front panel, for example F3.

In one example the collapsing step is performed such that a side panel mid-fold F6 is bent outwardly so as to cause a foremost interior surface portion of that side panel to face a backmost secondary interior surface portion of that side panel. In another example the collapsing step is performed in such a way that a side panel mid-fold F6 is bent inwardly so as to cause one interior surface of each side portion to face an interior surface of the front panel, and to cause another interior surface of each side portion to face an interior surface of the back panel.

In a preferred example, two or four collapsing folding edges F7, F7', for F7a and F7b, or F7a', F7b', F7c', and F7d' are provided in step 1370 or a previous step such as step 1331, step 1350, or step 1360. These collapsing folding edges start preferably at the interceptions between the folding edge F4, F4' and the folding edges F3. If only two collapsing folding edges F7 are provided, these two collapsing folding edges F7 preferably start either both at said interceptions at the front panel, or at said interceptions at the back panel. Two collapsing folding edges F7 are preferred when the side panel mid-fold F6 is bent outwardly, and four collapsing folding edges F7' are preferred when the side panel mid-fold F6 is bent inwardly.

The collapsing folding edges F7, F7' enclose an angle of substantially 45 degrees with the folding edge F4, F4', and are situated on the side panels S2A, S2B. The collapsing folding edges F7, F7' stop at the interceptions with the side panel mid-fold F6. The bag-to-be is folded along the collapsing folding edges F7, F7'. In one example the folding along the collapsing folding edges F7 is outwardly. In another example, the folding along the collapsing folding edges F7' is inwardly.

Preferably, an additional collapsing folding edge F8, F8' is provided. What has been said before regarding that the collapsing folding edges F7, F7' can be provided at an earlier step applies to the additional collapsing folding edge F8, F8' as well. This additional collapsing folding edge F8, F8' starts at a point where one of the collapsing folding edges F7, F7' stops at a side panel mid-fold F6. The additional collapsing folding edge F8, F8' is substantially parallel to the folding edge F4, F4' and stops at a point where another of the collapsing folding edges F7, F7' stops at the other side panel mid-fold F6. The additional folding edge F8, F8' will thus be situated either on the front panel S1A or on the back panel S1B. When collapsing the bag, the bag is folded along the additional collapsing folding edge F8, F8'. The folding along the additional collapsing folding edge F8 is preferably in such a way that the outer part of the front panel S1A or the back panel S1B on both sides of the additional collapsing folding edge F8, F8' and close to said additional collapsing folding edge F8, F8' face each other. In case the additional folding along the collapsing folding edge F7 is outwardly, the outer part of the side panels S2A, S2B on both sides of the additional collapsing folding edge F8 and close to said additional collapsing folding edge F8 preferably face each other. In case the additional folding along the collapsing folding edge F7' is inwardly, the outer part of the side panels S2A, S2B on both sides of the additional collapsing folding edge F8' and close to said additional collapsing folding edge F8' are preferably turned away from each other.

The method continues with step 1380.

It should be understood that the folding edges described so far in relation to method 1305 are not necessarily exhaustive. Instead, possible additional folding edges can easily be provided in the aforementioned steps.

In the optional step 1380 a closure and/or a handle is provided. In one example the provided handle is a handle for allowing a user to carry the transport container. In one example, the handle is associated with the front panel S1A and the back panel SIB. The handle and/or the closure can be part of the provided sheet. In one example, the handle is part of the pre-determined pattern which is used in step 1320 for cutting. That pre-determined pattern can for example have openings 4510 as has been described before. An example is given in FIG. 42C, where a handle 4520 is part of the pre-determined pattern. The shown form of the handle 4520 is only an example. Any other form of a handle, for example the handle 4530 in FIG. 42A, could also be used and would thus provide an opening similar to the opening 4510 in FIG. 45C. As an example, when starting with a sheet as shown in FIG. 39, the handle 4520 as shown in any of FIG. 42A-C would be rotated clockwise by 90 degrees and situated on the right side of the shown rectangular sheet, for example in the middle of the right side of the front panel S1A to-be and/or the back panel S1B to be. The handle and/or the closure can also comprise additional elements which are attached to the sheet.

The providing of the handle and/or a closure is quite independent of how the other parts of transport container have been provided. It should thus be understood that everything which is discussed in relation to the handle and/or the closure can be easily interchanged and/or combined between different embodiments and/or examples of transport containers which are described in this disclosure.

Different kinds of providing the handle and/or the closure will soon be described. The method 1305 preferably ends after the optional step 1380.

Other methods than 1305 are possible as well for providing a transport container. According to one embodiment, the container 20 may be shaped in such a manner that plural containers 20 can be piled on top of each other in a space conservative manner. An example of such a space saving shape is a cone shaped container. An example is shown in FIG. 32A and FIG. 32B. In FIG. 32A a cone shaped container is shown in its expanded state in an elevated view. In FIG. 32B a cone shaped container is shown in its flat state. In this manner plural cone shaped containers may be stacked by placing one cone container on top of the other such that the space required for storing ten containers is only slightly larger than the space required for storing one cone container. An example is shown in FIG. 33A and FIG. 33B, where three cone shaped containers are stacked in an expanded state and in a substantially flat state, respectively. FIG. 33A and FIG. 33B are only for illustrating the principle. In practice, such containers might be stacked more tightly than in the figures.

Figure 34A:
FIG. 34A-B illustrates an elevated view and a flat view, respectively, of a container with a truncated cone.
Figure 34B:

According to an embodiment the container may be shaped as a truncated cone such that there is provided a substantially flat bottom area inside the truncated cone container, the cone wall leaning outwardly from the bottom area. An example is shown in FIG. 34A and FIG. 34B, where such a container is shown in an elevated view and in a flat view, respectively. In this manner the truncated cone container may also be stacked or piled so that one container fits inside the next substantially identical container, thus enabling transport of a large number of stacked containers within a very small space. This feature of the container advantageously contributes to enable transporting containers 20 in bulk at a low cost.

FIG. 30 shows a flowchart about a method 3200 of providing a handle. The method 3200 is in one example part of step 1380 of method 1305. In one example, the method 3200 is performed several times in step 1380, for example two times. The method 3200 comprises the step 3210.

In step 3210 a handle is provided for the transport container. In one example, the handle is attached to the transport container, for example via gluing or bonding. In the following we will describe providing a handle for a carrier bag. It should be understood, however, that the same applies for other kinds of transport containers. In one example, the handle is attached to the interior side of the carrier bag. This is in one example done by attaching the handle to the first sheet surface. In one example, the handle is attached to the outer side of the carrier bag. This is in one example done by attaching the handle to the second sheet surface. The handle is preferably attached to the front panel S1A and/or the back panel S1B. It is, however, in principle possible to attach the handle to a side panel S2A, S2B as well. The handle can have a U-shape as comparable to the handle 4530 in FIG. 42A. The handle can have a cornered U-shape as comparable to the handle 4520 in FIG. 42B. Any other shape might work as well. The handle might be thicker than the sheet of the bag for providing more strength. The handle might be of the same material as the sheet. The handle might comprise several layers of the sheet of the bag. These several layers could be provided by folding one layer. When attaching a handle similar to the ones shown in FIG.

42A-B, the two parallel vertical sections are preferably longer than indicated in FIG. 42A-B. Said longer parts of the two parallel sections are then preferably attached to the sheet. In one example an optional step 3220 is performed after step 3210. The additional step is, in one example, preferable when attaching a handle similar to the ones shown in FIG. 42A-B for increasing the robustness of the carrier bag when carried in the handle.

In one example a handle as described in WO 2014/187582 A1 is provided. WO 2014/187582 A1 is therefore included in total by reference in this disclosure. An example of such a handle is shown in FIGS. 43A and 43B. In this example, a handle 4610 and a support sheet 4620 are preferable complementary in their shape. In a flat state of the carrier, as shown in FIG. 43A, the handle 4610 and the support sheet 4620 are arranged in a flattened state as well. In this flattened state the handle 4610 and the support sheet 4620 are oriented so that the handle 4610 is situated at its complementary part of the support sheet 4620. The thickness of the combination of the handle 4610 and the support sheet 4620 will then equal the thickness of the handle 4610 and/or the support sheet 4620 alone. In step 1310 the support sheet 4620 is in one example attached to the front panel S1A and/or the back panel S1B. The handle 4610 is attached to the support sheet via a folding edge 4630. Preferably, the handle is not directly attached to the front panel S1A and/or the back panel S1B. This allows a user to fold up and use the handle when the bag is in an expanded state, as is shown in FIG. 43B.

Figure 44:
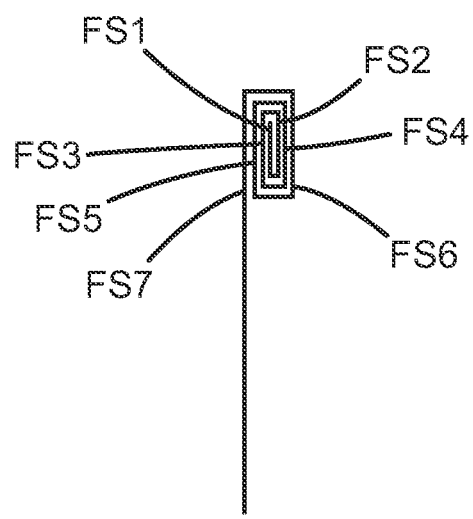
FIG. 44 is an illustration of a string as a provided handle.

In one example the provided handle is a string 4710. FIG. 44 is an illustration of a string as a provided handle. The string 4710 can, for example, be attached close to the upper side 4060A, 4060B; 4160A, 4160B; 4260A, 4260B; 4660; 4760 of the front panel S1A and/or the back panel S1B. The term upper side relates in one example to the side of the front panel S1A and/or the back panel S1B which is upwards when the bag is in an upright position. The string 4710 can be placed substantially parallel to the upper side 4060A, 4060B; 4160A, 4160B; 4260A, 4260B; 4660; 4760 of the front panel S1A and/or the back panel S1B. The string 4710 can have a length that exceeds the width of the upper side 4060A, 4060B; 4160A, 4160B; 4260A, 4260B; 4660; 4760 of the front panel S1A and/or the back panel S1B. The string 4710 can have a length that exceeds twice the width of the upper side 4060A, 4060B; 4160A, 4160B; 4260A, 4260B; 4660; 4760 of the front panel S1A and/or the back panel S1B. In one example, the string 4710 is arranged to provide a closed loop 4713. This can, for example, be done by providing a knot 4720 between the two ends of the string 4710. The string can then be arranged substantially parallel to the upper side 4060A, 4060B; 4160A, 4160B; 4260A, 4260B; 4660; 4760 of the front panel S1A and/or the back panel S1B, so that the looped string has two portions 4711, 4712 of the string 4710 substantially parallel and preferably close to each other at the upper side 4160A, 4160B; 4260A, 4260B; 4660; 4760 of the front panel S1A and/or the back panel S1B. When the length of the string exceeds twice the width of the upper side 4160A, 4160B; 4260A, 4260B; 4660; 4760 of the front panel S1A and/or the back panel S1B, two loops 4714, 4715 will be provided at each side of the upper side 4160A, 4160B; 4260A, 4260B; 4660; 4760 of the front panel S1A and/or the back panel S1B. The length of the string is preferably so long that said two loops 4714, 4715 can be extended by moving the string which forms said two loops 4714, 4715, so that preferably at least a human hand, or at least the four fingers of a human hand can then grab through said two loops 4714, 4715.

In alternative embodiments only one if the loops 4714, 4715 is provided. In one embodiment the string is attached vertically to the front panel S1A and/or the back panel S1B. The material of the string is in one example cotton twine. In one example the string comprises plastics.

In one example a handle is provided by protrusions 4020a, 4020b, 4020c, 4020d; 4120a, 4120b, 4120c, 4120d of the pre-determined base pattern. This is described in more detail in relation to FIG. 52A-C and FIG. 50A-C. In one example, said protrusions 4020a, 4020b, 4020c, 4020d; 4120a, 4120b, 4120c, 4120d are not part of the pre-determined base pattern. Instead, these protrusions are separate stripes which are attached to the base pattern. This attaching can in principle be done at any stage during method 1305, but is preferably done after step 1320. An advantage of attaching the stripes after the pre-determined base-pattern is cut is that the loss of material due to the cut pattern is minimised. When, for example, looking at FIG. 38, one could cut the basically rectangular base-pattern 4110, maybe in combination with the two additional rectangular shapes 4140.1, 4140.2 out of one sheet of material. One could then cut out the protrusions 4120a, 4120b, 4120c, 4120d separately and attach them to the basically rectangular base-pattern 4110. One could also provide long stripes where the protrusions are the end portions of the stripe. In one example, a stripe goes from the left edge of protrusion 4120a to the right edge of protrusion 4120c. Such a stripe would thus also cover parts of the side portions S2A, S2B and of the front panel S1A when attached to the rectangular base-pattern 4110. The corresponding applies to the protrusions 4120b and 4120d. The attachment can be done of the first sheet surface of the pre-determined base-pattern or on the second sheet surface of the pre-determined base-pattern. When discussing in relation to FIG. 49a-c and FIG. 50A-C how a handle can be provided by the protrusions 4020a, 4020b, 4020c, 4020d; 4120a, 4120b, 4120c, 4120d it should thus be understood that the same applies to protrusions 4020a, 4020b, 4020c, 4020d; 4120a, 4120b, 4120c, 4120d which are part of the pre-determined base pattern, as does apply for protrusions which are achieved via attachment of stripes. It should also be noted that said stripes do not necessarily have rectangular forms, but can have different forms for providing different forms of protrusions when attached to the pre-determined base pattern.

The method 3200 continues with an optional step 3220. In the optional step 3220 a reinforcement is provided. The provided reinforcement can be a reinforcement sheet. The reinforcement sheet can be substantially planar. The reinforcement is preferably attached to the same side of the front panel S1A and/or the back panel S1B as the handle. The attaching is, for example, done by gluing or bonding. The part of the handle which is attached to the front panel S1A and/or the back panel S1B is preferably situated between the front panel S1A and/or the back panel S1B and the reinforcement. In one example, the reinforcement attaches directly to parts of the handle and to the front panel S1A and/or the back panel S1B. In one example, the width of the reinforcement sheet is larger than the width of the handle. In one example, the width of the reinforcement sheet is at least 1.5 times the width of the handle. The width of the reinforcement sheet is preferably not larger than the width of the front panel S1A and/or the back panel S1B on which the reinforcement sheet is attached. One advantage when providing a reinforcement sheet is that the lifting force can be distributed from the handle to a larger area of the front panel S1A and/or back panel S1B than the overlap between the handle and the front panel S1A and/or back panel S1B. The reinforcement sheet has a certain height. This certain height is preferably larger than the height of the overlap between the handle and the front panel S1A and/or back panel S1B. In one example, the term overlap refers here to the area on which the handle is attached to the front panel S1A and/or the back panel S1B.

In one example, the optional step 3220 is repeated. By doing this a second reinforcement is provided. This second reinforcement has preferably a larger area than the first reinforcement sheet. When referring to the first reinforcement sheet here, it is intended the reinforcement sheet which was provided the previous time the step 3220 was performed. Preferably the width of the second reinforcement sheet is larger than the width of the first reinforcement sheet. Preferably the height of the second reinforcement sheet is larger than the height of the first reinforcement sheet. The second reinforcement sheet can then be attached to the first reinforcement sheet and the front panel S1A and/or the back panel S1B. Preferably the second reinforcement sheet covers a substantial part of the first reinforcement sheet, for example at least 80%, at least 90%, or at least 95%. The first reinforcement sheet is then in one example situated between the front panel S1A and/or back panel S1B and the second reinforcement sheet. One advantage when providing a second reinforcement sheet is that the lifting force can be distributed from the first reinforcement sheet to a larger area of the front panel S1A and/or back panel S1B than the overlap between the first reinforcement sheet and the front panel S1A and/or back panel S1B.

The method 3200 can end after step 3220.

Figure 33:
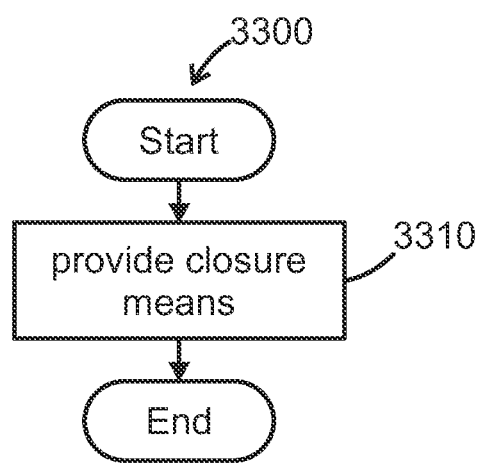
FIGS. 33A-B are illustrations of stacked cone shaped containers.

In FIG. 33 a flowchart of a method 3300 for providing closure means for a transport container is shown. The method 3300 is in one example part of step 1380 of method 1305. The method starts with step 3310.

In step 3310 at least one closure means is provided at the transport container. In the following we will describe providing closure means for a carrier bag. It should be understood, however, that the same applies for other kinds of transport containers. In one example, the closure means comprises said one or more protrusions 4020*a*, 4020*b*, 4020*c*, 4020*d*; 4120*a*, 4120*b*, 4120*c*, 4120*d* of the pre-determined base pattern. It is described in relation to FIG. 40 and FIG. 41 how these protrusions 4020*a*, 4020*b*, 4020*c*, 4020*d*; 4120*a*, 4120*b*, 4120*c*, 4120*d* can form the closure means. It should be understood that what has been said above in relation to providing said protrusions 4020*a*, 4020*b*, 4020*c*, 4020*d*; 4120*a*, 4120*b*, 4120*c*, 4120*d* via stripes which are attached to the pre-determined base pattern applies here as well. In other words, what is described in relation to said protrusions 4020*a*, 4020*b*, 4020*c*, 4020*d*; 4120*a*, 4120*b*, 4120*c*, 4120*d* applies independently of whether the protrusions are part of the pre-determined base pattern or whether they are attached to in at a later step. In one example, said stripes are thus attached to the pre-determined pattern as described above.

In one example said provided closure means is a closure device. In one example, the provided closure device is integrated in a reinforcement sheet. In one example, said reinforcement sheet is the second reinforcement sheet which has been described in relation to step 3220 of method 3200. In one example, said reinforcement sheet is another reinforcement sheet than the second reinforcement sheet which has been described in relation to step 3220.

In one example said closure device is a closure device 240 as described in relation to FIG. 14-17. In one example, the closure device has a first elongated closure element 250A and a second elongated closure element 250B. The first and second elongated closure elements 250A, 250B, respectively can have an upper section and a lower section. The lower section is in one example attached to the bag-to-be. In one example, the lower section is attached to the front panel S1A and/or the bag panel S1B. This attaching is, for example, via gluing or bonding. The lower section can comprise a reinforcement sheet. The upper section is in one example not attached to the front panel S1A and/or the bag panel S1B. The upper section of the first and the second elongated closure element can have complementary patterns. These complementary patterns can be provided in such a way that the first and second elongated closure elements can interact to provide a closing between them, and thus a closing of the bag. The closing can, for example, be caused by a movable pressure device 280, also referred to as a "runner", or a "slider". Even a later opening of the bag can be provided by said runner/slider 280.

Figure 45A:
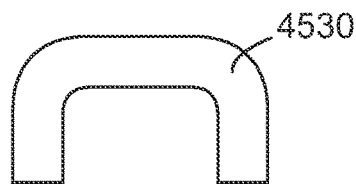
Figure 45B:
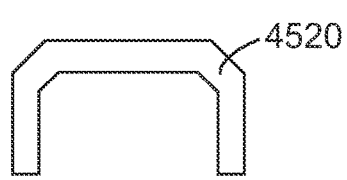
Figure 45C:
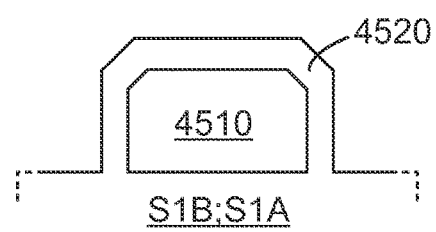

In the following, different kinds of attaching the closure device are described in relation to FIGS. 45A-D. In these figures only one side of the bag is shown, for example the side of the front panel S1A. In a preferred example the other side of the bags looks similar, for example the side of the back panel S1B. Same elements which are covered by another element are drawn in dashed lines. In FIGS. 45A and 45B handle 4820 is attached to the outer surface of the front panel S1A and/or the bag panel S1B. In FIGS. 45C and 45B a handle 4820 is attached to the interior surface of the front panel S1A and/or the bag panel S1B. Said attaching can be directly or include some other elements in between the handle 4820 and the outer and/or inner surface of the front panel S1A and/or the back panel S1B. In FIG. 48 the handle 4820 is integrated in the front panel S1A and/or back panel S1B as, for example, being described in relation to FIG. 42C. In FIGS. 45A-D a reinforcement sheet 4810 is attached to the handle and to the same surface of the front panel S1A and/or the back panel S1B as the handle 4820 is attached to. Thus, in FIG. 45A and 45B the reinforcement sheet 4810 is attached to the outer surface of the front panel S1A and/or the back panel S1B and covers a lower part of the handle 4820. In FIGS. 45C and 45D the reinforcement sheet 4810 is attached to the inner surface of the front panel S1A and/or the back panel S1B and covers a lower part of the handle 4820. In the shown examples, there is a vertical distance 4890 between the reinforcement sheet 4810 and the upper side of the front panel S1A and/or the back panel S1B. In one example this distance is zero or basically zero. In another example, this distance is at least one centimetre, for example 1 cm, 2 cm or 3 cm, 4 cm, or 5 cm. A runner/slider 4880 or another element which can cause the actual closing is shown in FIG. 45A-E as well.

In the following, when referring to an elongated closure element, this could be the first or the second elongated closure element. In FIG. 45A an elongated closure element 4870*a* is attached on the outer side of the front panel S1A and/or the back panel S1B. The attachment is done in such a way that the handle is outside the elongated closure element 4870*a*, thus not intercepting a closing action by the runner/slider 4880. The elongated closure element 4870*a* has in one example a width which is longer than the width of the upper side of the front panel S1A and/or the back panel S1B. This has the advantage that a first and a second elongated closure element can be attached to each other at an overlapping area outside the front panel S1A and/or the back panel S1B, thus providing an especially good closing of the transport container since the air exchange will be well prevented at the corners of the upper side of the front panel S1A and/or the back panel S1B.

In FIG. 45B an elongated closure element 4870b is attached on the inner side of the front panel S1A and/or the back panel S1B. Thus the handle will automatically be outside the elongated closure element 4870b, thus not intercepting a closing action by the runner/slider 4880. The elongated closure element 4870a has preferably a width which is substantially the width of the upper side of the front panel S1A and/or the back panel S1B. Thus a good enclosing of the transport container will be provided.

In FIG. 45C an elongated closure element 4870c is attached on the inner side of the front panel S1A and/or the back panel S1B. The attachment is done in such a way that the handle is in between the elongated closure element 4870c and the front panel S1A and/or the back panel S1B, thus not intercepting a closing action by the runner/slider 4880. The elongated closure element 4870c has preferably a width which is substantially the width of the upper side of the front panel S1A and/or the back panel S1B.

In FIG. 45D an elongated closure element 4870c is attached on the inner side of the front panel S1A and/or the back panel S1B. The attachment is done in such a way that the handle is in between the elongated closure element 4870d and the front panel S1A and/or the back panel S1B, thus not intercepting a closing action by the runner/slider 4880. The elongated closure element 4870d has preferably a width which is substantially the width of the upper side of the front panel S1A and/or the back panel S1B. The difference between FIG. 45C and FIG. 45D is that the vertical distance of the lower part in FIG. 45D is larger than in FIG. 45C. In FIG. 45D the whole reinforcement sheet is covered by the lower part of the elongated closure element. This has the additional advantage that the attached lower side of the elongated closure element provides an additional barrier for air to prevent air exchange between the inside and the outside of the bag when the bag is in a closed state.

In FIG. 45E an elongated closure element 4870e is attached on the inner side of the front panel S1A and/or the back panel S1B. Since the handle is part of the sheet which provides the front panel S1A and/or the back panel S1B, the handle is not intercepting a closing action by the runner/slider 4880. The elongated closure element 4870e has preferably a width which is substantially the width of the upper side of the front panel S1A and/or the back panel S1B. The lower side of the lower part of the elongated closure element 4870e is not indicated, but can in one example be like in FIG. 45C or in FIG. 45D.

Figure 47:
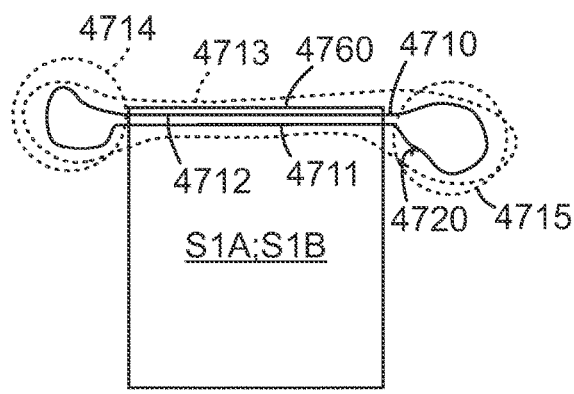
FIG. 47 illustrates a side view of an elongated closure element.

In FIGS. 45A-E a runner/slider 4880 is shown. This is, however, in one example not required. Any of the elongated closure elements 4870a, 4870b, 4870c, 4870d, 4780e could have a first pattern 5010 on the side which is faced to the interior of the bag. A corresponding elongated closure element which is situated at the panel which is opposite to the panel shown panel in FIG. 45A-45E can have a second pattern 5020 on its side which is faced to the interior of the bag. The second pattern 5020 can be complementary to the first pattern 5010. By pressing together the elongated closure element on the front panel S1A and the back panel S1B one could then make the first and the second pattern to interact in such a way that their corresponding parts of the pattern are brought together. This can provide an attaching between the first 5010 and the second pattern 5020 due to a locking of these patterns by their form. An example of a side view of a first 5010 and a second pattern 5020 of the elongated closure element is shown in FIG. 47.

Figure 46A:
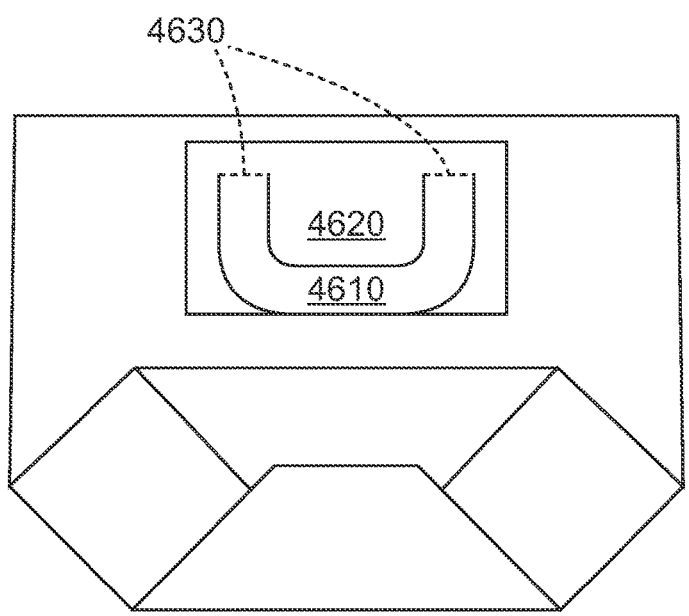
FIG. 46 is an illustration of an example of providing a closure element.
Figure 46B:
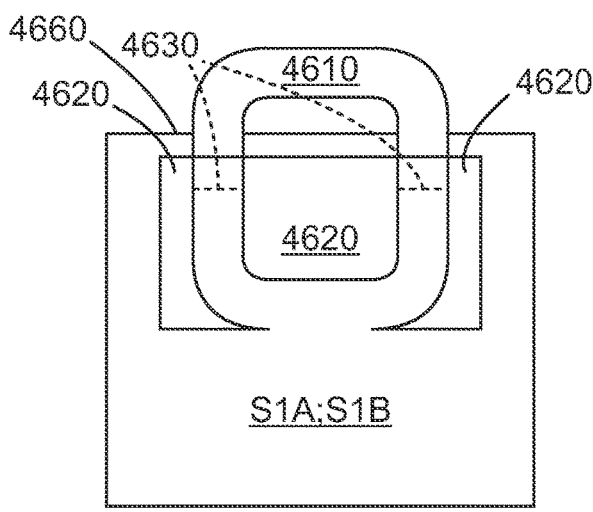

Another example of providing a closure element is shown in FIG. 46. A closure element 4910 is provided at the inner and/or outer side of the front panel S1A and/or the back panel S1B. This closure element can have the size of a stripe and has preferable substantially the width of the upper side of the front panel S1A and/or the back panel S1B. The closure element 4910 can be attached to the front panel S1A and/or the back panel S1B. The attaching can be done by gluing or bonding. The closure element 4910 can be a glue strip. The closure element 4910 can be an adhesive tape. Thus, when pressing the front panel S1A to the back panel S1B, the glue strip and/or the adhesive tape can keep the front panel S1A and the back panel SIB close to each other, thus providing a closing of the transport container. In one example the front panel S1A and the back panel S1B are kept attached to each other by the closure element 4910 once they touch each other via the closure element 4910. In one example the closure element 4910 is only at the front panel S1A or only at the back panel S1B. This might be enough for providing a closure of the bag via adhesive forces. The closure element 4910 can comprise an additional strip of protection material (not shown in the figure). This strip can have substantially the same size as the glue strip/the adhesive tape. The additional strip can be provided in such a way that it has to be removed before allowing the glue strip/the adhesive tape to provide its adhesive force between the front panel S1A and the back panel S1B. This prevents the front panel S1A and the back panel S1B to stick permanently together when the transport container is in a flat state.

In one example the closure element 4910 is on the outside of the front panel S1A and/or the back panel S1B. Assuming the closure element 4910 being on the outside of the front panel S1A, the back panel S1B could have a larger vertical height than the front panel S1A. A folding edge could be provided at the back panel S1B. The folding edge can be substantially parallel to the upper side of the back panel S1B. The folding edge could be situated at a distance from the upper side of the back panel S1B. Said distance could be approximately the distance of which the vertical height of the back panel S1B differs from the vertical height S1A of the front panel. One could then fold the back panel S1B along the folding edge in the direction of the front panel S1A. The folded section of the back panel S1B can then be put over the front panel S1A so that it covers the outer part of the front panel which comprises the closure element 4910. In that way a closure of the bag can be provided as well. Of course the closure element 4910 could also or instead be situated at the inner side of the folded part of the back panel S1B. The role of the front panel S1A and the back panel S1B can also easily be interchanged.

The closure element 4910 can also be an element which allows closing the transport element with the help of an external closure element. As an example, the closure element 4910 can comprise a welding strip. The welding strip can be formed from a layer of PE. The welding strip can be made of a weldable material so as to enable closing the bag opening by heat welding such that entry of air into the bag interior is minimized or prevented. Said external element is in one example a sealing element, for example a hot sealing element. It could also be an impulse sealing element. The external element could be a welding element. The external element could be a so-called hot weld pistol. One could, for example, attach said external element at the upper side of the front panel S1A and the back panel S1B so that it encloses said upper side of the front panel S1A and the back panel S1B at the part where the closure element 4910 is situated. One could thus close the transport container at a later state with the help of the external element. In one example, the closure element is part of sheet which is provided for being cut in a method like method 1305. Thus, in one example the closure element 4910 is not an additional element which has to be attached to the front panel S1A and/or the back panel S1B, but is already part of the front panel S1A and the back panel S1B. The closure element 4910 is in one example of the same material as the front panel S1A and/or the back panel S1B. According to an embodiment the water vapour impermeable membrane 190 forms the welding strip.

The closure element 4910 can also be provided at the outside of the front panel S1A and/or the back panel S1B when the front panel S1A and the back panel S1B have the same size. This might be advantageous when providing a closure as described in relation to FIG. 40 and FIG. 41.

Figure 48A:
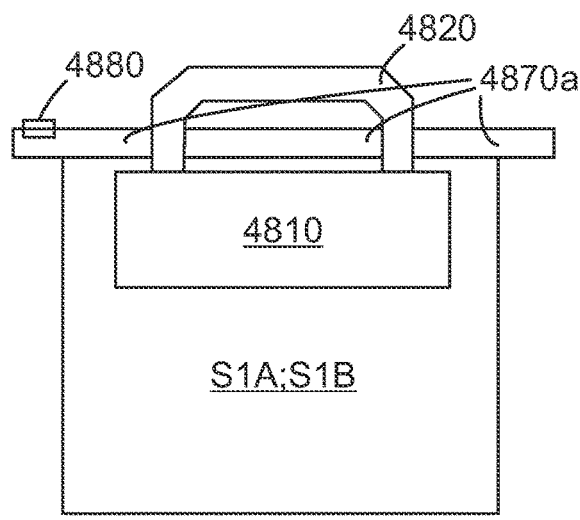
FIG. 48A-C are illustrations of examples of closure elements.
Figure 48C:
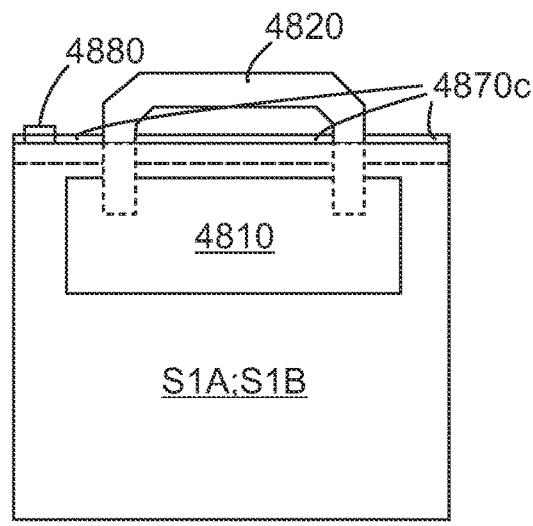
Figure 48B:
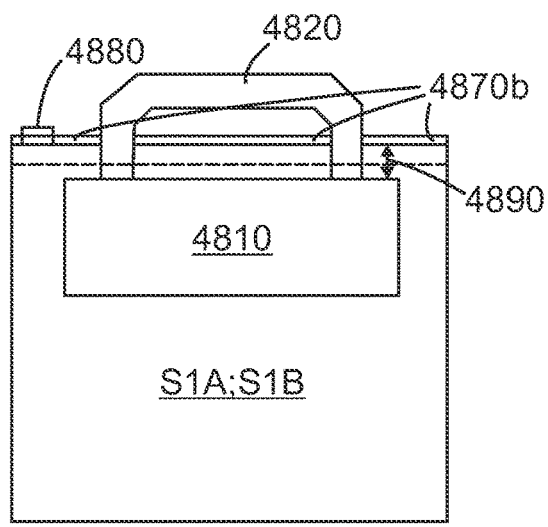
Figure 48D:
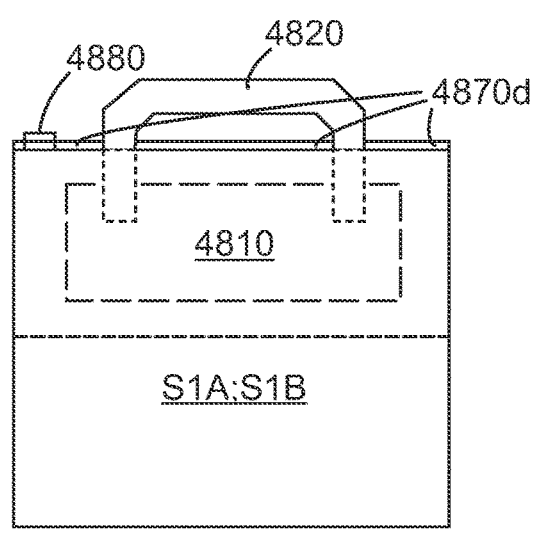
Figure 48E:
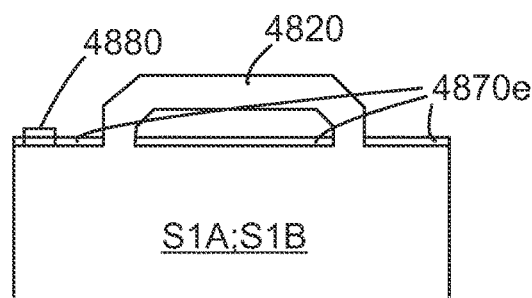
Figure 49:
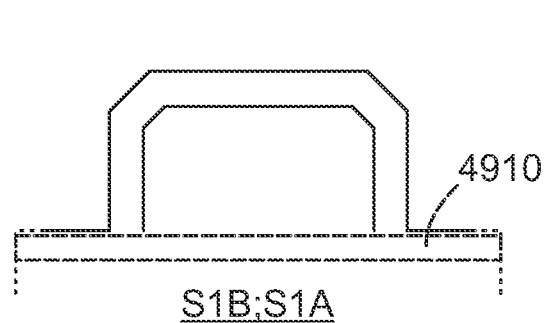
FIG. 49A-C are illustrations of examples of how the folding described in relation to FIG. 40 and FIG. 41 can be applied to a bag with the base pattern of FIG. 36.

Other examples of closure elements are presented in FIG. 48A and FIG. 48B. In FIG. 48A the closure element 5170*a* is provided by a tape or another adhesive material. This tape could be folded over the upper side of the bag after the upper sides of the front panel S1A and the back panel S1B are brought together. This provides an easy method to close the bag. The length of the tape could be longer than the width of the bag. Then the outer edges of the tape could be put together to attach each other. This provides a better closing of the bag. In FIG. 48B the closure element 5170*b* is provided by a clamp. The clamp 5170*b* could, for example, press the upper parts of the front panel S1A and the back panel S1B together. This pressing together could for example be caused by the form and the stiffness of the clamp 5170*b*. The clamp 5170*b* can have a width which is longer than the upper width of the bag. The form of the clamp 5170*b* can be different from what is shown in FIG. 48B. Although shown without a handle, it would be no problem to provide a handle in FIG. 48A and FIG. 48B, for example a handle as in FIG. 45A or in FIG. 46.

What is said in relation to FIG. 48A and FIG. 48B can also be combined with other examples of the disclosure. A tape 5170*a* or a closure element 5170*b* could, for example, be combined with a folded closing as described in relation to FIG. 40 and FIG. 41. In that case it might in one example be advantageous to provide one or several clamps with shorter widths than the upper width of the front panel S1A and/or the back panel S1B. This is due to the fact that such a clamp might be enough to keep a closing as indicated in FIG. 41 at its place so that it will not unfold automatically.

Yet another possibility is described in FIG. 48C. The front panel S1A and/or the back panel S1B could have a protrusion 5110*c* extending to its upper side. This protrusion 5110*c* could be substantially rectangular. The protrusion could have an opening 5120*c*. The opening 5120*c* could be such that it provides a handle. How openings can provide handles has been described before. At a part of the protrusion 5110*c* which is between the opening 5120*c* and the front panel S1A and/or back panel S1B a closure element 5170*c* could be provided. This closure element 5170*c* could have any of the properties of the closure element 4910 which has been described before. Especially the closure element 5170*c* could provide adhesive force. The closure element 5170*c* could also be thus that a closure could be provided with the help of an external element which has been described before.

The method 3300 can end after step 3310.

Figure 35A:
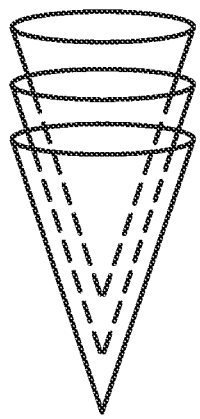
FIG. 35 is an illustration of a method for providing a bag with a closure.
Figure 35B:
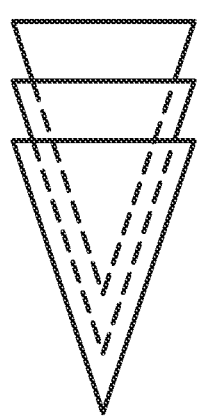

In FIG. 35 a method of providing a bag with a closure is illustrated. The closure which is provided there can, for example, be the closure as illustrated in FIG. 45A. This closure can be with or without the runner/slider 4880. A plurality of produced bags 3910*a*, 3910*b*, 3910*c*, . . . can be provided. In the shown example the plurality of produced bags 3910*a*, 3910*b*, 3910*c*, . . . is in an extended state. It should be understood that plurality of produced bags 3910*a*, 3910*b*, 3910*c*, . . . equally well could be in a flat state. A long stripe 3920 of what should be the elongated closure element 4870*a* is provided. This long stripe 3920 could comprise to stripes, one for the front panel S1A and one for the back panel S1B. One or several cutting elements 3930 can be provided to cut the long stripe 3920 in between the plurality of plurality of produced bags 3910*a*, 3910*b*, 3910*c*, . . . , for example along the dotted lines as indicated in FIG. 35. Said one or more cutting element 3930 is only schematically drawn in FIG. 35. Said one or more cutting element 3930 are in one example at a substantially fixed position, at least in one or two dimension, and the plurality of produced bags 3910*a*, 3910*b*, 3910*c*, . . . can be transported in relation to said one or more cutting element 3930. The described way of providing a bag with a closure can facilitate mass production.

In the following additional ways of providing a handle and/or a closure are described. Some of the steps can be part of any of the methods 1300, 1302, 1305, 3200, and/or 3300. It should also be stressed that what is described here can be well combined with what have been described before. This combining might then provide additional embodiments of the present invention.

FIG. 40 shows an example of a section of a transport carrier-to-be. This section can, for example be a section of the sheet which is cut in step 1320 of method 1305. The section is for example an enlargement of the upper left corner of FIG. 38. Parts of what is present of this section in FIG. 38, but which will not be discussed in the following, have been removed from FIG. 40 for not overloading the figure. FIG. 40 shows thus a protrusion 4320 at a front panel S1A. As has been described before, that protrusion can also be attached at a later state. It does thus not need to be part of the pre-determined pattern which is cut in step 1320. It should also be stressed that the protrusion does not need to be rectangular. The protrusion 4320 could also have the shape of a rectangular with an attached triangle as shown in FIG. 36, or any other shape.

An edge part 4330 of the protrusion 4320 could be attached to a corresponding part of another protrusion of the base pattern. When looking at FIG. 38, this other protrusion can for example be protrusion 4120*b* or protrusion 4120*c*. This attaching can be done by gluing or bonding. For making the attaching possible the protrusion could be folded or bent, for example along a folding line/bending start line F10. This allows providing a handle. When attaching the edge pattern 4330 to the protrusion 4120*b* a handle on the side panel S2A can be provided. When attaching the edge pattern 4330 to the protrusion 4120*c* a handle on the front panel will be provided. The edge part 4330 could be much larger than indicated in FIG. 40. The edge part is in one example basically the whole protrusion. This might provide an especially strong handle.

In an alternative example no protrusion 4120*b* and/or 4120*c* is provided. The edge part 4330 can then be attached to a corresponding area on another element of the bag. This corresponding area can, for example be an area at the side panel S2A or at the front panel S1A close to where the protrusion 4120*b* and/or 4120*c* could have been attached.

At least one additional folding edge F11 can be provided at the protrusion 4320. The at least one additional folding edge F11 comprises in one example four additional folding edges F11.1, F11.2, F11.3, F11.4. This at least one additional folding edge can continue through the front panel S1A and/or one or both of the side panels S2A, S2B as well. There might also be at least one additional folding edge F12 on the front panel S1A and/or one or both of the side panels S2A, S2B. The at least one additional folding edge F12 comprises in one example three additional folding edges F12.1, F12.2, F12.3. The additional folding edges F12 comprise preferably between one and ten folding edges. The additional folding edges F11 comprise preferably between one and ten folding edges. Corresponding folding edges can be provided at the back panel S1B and/or at protrusions thereof. In the following it will only be described how the protrusion 4320 and the front panel S1A can be folded. The same applies to other protrusions or to any other panel S1B, S2A, S2B as well. The folding edges F11, F12 are in one example substantially parallel and at a distance to the upper side of the front panel S1A and/or the protrusion 4320.

In one example the protrusion 4320 and or the front panel S1A is folded along the folding edges F11, F12 in the same direction. The folding is thus in one example always in the direction of the first sheet surface of the front panel S1A/the protrusion 4320. In another example, the folding is always in the direction of the second sheet surface of the front panel S1A/the protrusion 4320.

In one example, before starting the now described folding scheme, the back panel S1B is put into contact with the front panel S1A. This could be done by putting the upper side of the back panel S1B in contact with the upper side of the front panel. In one example there are enclosed areas FS1, FS2, FS3, . . . between two adjacent folding edges F11/F12 and/or between a folding edge F11/F12 and the upper side of the front panel S1A/the upper side of the protrusion 4320. Preferably, the contact between the back panel S1B and the front panel S1A is along the enclosed areas FS1, FS2, FS3. What is said regarding bringing the back panel S1B in contact with the front panel S1A applies in one example also to the protrusion 4320, which could be brought into contact with a corresponding protrusion at the back panel S1B, for example the protrusion 4120b of FIG. 38.

The folding is in one example done in the way that the enclosed area FS1 between the upper side of the protrusion 4320/the upper side of the front panel S1A and the uppermost folding edge, in the shown example F11.1, faces the enclosed area FS2 between the uppermost folding edge F11/F12, in the shown example F11.1, and the second most upper folding edge F11/F12, in the shown example F11.2. When folding edges corresponding to F11/F12 exist at the back panel S1B/at protrusions from the back panel S1B, and when a folding along these corresponding folding edges is performed in the same direction as a folding at the front panel S1A/the protrusion 4320, a closure of the transport container is provided. The term same direction thus implies that the folding at the back panel S1B has to be towards the second sheet surface of the back panel S1B when the folding at the front panel S1A is towards the first sheet surface of the front panel S1A, and vice versa. The contact between the front panel S1A and the back panel S1B and/or the corresponding protrusions is preferable kept throughout the folding procedure, so that the first sheet surface of the front panel S1A and the back panel S1B and/or the corresponding protrusions always touch each other.

In a next folding step, an enclosed area FS2 between the uppermost folding edge F11.1 and the second uppermost folding edge F11.2 is folded towards the enclosed area FS3 between the second uppermost folding edge F11.2 and the third uppermost folding edge F11.3. The enclosed area FS1, and preferably its counterpart on the back panel S1B, will thus be situated between the areas FS2 and FS3.

The folding can be continued along several or all of the folding edges F11/F12. FIG. 41 shows a schematic example of how the result of thus a folding can look like. FIG. 41 can be obtained when looking into the direction of the arrow D in FIG. 40. In FIG. 41 it is shown how the enclosed areas FS1, FS2, . . . can be arranged after the folding procedure. The horizontal lines in FIG. 41 are only sketched for clarity reason to provide an intermediate space between the enclosed areas FS1, FS2, . . . . The horizontal lines are in reality preferably not there, or at least much more narrow in relation to the vertical lines. In one example there is basically no space between the enclosed areas FS1, FS2, . . . The lines in FIG. 41 present preferably the front panel S1A and the back panel S1B together, i.e. every line represents both the front panel S1A and the back panel S1B, where the front panel S1A is on one side of the line and the back panel S1B on the other side of the panel. As can be seen, such a folding provides a closure of the bag. This has the advantage that no additional closing element is needed. It is, however, possible to combine such a folding with a closure element as well. As an example, a closure element 4910 as described in relation to FIG. 46 can be provided at the enclosed area FS7 for attaching the enclosed area FS5 to it. This additionally increases the closing capacity of the fore mentioned folding method.

In FIG. 40 the folding edges FS11/FS12 are sketched at equal distance. This is, however, not a prerequisite. On the contrary, it might be preferably to slightly increase the distance between the folding edges. The reason can be seen in FIG. 41. A folded area has a certain thickness and the next folded area needs to compensate for this thickness when folded around the previous area, as is indicated by the horizontal lines in FIG. 41. As the number of folding increases more and more areas, each having a certain thickness, have to be compensated for. For the same reason it can be preferably to have slight differences between the distances between the folding edges F11/F12 on the front panel S1A compared to the corresponding folding edges on the back panel S1B.

An example of how the folding described in relation to FIG. 40 and FIG. 41 can be applied to a bag made out of the base pattern in FIG. 36 is shown in FIG. 49A-49C. A starting point could be a bag in an opened position as shown in FIG. 37J. This bag could be closed by bringing the upper portions of the front side panel S1A and the back side panel S1B together as shown in FIG. 49A. Then, the bag in FIG. 49A can be folded along folding edges F12.1-F12.4 as described in relation to FIG. 40 and FIG. 41. A bag as shown in FIG. 49B will be achieved. If the combined length L5210 of the protrusion in a folded state 5210 is larger than thrice the length of the upper side of the front panel S1A and/or back panel S1B, the protrusion in a folded state 5210 could be turned to from a handle 5210c as shown in FIG. 49C. Preferably, the combined length L5210 of the protrusion in a folded state 5210 is at least four times larger than the length of the upper side of the front panel S1A and/or back panel S1B. This has the advantage that no additional elements except the sheet providing the pre-determined base pattern have to be provided for forming the handle and/or closure of the bag. For forming the handle 5210c the outer ends of the protrusion in a folded state 5210 can be attached to each other.

Figures 40A, 40B, 40C, 40D, 40E, 40F, 40N:
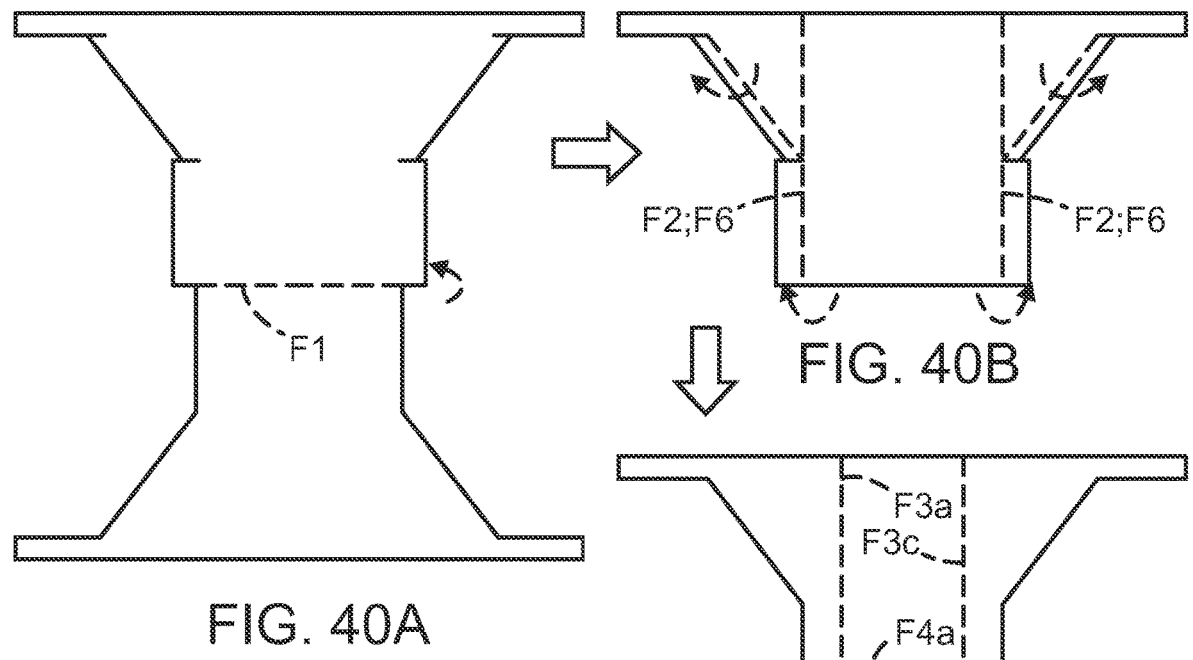
Figure 40G:
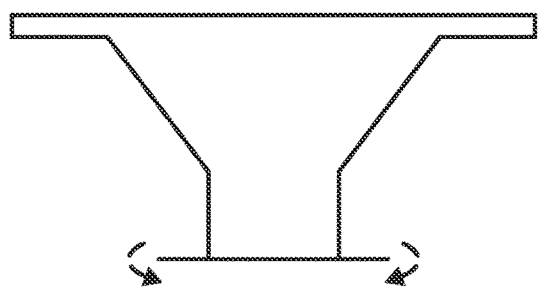
Figure 40I:
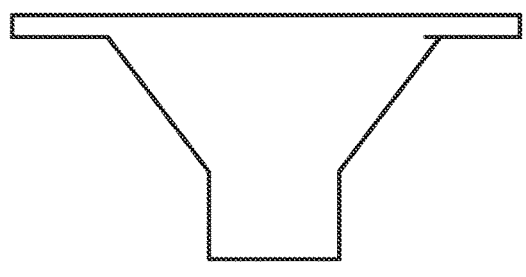
Figure 40H:
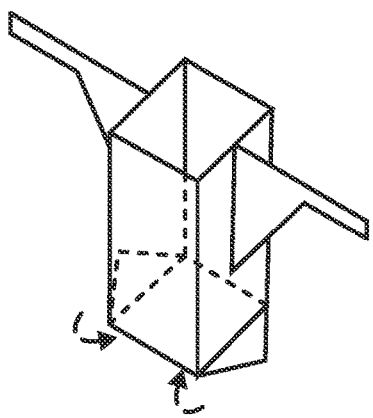
Figure 40J:
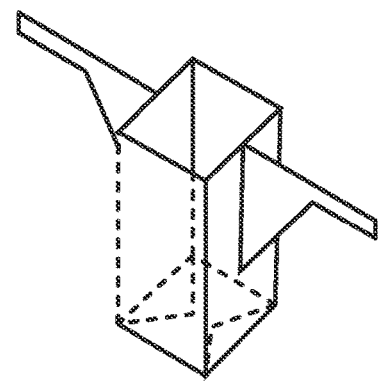
Figure 40K:
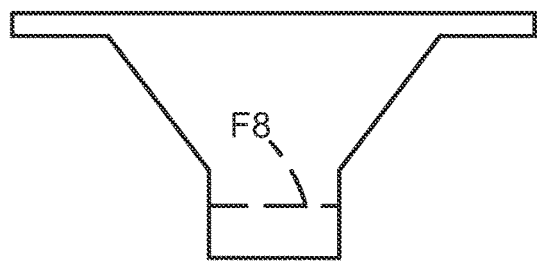
Figure 40M:
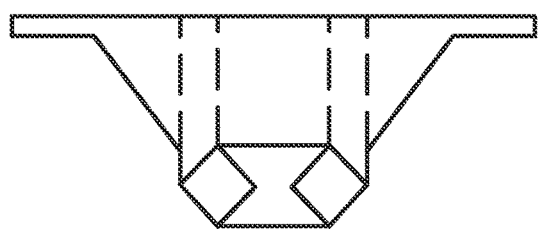
Figure 40L:
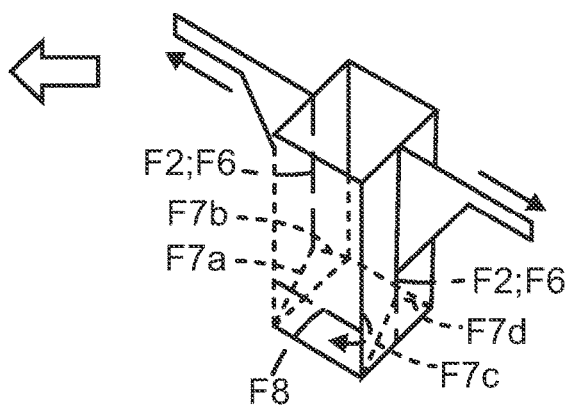

A bag with the triangles not attached to each other, as shown in FIG. 40N, could be folded in the same way.

A bag starting with a base-pattern as shown in FIG. 38 could provide handle and/or closure in an analogous way as shown in FIG. 49A-C. In one example, the combined length L5210 of the protrusion in a folded state 5210 is only slightly larger than the length of the upper side of the front panel S1A and/or back panel S1B. Then a handle 5210c of the kind shown in FIG. 49C will not be provided. In one example, the parts of the protrusions in the folded state 5210 are folded towards the front panel S1A and/or the back panel S1B.

When referring to the upper length of the front panel S1A and/or the back panel S1B in relation to FIG. 49B and FIG. 49C it should be understood that this is the upper length in the state shown in FIG. 49B and FIG. 49C. This length could differ from the upper length of the front panel S1A and/or the back panel S1B in FIG. 49A, since the upper length there now has been folded away.

It should also be stated that FIG. 37A-N and FIG. 49A-C only are schematically. The relation of the area of the front panel S1A and/or the back panel S1B and the bottom plane BP could be much different from what is shown in the figures. As an example, the remaining part of the front panel S1A in FIG. 49C could be several times, for example five or ten times, the area of the bottom plane.

Figure 50:
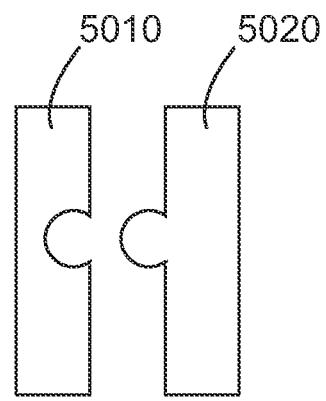
FIG. 50A-C are illustrations of examples of how the folding described in relation to FIG. 40 and FIG. 41 can be applied to a bag with the base pattern of FIG. 36.
Figure 51A:
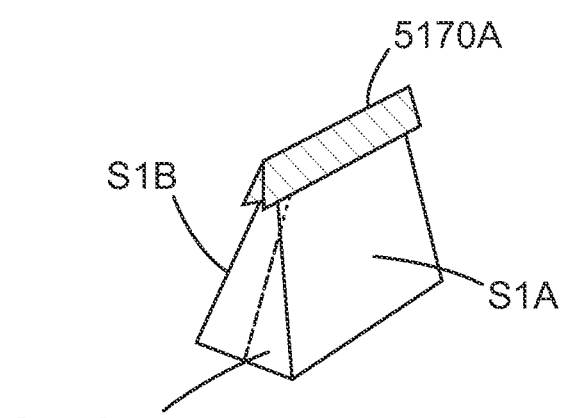
Figure 51B:
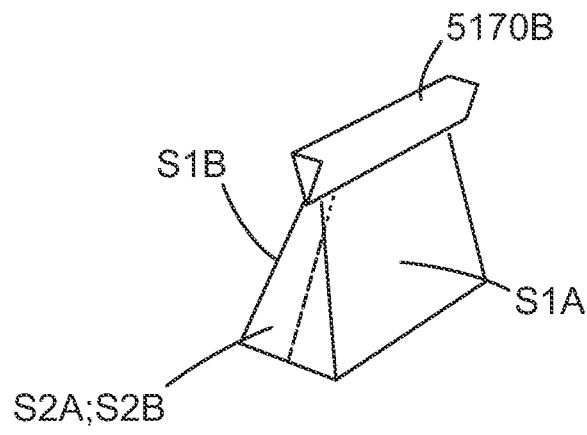
Figure 51C:
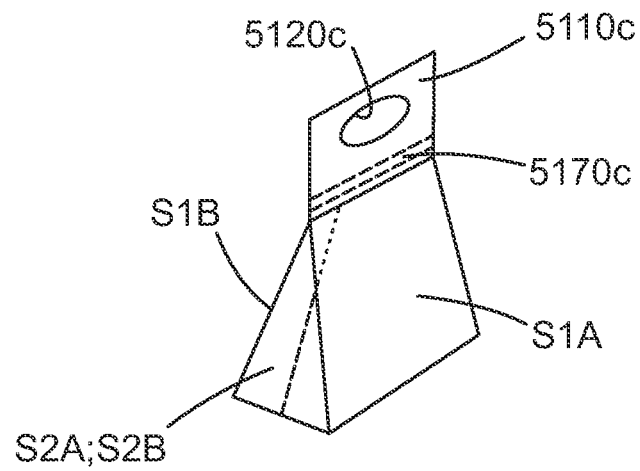
Figure 52A:
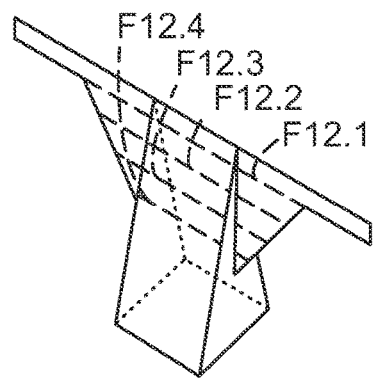
Figure 52B:
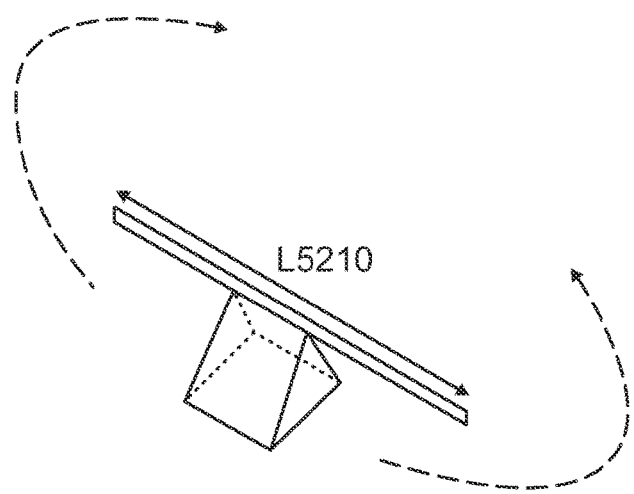
Figure 52C:
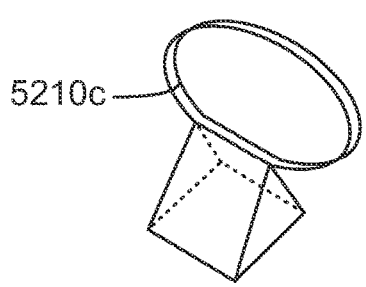
Figure 53A:
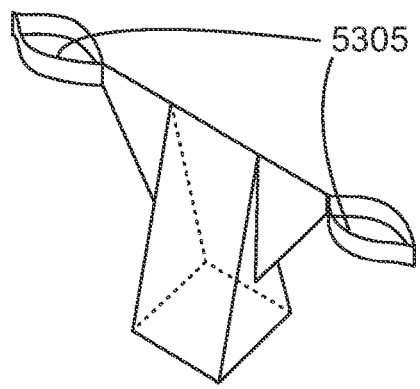
Figure 53B:
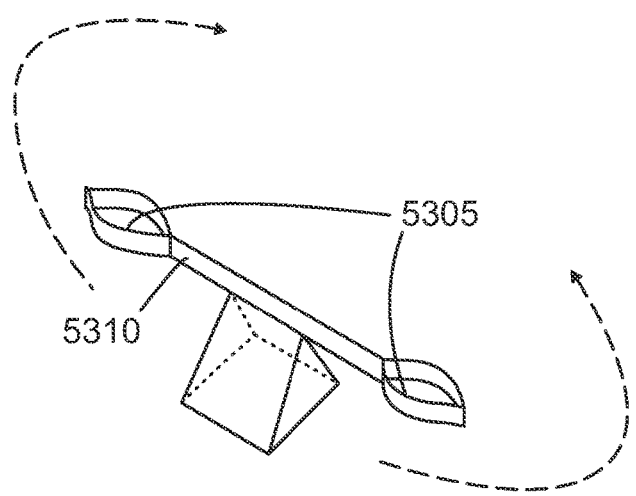
Figure 53C:
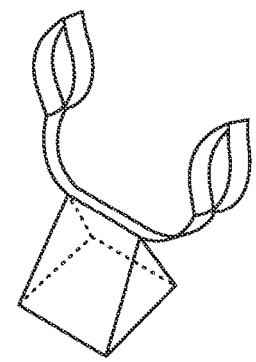

FIG. 50A-C shows yet another example, where FIG. 50A corresponds to FIG. 49A, and so on. In this example, only an outer part of the protrusions 4020a, 4020b, 4020c, 4020d; 4120a, 4120b, 4120c, 4120d is attached to each other. The other parts of the protrusions 4020a, 4020b, 4020c, 4020d; 4120a, 4120b, 4120c, 4120d are preferably not attached to each other, thus allowing the protrusions to form at least one opening 5305. The folding between FIG. 50A and FIG. 50B is done analogous to the folding from FIG. 49A to FIG. 49B. A protrusion in a folded state 5310 looks then similar to what is shown in FIG. 49B, except that the protrusion in a folded state 5310 has said at least one opening. When turning said protrusion in a folded state 5310, this at least one opening 5305 can be used as a handle for the bag. This is indicated in FIG. 50C. What is said in relation to FIG. 49A-C regarding size of areas applies here as well. Providing handles as shown in FIG. 50C has the advantage that no additional elements are needed for the handle.

A Method of Grocery Delivery

According to an embodiment, the carrier bag 20 may advantageously be used by on-line shops, for delivery of frozen or chilled groceries which have been ordered e.g. via the Internet. The advantageous ability of the bag 20 to preserve the frozen or cold state of groceries for an extended length of time may enable a reduction in the cost for delivery of frozen or chilled groceries.

Figure 21:
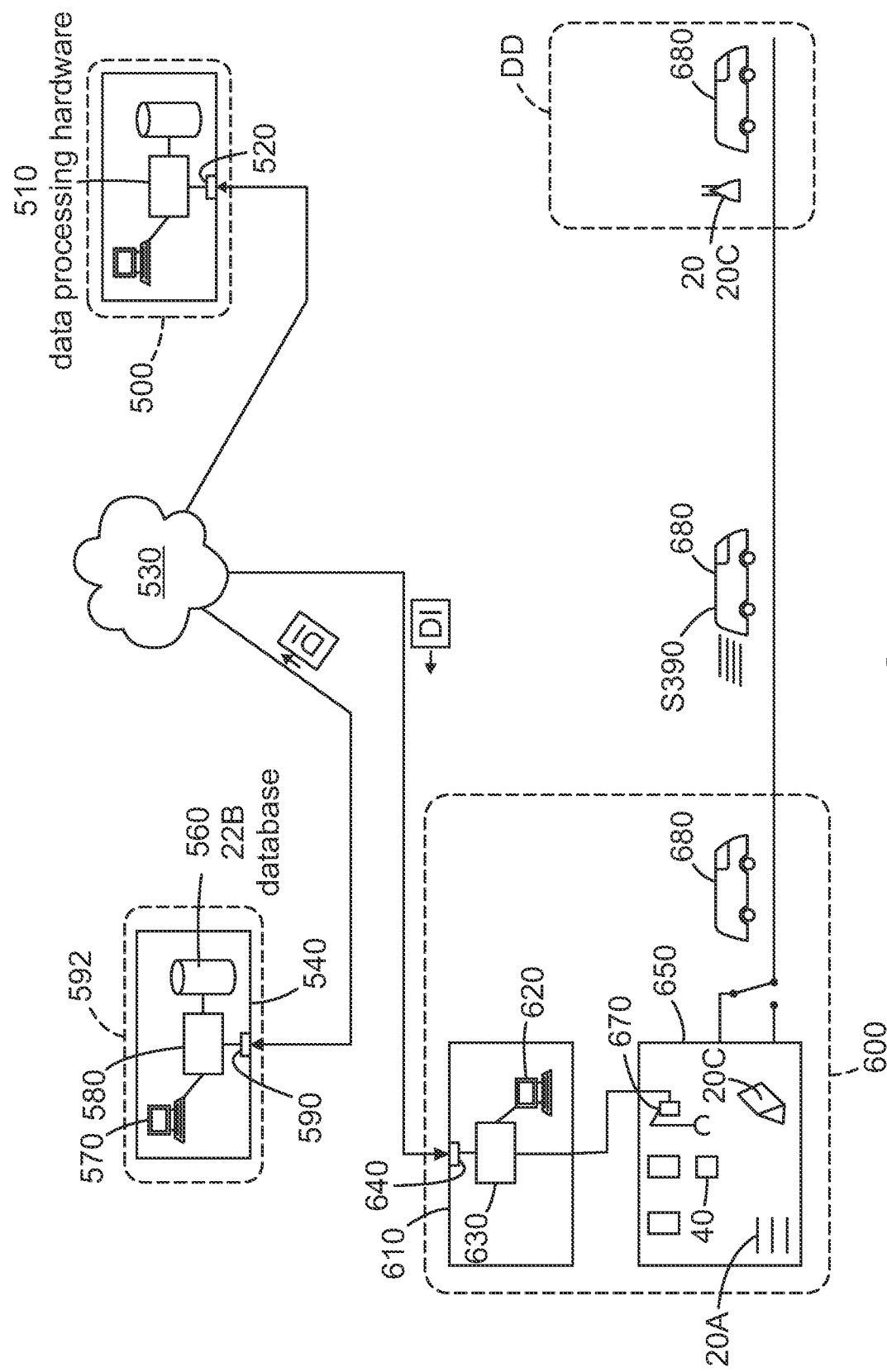
FIG. 21 is a schematic block diagram of an embodiment of a system for delivering groceries.

FIG. 21 shows a schematic block diagram of an embodiment of a system for delivering groceries according to an embodiment of the invention. Reference numeral 500 relates to a client location with a computer 510 having a user interface 520 for enabling a client, such as e.g. a person wanting to buy goods, to access the Internet. The computer 510 has a communications port 520 for bi-directional data exchange. The communication port 520 is connectable to a communications network 530, e.g. via a data interface 19. The communications network 530 may be the world wide internet, also known as the Internet. The communications network 530 may also comprise a public switched telephone network.

A server computer 540 is also connected to the communications network 530. The server computer 540 may comprise a database 560, user input/output interfaces 570 and data processing hardware 580, and a communications port 590. The server computer 540 is located on a server location 592, which is geographically separate from the client location 500. The server location 592 may be in a first city, such as the Swedish capital Stockholm, and the client location may be in another city, such as Berlin, Germany. Alternatively, the server location 592 may be in a first part of a town and the client location may be in another part of the same town. The server location 592 may also be referred to as supplier part 592, or supplier part location 592. The server computer may be part of an on-line business entity 595 for the sales and delivery of goods that needs to be kept chilled, cold or frozen.

The on-line business also includes a storage facility 600 for goods 40. A storage computer 610 is connected to the communications network 530. The storage computer 610 may comprise user input/output interfaces 620 and data processing hardware 630, and a communications port 640.

The storage facility 600 also comprises one or several storage rooms 650. According to an embodiment of the invention, the storage room 650 has a controlled environment, in that the temperature and the relative humidity of the air in the storage room 650 is controlled so that it is kept within certain predetermined ranges.

Figure 22:
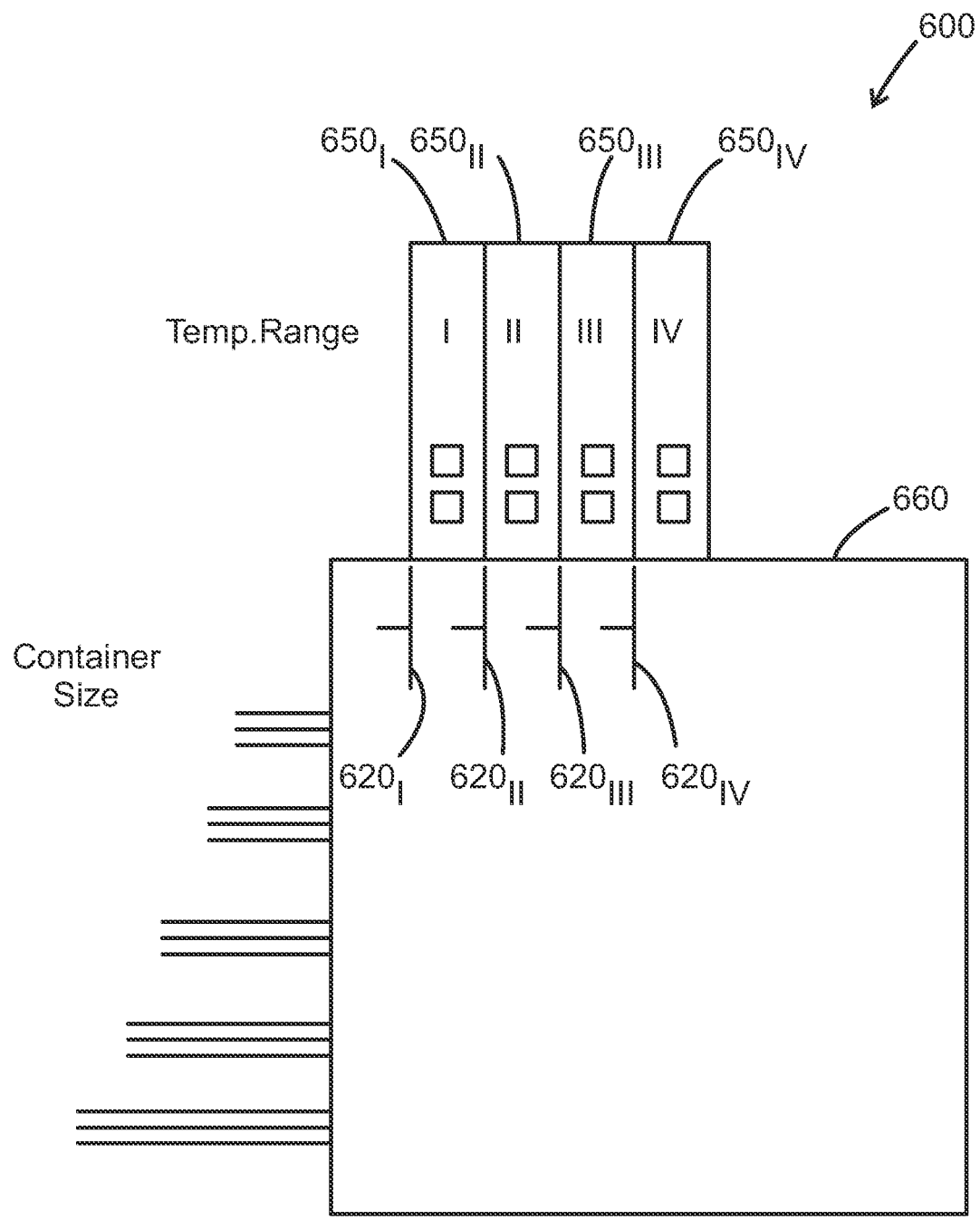
FIG. 22 is a schematic block diagram of an embodiment of a storage facility comprising plural storage rooms.

The goods may comprise a plurality of different types of goods, and the goods may be sorted into different temperature ranges TI, TII, TIII, and TIV, each type of gods being stored in a corresponding storage room $650_{TI}$, $650_{TII}$, $650_{TIII}$, and $650_{TIV}$ having a temperature in accordance with the corresponding goods temperature range TI, TII, TIII, or TIV (See FIG. 22). According to an embodiment the temperature in each storage room is set $650_{TI}$, $650_{TII}$, $650_{TIII}$, and $650_{TIV}$ in accordance with a lowest acceptable goods temperature range for the corresponding goods. According to an embodiment the temperature in each storage room $650_{TI}$, $650_{TII}$, $650_{TIII}$, and $650_{TIV}$ is set in accordance with a lowest acceptable goods temperature range for the corresponding goods, and the relative humidity of the air is also set to a lowest acceptable value dependent on the type of goods in that storage room. According to an embodiment, the relative humidity of the air is set to a value equal to or lower than lower than 40% RH in a room storing chilled or frozen goods so as to reduce or minimize the rate of condensation.

FIG. 22 is a schematic block diagram of an embodiment of a storage facility 600 comprising plural storage rooms $650_{TI}$, $650_{TII}$, $650_{TIII}$, and $650_{TIV}$. With reference to FIG. 22, the facility 600 may also comprise a goods loading room 660. The goods loading room 660 may be arranged so that a storage room 650 is accessible directly from the goods loading room 660.

According to an embodiment, the ambient air temperature in goods loading room 660 is kept lower than +18 degrees Centigrade. The air humidity is advantageously kept low in the environment where chilled or frozen goods is to be packed into containers 20 so as to eliminate or minimize the occurrence of condensation or frosting on chilled or frozen goods. According to an embodiment the relative air humidity is kept lower than 40% RH. According to another embodiment the relative air humidity is kept lower than 20% RH.

In this connection it may be noted that the occurrence of condensation can cause significant heating of chilled, non-frozen, goods. If air humidity causes condensation on the surface of a piece of chilled, non-frozen, goods the increase of the mean temperature of a piece of chilled, non-frozen, goods is:

$$DT_{chg} = 2260 * m_{Cond} / (W_{chg} * m_{chg}), \text{ where}$$

$DT_{chg}$=the increase in mean temperature of the chilled goods [degrees Centigrade]

$m_{Cond}$=number of grams of water being deposited on chilled goods by condensation $W_{chg}$=mean heat capacity of the chilled goods $m_{chg}$=the mass of the chilled goods [kilograms]

For frozen goods the impact of frosting is even more severe. When air humidity causes water droplets to be formed on frozen goods the condensed water may also freeze. The formation of condensed water from air humidity, the condensed water subsequently also freezing to form ice, or frost, is herein also referred to as "frosting". If air humidity causes frosting on the surface of a piece of frozen goods the increase of the mean temperature of a piece of frozen goods is:

$DT_{FRG}=2594*m_{Cond}/(W_{FRG}*m_{FRG})$, where $DT_{FRG}$=the increase in mean temperature of the chilled goods [degrees Centigrade]

$m_{frost}$=number of grams of frost (frozen water) being deposited on frozen goods by condensation & freezing $W_{FRG}$=mean heat capacity of the frozen goods $m_{FRG}$=the mass of the frozen goods, measured in kilograms Accordingly, an object and an advantageous feature of the invention is to eliminate or minimize warming of chilled or frozen goods during packing into a container 20 by eliminating or minimizing the occurrence of frosting and/or condensation on chilled or frozen goods. According to an embodiment, the ambient air temperature in goods loading room 660 is therefore kept lower than +10 degrees Centigrade, and the air humidity is also kept low in the environment where chilled or frozen goods is to be packed into containers 20 so as to eliminate or minimize the occurrence of condensation or frosting on chilled or frozen goods. According to an embodiment the relative air humidity is kept lower than 30% RH. According to another embodiment the relative air humidity is kept lower than 20% RH.

In fact, the energy released by 1 gram of water vapour being turned into a layer of ice on a package containing one kilogram of frozen water is actually sufficient to warm that whole kilogram of frozen water by 1.18 degrees. Thus, if e.g. 12 grams of water vapour is allowed to turn into a frost layer of ice on a package of frozen grocery, that energy (just over 31 kJ) may suffice to warm that grocery by several degrees. The exact temperature change depends on the specific heat capacity $W_{FRG}$ of that particular piece of grocery, as illustrated by the equations listed above. Pure fresh water ice has a specific heat capacity of 2200 J/(kg*K), and thus 12 grams of frost being formed would suffice to warm that one kilogram of fresh water ice by about 14 degrees Centigrade.

In this connection the maximum amount of water vapour at various air temperatures may be relevant. The right hand column in Table 1 below provides an overview of the water mass per unit volume of vapour saturated air. The left hand side column indicates corresponding temperature and the middle column indicates the pressure of saturated vapour.

TABLE 1

| Temperature ° C. | Pressure mbar | Density G m$^{-3}$ |
|---|---|---|
| −35 | 0.23 | 0.22 |
| −30 | 0.37 | 0.35 |
| −25 | 0.63 | 0.57 |
| −20 | 1.03 | 0.91 |
| −15 | 1.65 | 1.39 |
| −10 | 2.60 | 2.15 |
| −8 | 3.09 | 2.53 |
| −6 | 3.68 | 2.99 |
| −4 | 4.37 | 3.53 |
| −2 | 5.17 | 4.14 |
| ±0 | 6.11 | 4.85 |
| +2 | 7.05 | 5.57 |

TABLE 1-continued

| Temperature ° C. | Pressure mbar | Density G m$^{-3}$ |
|---|---|---|
| +4 | 8.13 | 6.37 |
| +6 | 9.34 | 7.27 |
| +8 | 10.72 | 8.28 |
| +10 | 12.26 | 9.41 |
| +12 | 14.01 | 10.67 |
| +14 | 15.97 | 12.08 |
| +16 | 18.17 | 13.65 |
| +18 | 20.62 | 15.39 |
| +20 | 23.37 | 17.32 |
| +22 | 26.42 | 19.44 |
| +24 | 29.83 | 21.81 |
| +26 | 33.60 | 24.40 |
| +28 | 37.79 | 27.26 |
| +30 | 42.42 | 30.39 |
| +32 | 47.55 | 33.85 |
| +34 | 53.19 | 37.61 |
| +36 | 59.41 | 41.74 |
| +38 | 66.25 | 46.25 |
| +40 | 73.77 | 50.17 |
| +42 | 82.01 | 56.52 |
| +44 | 91.02 | 62.38 |
| +46 | 100.87 | 68.57 |
| +48 | 111.64 | 75.50 |
| +50 | 123.4 | 83.0 |

The storage facility 600 also comprises storage of containers 20 for the transport of chilled or frozen goods. The containers 20 may be carrier bags 20 for the transport of chilled or frozen goods. The containers 20 may be provided in plural predetermined sizes, such as e.g. five different sizes. The interior storage space volume of the containers 20 sizes may comprise e.g. 10 litres, 20 litres, 30 litres, 40 litres and 50 litres.

With reference to FIG. 22, the facility 600 may comprise plural storage rooms $650_{TI}$, $650_{TII}$, $650_{TIII}$, and $650_{TIV}$, as mentioned above. The Goods storage facility # may keep a stock of goods $40_I$ at a first cool temperature within the first temperature range $T_I$. The first temperature range may be 15-18 degrees Centigrade. Such goods $40_I$ may comprise grocery such as fresh produce, such as fruit or mushroom, which may be provided in separate portion sized packages or containers 40A. Thus, some goods may be provided at a first, cool, temperature range $T_I$ of about 15-18 degrees Centigrade.

Some goods may be provided at a second, cold non-freezing, temperature range $T_{II}$. The second cold non-freezing temperature range may be a range of about +6 to +8 degrees Centigrade. Alternatively, the cold non-freezing temperature range may be a range of about +1 to +4 degrees Centigrade.

Some goods may be provided at a third temperature range $T_{III}$. The third temperature range TIII may be a freezing temperature range of e.g. between −18 degrees to −22 Centigrade.

Moreover, some goods may be provided at a fourth freezing temperature range $T_{IV}$ which is colder than the third range. The fourth range may be e.g. of between −to −40 degrees Centigrade. Providing frozen goods within such a low temperature range advantageously extends the time required for the frozen goods to warm towards a minimum freezing temperature $T_{frMin}$. The minimum freezing temperature $T_{frMin}$ may be e.g. −10 or −4 degrees Centigrade. The value of the minimum freezing temperature $T_{frMin}$ depends on the type of goods.

According to an embodiment, the fourth freezing temperature range $T_{IV}$ is a settable range, such that the fourth freezing temperature range $T_{IV}$ can be set to a value $T_{IV}=T_{f4}+/-T_{ra}$, wherein the value $T_{IV}$ is a temperature between −25 to −40 degrees Centigrade, and $T_{ra}$=is inaccuracy range. The inaccuracy range $T_{ra}$ may be a narrow span of a few degrees. The inaccuracy range $T_{ra}$ may be a narrow span of e.g. less than two degrees.

When transporting chilled or frozen goods in an embodiment of a chill conserving container 20, the duration from the packing of the chilled or frozen product into the chill conserving container 20 until the goods has reached a certain higher temperature $T_{ch2}$ depends on the initial temperature $T_{ch1}$ of the chilled or frozen goods. Thus, a lower initial goods temperature $T_{ch2}$ will increase the duration $T_{COOL}$ during which the goods is kept below a certain limit value $T_{chlimit}$. Thus a lower initial goods temperature $T_{ch2}$ will enable a longer acceptable transport time of the chilled or frozen goods.

However, the inventors concluded that a lowering of the initial temperature $T_{ch1}$ does not lead to a proportionally longer duration $T_{COOL}$ during which the goods is kept below a certain limit value $T_{chlimit}$.

Figure 23A:
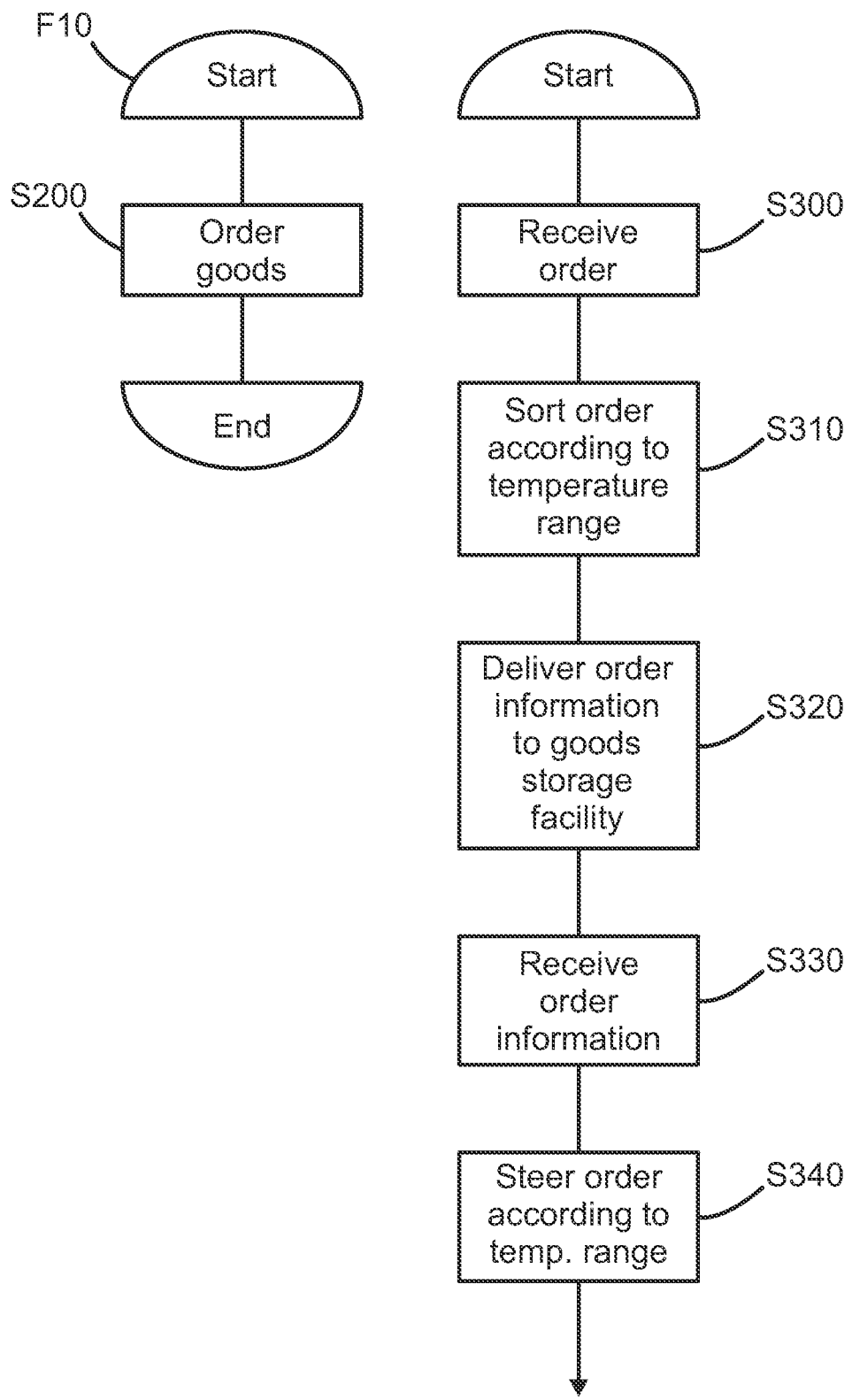
FIG. 23A-C is a schematic block diagram of an embodiment of a method for delivering chilled or frozen goods according to an embodiment.
Figure 23B:
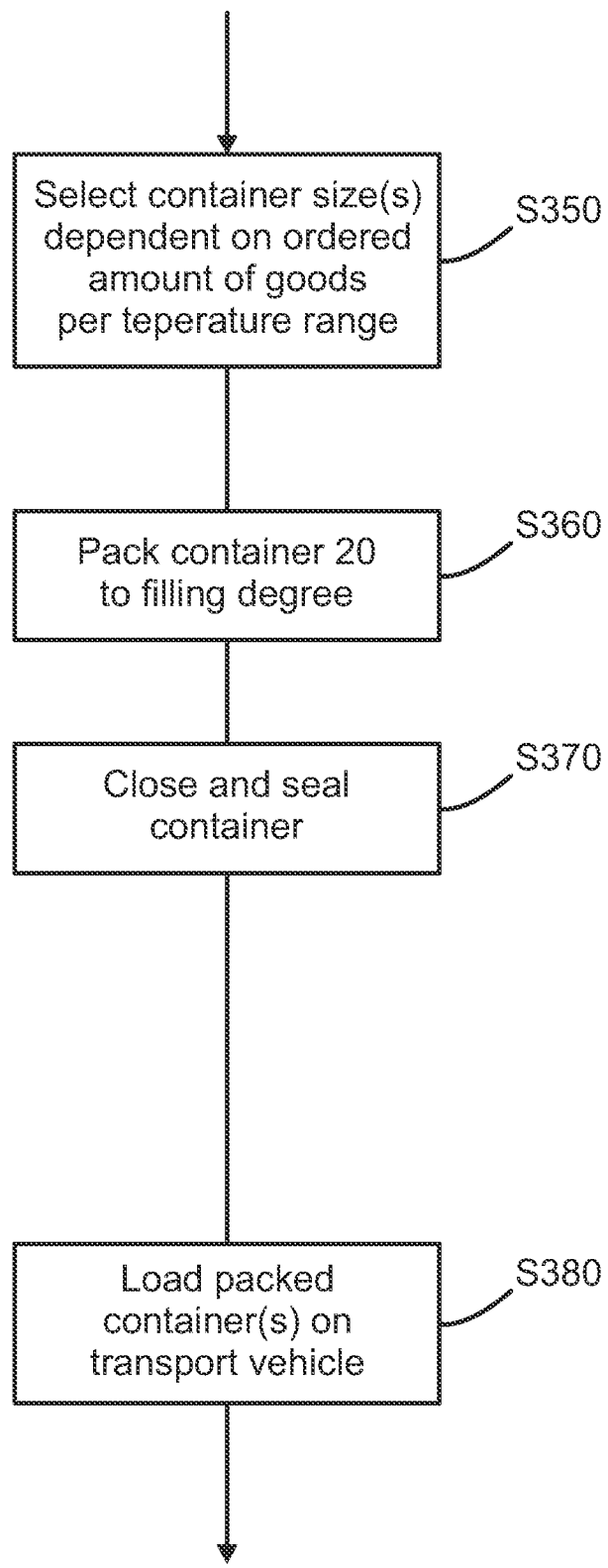

FIGS. 23A and 23B show a schematic block diagram of an embodiment of a method of delivering chilled or frozen goods according to an embodiment of the invention.

With reference to FIG. 23A, the left flow chart F10 illustrates actions performed by means of a client location computer 510. In a step S200 a client, such as e.g. a person wanting to buy goods, places an order for chilled and/or frozen goods by causing the client location computer 510 to communicate with the server computer 540 located at the server location 592. The client may thus place an order for a certain amount A of chilled and/or frozen goods to be delivered to a delivery destination DD.

The server computer 540 may thus be adapted to receive an order, as indicated by step S300 in the right hand side flow chart F20 in FIG. 23A. The server computer 540 may also include functionality for debiting, and for confirming receipt of the order.

When the order includes a request for goods that should be kept within mutually different temperature ranges, the server computer 540 may be adapted to sort the order information according to the goods temperature ranges (step S310).

With reference to FIG. 23A and FIG. 21, the server computer 540 may, in a step S320, transfer a delivery instruction DI to the storage computer 610 at the storage facility 600. The delivery instruction DI may comprise information about the amount of each piece of goods ordered and information indicative of the delivery destination DD. The delivery instruction DI may also be indicative one or plural goods temperature ranges associated with the ordered goods.

In a step S330 the delivery instruction DI may be received by the storage computer 610 at the storage facility 600. In a step S340 the storage computer 610 may be adapted to create a packing instruction PI. The packing instruction may include information about the amount of each piece of goods ordered.

It is noted that the step S310 may be performed by the storage computer 610, as an alternative to being performed by the server computer.

When the order includes a request for goods that should be kept within mutually different temperature ranges, the storage computer 610 may be adapted include structured information in the packing instruction PI so that an approximate volume and/or an approximate mass of the goods within an individual temperature range TI, TII, TIII, or TIV is indicated by the packing instruction PI. In dependence on the information in the packing instruction PI the storage computer 610 may generate an indication of a suitable type and/or suitable size of transport container for the ordered goods. As mentioned above, the containers 20 may be provided in plural predetermined sizes, such as e.g. five different sizes. The interior storage space volume of the containers 20 sizes may include plural container volume sizes V1, V2, V3, V4, V5. The container volumes may include V1, V2, V3, V4, V5 being mutually different sizes such as e.g. 10 litres, 20 litres, 30 litres, 40 litres and 50 litres.

With reference to FIG. 21 in conjunction with FIG. 22, and step S340 in FIG. 23A, the storage computer 610 may deliver the packing instruction PI to a relevant user input/output interface $620_I$, $620_{II}$, $620_{III}$, or $620_{IV}$ dependent on the volume and/or mass indicated for goods within an individual temperature range TI, TII, TIII, or TIV is indicated by the packing instruction PI. Thus, for example, when the packing instruction PI includes an indication that X kg of goods within the fourth temperature range TIV is to be packed, the instruction may be sent to the corresponding user input/output interface $620_{IV}$ (See FIG. 22). A user input/output interface $620_I$, $620_{II}$, $620_{III}$, and/or $620_{IV}$ may include a display. The display $620_I$, $620_{II}$, $620_{III}$, and/or $620_{IV}$ may be adapted to be read by a person whose task it is to move the indicated amount of goods from the indicated storage room $650_{II}$, $650_{III}$, $650_{III}$, and/or $650_{TIV}$ into a container 20 having an indicated size V1, V2, V3, V4, or V5. It has been found that there is an optimum filling degree of a chill container 20. Moreover, it has been found that if X kg of a certain chilled or frozen goods is to be transported, it is better to include the X kg in one chill container 20 than to split the X kg into smaller plural smaller amounts in different containers. Thus, all goods within a certain temperature range should preferably be collectively packed in as few containers as possible, while not exceeding the optimum filling degree of a chill container 20. The optimum filling degree allows for an air gap to form between the inner surface of the container 20 and the outer surface of the cold or frozen goods. Preferably the container is filled to a filling degree such that the chilled goods avoids physical contact with any side wall and with the inside of the closed upper surface, i.e. the sealed opening portion of the container 20. Thus, packing instruction PI may include information indicative of a recommended number container(s) 20 and recommended container size V1, V2, V3, V4, or V5 for goods within each temperature range (see step S350 in FIG. 23A) so as to allow for packing a minimum number of uniform goods temperature containers being filled to the optimum filling degree.

In a step S360 one or plural containers 20 are packed. According to a preferred embodiment, a certain container 20 is filled with goods having mutually uniform temperature. This advantageously contributes to a substantially uniform temperature throughout the goods in that container 20, and it minimizes any temperature re-distribution between mutually different pieces of goods. Thus, in step S360 one or plural containers 20 may be packed such that a minimum number of uniform goods temperature containers are filled to the optimum filling degree. With reference to FIG. 22, the actual packing of containers 20 may be performed manually by a person receiving instructions from the user interface 620 in goods loading room 660.

When the container(s) 20 have been filled, as described above, each container 20 may be closed and sealed, as indicated in step S370 (FIG. 23B). This may also be done manually, as described elsewhere in this document, there are many alternative manner by which closing and/or sealing of the container 20 may be performed. This may include heat welding, gluing, sealing by use of a tape, or by clamping. Closing and/or sealing of the container 20 may be also be performed by folding a rim portion of a bag 20. With reference to figure According to yet an embodiment the container 20 may include a neck portion 662 of flexible material at the rim portion of the container wall(s), the flexible material being shaped and sized to allow a string 664 being placed around the neck portion so as to strangle the neck portion such that the container becomes substantially sealed.

According to an embodiment, the storage computer 610 may deliver the packing instruction PI to a packing robot 670 (See FIG. 21 in conjunction with step S340 in FIG. 23A). Although FIG. 21 only shows one storage room 650, it is to be understood that there may be plural storage rooms 650$_{TI}$, 650$_{TII}$, 650$_{TIII}$, 650$_{TIV}$ and one, several or all the storage rooms 650$_{TI}$, 650$_{TII}$, 650$_{TIII}$, 650$_{TIV}$ may be provided with a packing robot 670, thereby enabling complete packing to be to performed in a cold and dry environment.

When packing is performed by a robot the whole packing procedure may be performed within the respective storage room 650$_{TI}$, 650$_{TII}$, 650$_{TIII}$, 650$_{TIV}$ having a controlled air temperature and a controlled air humidity. For optimum cold retention properties of the container 20 during the-transport-to-come, the container 20 should preferably be packed and sealed such that the air trapped within the container 20 has a relative humidity of less than 70% at an air temperature equal to the surface temperature of the goods during packing.! The purpose of this feature is to minimize or eliminate the risk of condensation occurring within the container 20. Since the relative air humidity decreases in response to increased temperature, such relatively dry air being initially trapped in the container may not only avid causing condensation, but it may also advantageously be able to absorb and dilute some humidity that may originate from the chilled goods or from a minor entry of ambient air during transport.

With reference to step 380 in FIG. 23B, and FIG. 21, the sealed container(s) 20 may be placed in or on a transport vehicle 680 for distribution to the delivery destination DD. The delivery destination may be the client location 500, or a geographically different place.

Figure 23C:
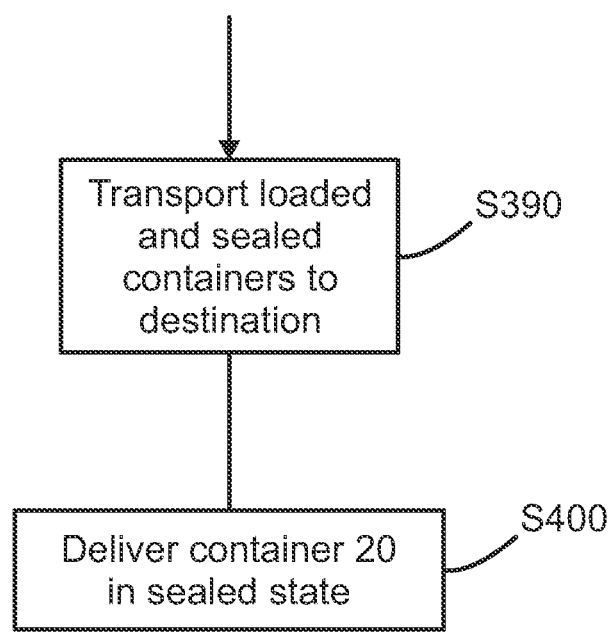
Figure 24:
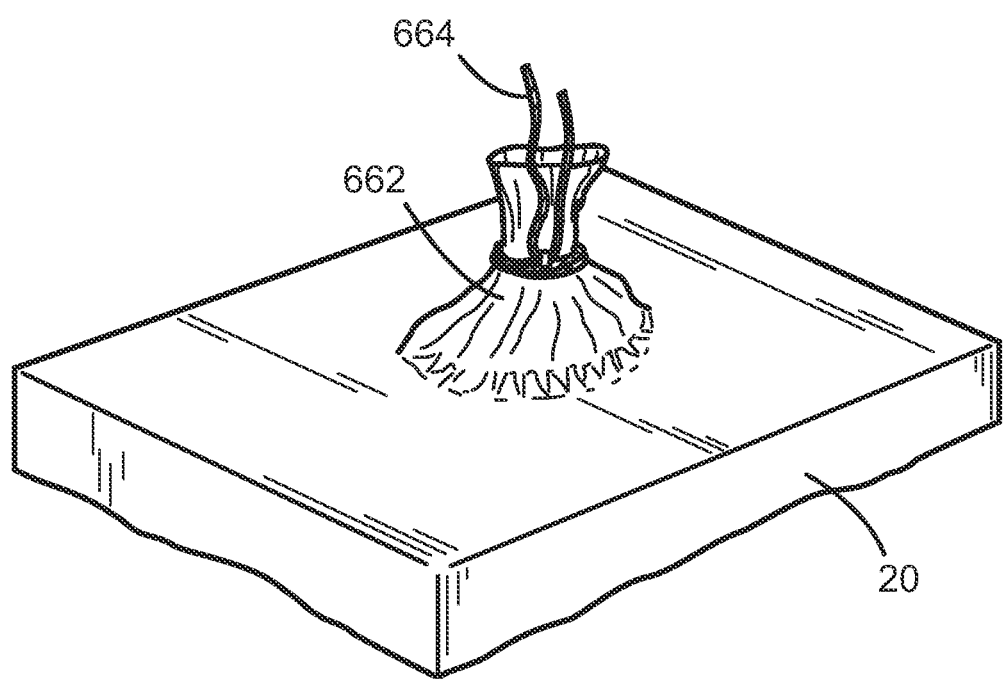
FIG. 24 is an illustration of an embodiment of a substantially sealed container.

As illustrated by step S390 in FIG. 23C, the sealed container(s) is/are transported to the delivery destination DD in accordance with the information in the delivery instruction DI. The sealed container(s) 20 may have the ability to retain an initial low goods temperature for a long time due to the interaction of a number of cleverly combined features, as described elsewhere in this document, even when used in an air atmosphere environment having an ambient air temperature of more than +10 degrees Centigrade. The sealed container(s) 20 may have the ability to retain an initial low goods temperature for a long time also when the air atmosphere environment has an ambient air temperature of more than +20 degrees Centigrade or more.

With reference to step S400 in FIG. 23B, and FIG. 21, the sealed container(s) 20 may be delivered at the delivery destination DD in accordance with the information in the delivery instruction DI.

In fact, a test has been made where the air atmosphere environment had an ambient air temperature of +60 degrees Centigrade, and kraft paper carrier bag 20, according to an embodiment of the invention, was loaded with a mass of 5 kg frozen chicken meat. The kraft paper bag according to the embodiment used in the test had:

kraft paper Basis weight=136.3 g/m2 kraft paper layer Thickness=161 μm kraft paper Density 848 kg/m3

Air permeance of the water vapour impermeable PE layer: less than 0.35 μm/Pa·s, i.e. sufficiently low not to be measurable according to ISO 5636-3: 2013

Thermal conductivity of the bag wall having a kraft paper layer and a water vapour impermeable PE layer as defined above: 0.098 W/(mK) (It is noted that the thermal conductivity was established separately at 22° C. and 50% RH).

Figure 25:
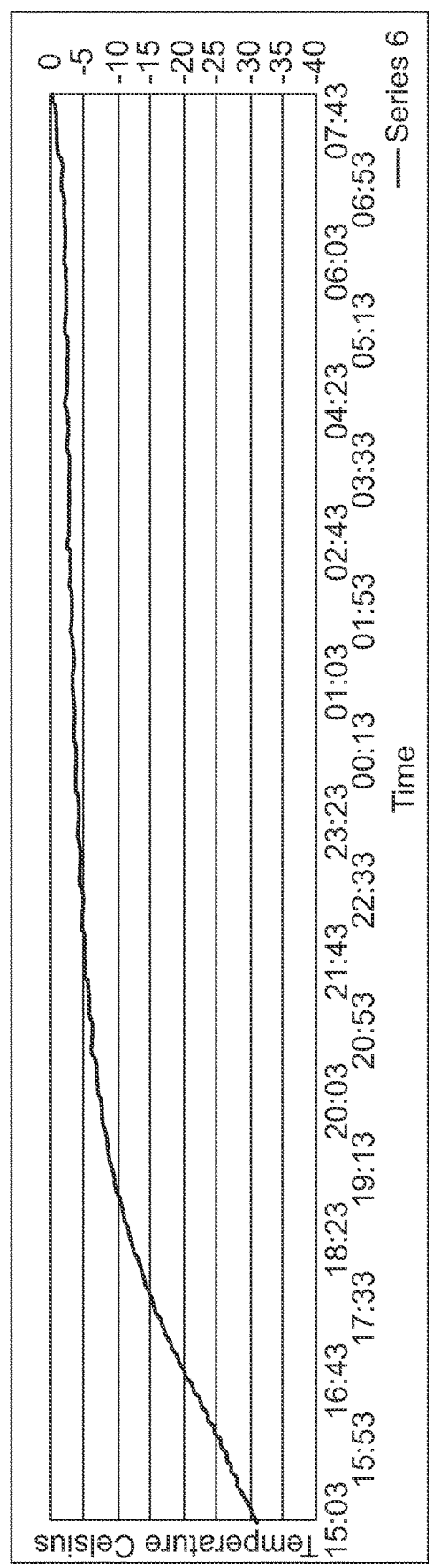
FIG. 25 is an illustration of test results.

A temperature probe was placed in between plural 1 kg packages of frozen chicken, the total weight of the frozen chicken being 5 kg. Test results are indicated in FIG. 25. The horizontal axis in FIG. 25 indicates time, and the vertical axis indicates temperature. The initial temperature of the frozen chicken, as indicated by the measurement probe, was −30.9 degrees Centigrade, at 15:03, i.e. at 3 PM local time. Ambient air had a constant temperature of 60 degrees Centigrade, and the measurement continued until 07:43 the next morning. As illustrated in FIG. 25 it took four hours before the meat, at 19:13 reached −10 degrees Centigrade.

Thus, the above described method of packing a container with chilled and/or frozen goods advantageously enables a very cost effective delivery of chilled and/or frozen goods. In particular it is noted that the above described method of packing a container with chilled and/or frozen goods advantageously enables transporting the chilled and/or frozen goods for an extended amount of time without requiring the use of a vehicle having active cooling or freezing devices.

In another test, the air atmosphere environment had an ambient air temperature of +20 degrees Centigrade and a relative humidity of 70% RH. A kraft paper carrier bag 20, according to an embodiment of the invention, was loaded with a mass of 4.7 kg frozen fresh water. The kraft paper bag according to the embodiment used in the frozen fresh water test had:

kraft paper Basis weight=136.3 g/m2 kraft paper layer Thickness=161 μm kraft paper Density 848 kg/m3

Air permeance of the water vapour impermeable PE layer: less than 0.35 μm/Pa·s, i.e. sufficiently low not to be measurable according to ISO 5636-3: 2013

Thermal conductivity of the bag wall having a kraft paper layer and a water vapour impermeable PE layer as defined above: 0.098 W/(mK) (It is noted that the thermal conductivity was established separately at 22° C. and 50% RH).

Figure 26:
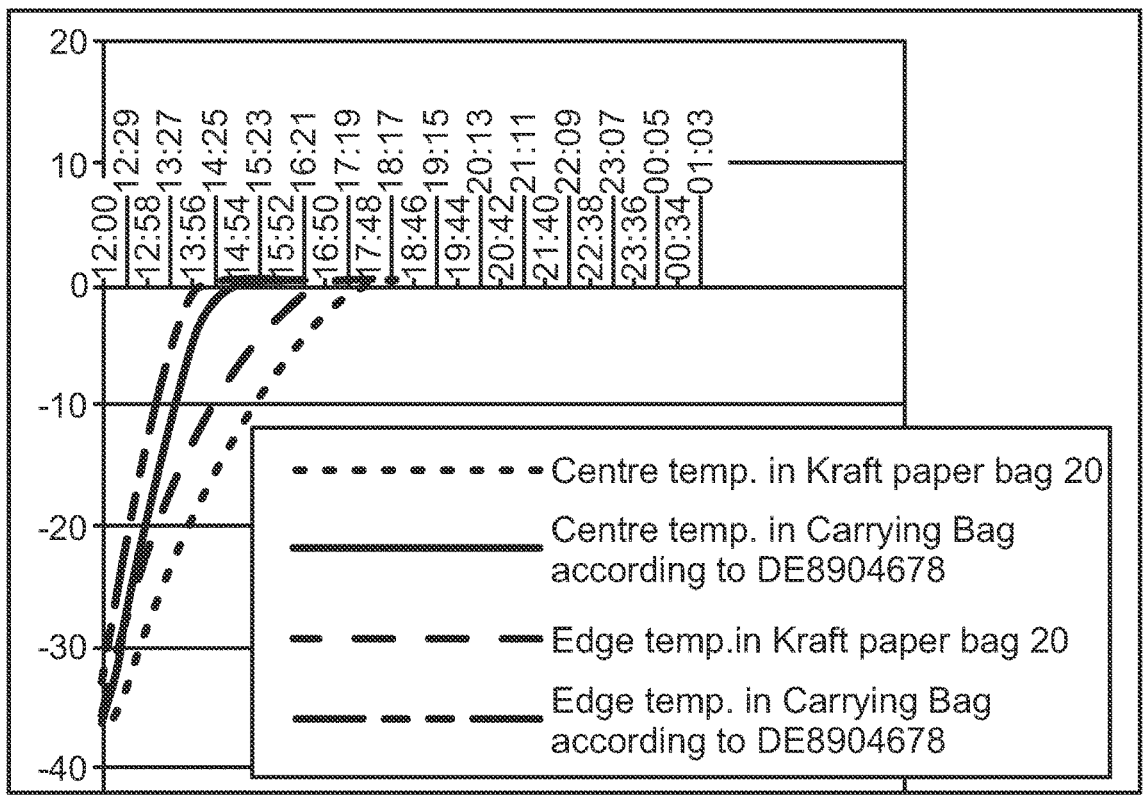
FIG. 26 illustrates examples of graphs of the temporal progression of temperature in two positions in a block of ice which was placed in a bag.

FIG. 26 illustrates graphs of the temporal progression of temperature in two positions in a block of ice which was placed in a bag 20 according to the above described embodiment. As a comparison FIG. 26 also illustrates graphs of the temporal progression of temperature in two positions in a block of ice which was placed in a bag according the prior art. Tables 2 and 3 (the next page of this document) provide measured values.

Figure 27:
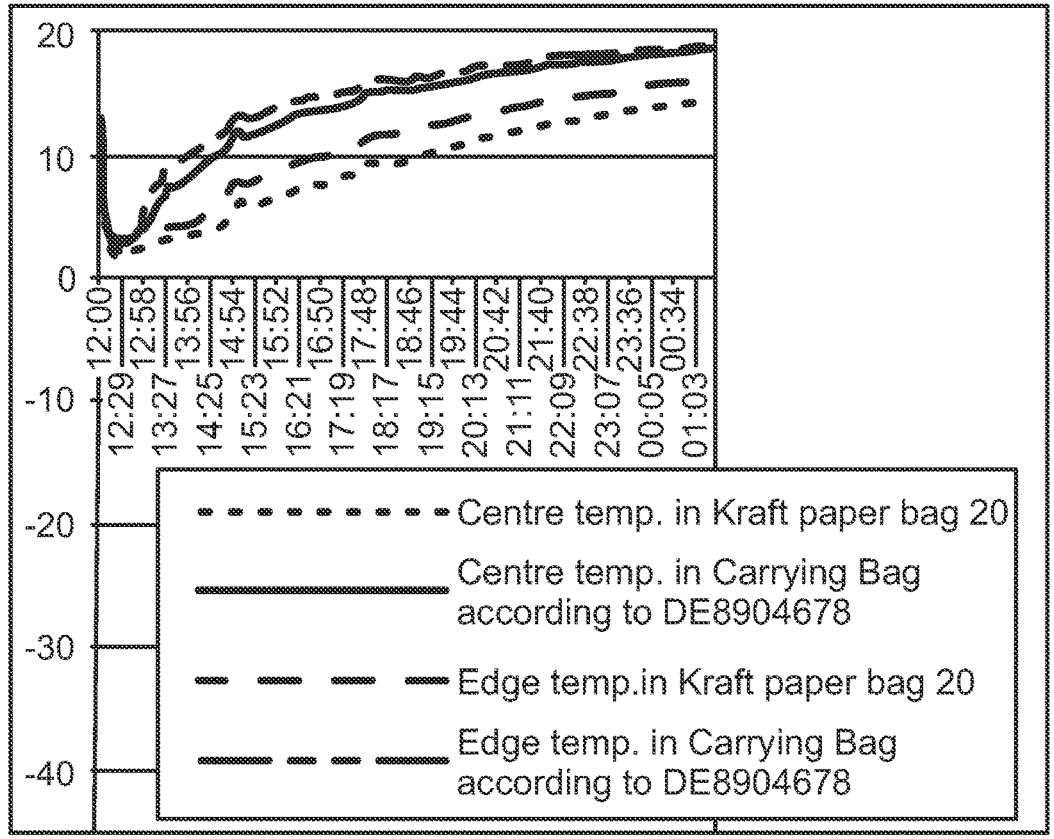
FIG. 27 illustrates examples of graphs of the temporal progression of temperature in two positions in a 4.7 litre canister of fresh water which was placed in a bag.

FIG. 27 illustrates graphs of the temporal progression of temperature in two positions in a 4.7 litre canister of fresh water which was placed in a bag 20 according to the above described embodiment. As a comparison FIG. 27 also illustrates graphs of the temporal progression of temperature in two positions in a 4.7 litre canister of fresh water which was placed in a bag according the prior art. Tables 4 and 5 (the next page of this document) provide measured values.

TABLE 2

| Time from +1° C. measured in the centre of the frozen goods | +5° C. | +8° C. | +10° C. |
|---|---|---|---|
| Carrier bag according to DE 8904678 | 53 min | 1 h 47 min | 2 h 23 min |
| Kraft paper bag 20 | 2 h 26 min | 5 h 13 min | 6 h 53 min |

TABLE 3

| Time from −30° C. measured in the centre of the frozen goods | −18° C. | −15° C. | −10° C. | −5° C. | 0° C. |
|---|---|---|---|---|---|
| Carrier bag according to DE 8904678 | 38 min | 49 min | 1 h 09 min | 1 h 33 min | 2 h 50 min |
| Kraft paper bag 20 | 1 h 16 min | 1 h 41 min | 2 h 30 min | 3 h 27 min | 5 h 11 min |

TABLE 4

| Time from +1° C. measured in an edge of the frozen goods | +5° C. | +8° C. | +10° C. |
|---|---|---|---|
| Carrier bag according to DE 8904678 | 53 min | 1 h 47 min | 2 h 23 min |
| Kraft paper bag 20 | 2 h 26 min | 5 h 13 min | 6 h 53 min |

TABLE 5

| Time from −30° C. measured in an edge of the frozen goods | −18° C. | −15° C. | −10° C. | −5° C. | 0° C. |
|---|---|---|---|---|---|
| Carrier bag according to DE 8904678 | 31 min | 41 min | 59 min | 1 h 21 min | 2 h 21 min |
| Kraft paper bag 20 | 1 h | 1 h 22 min | 2 h 06 min | 3 h 01 min | 4 h 20 min |

Further embodiments are described below:

Embodiment A1

A container for use in an air atmosphere environment, the container having
    a wall adapted to enclose an interior storage space for transporting chilled and/or frozen goods, the wall being shaped and adapted to form said interior storage space to a volume of at least ten metric litres; said wall comprising:
a) a layer of a material having a thermal conductivity of less than 0.2 W/(K*m); and
b) a substantially water vapour impermeable membrane bonded to at least one side of said material layer; and
c) a closable opening such that the container in its closed state substantially seals the interior storage space from the environment so as to minimize or prevent entry of air from the environment into the interior storage space.

Embodiment A2

The container as defined in Embodiment A1, wherein the wall is shaped and adapted to form said interior storage space to a volume of at least 20 metric litres; and wherein said material layer has a tensile strength exceeding 0.267 Newton/square millimeter.

Embodiment A3

The container as defined in Embodiment A1, wherein the wall is shaped and adapted to form said interior storage space to a volume of at least 30 metric litres; and wherein said material layer has a tensile strength exceeding 0.4 Newton/square millimeter.

Embodiment A4

The container as defined in Embodiment A1, wherein the wall is shaped and adapted to form said interior storage space to a volume of at least 40 metric litres; and wherein said material layer has a tensile strength exceeding 0.533 Newton/square millimeter.

Embodiment A5

The container as defined in Embodiment A1, wherein the wall is shaped and adapted to form said interior storage space to a volume of at least 50 metric litres; and wherein said material layer has a tensile strength exceeding 0.667 Newton/square millimeter.

Embodiment A6

The container as defined in Embodiment A1, wherein the container is adapted to be collapsible so as to have
    a collapsed state for enabling transportation of the container in a substantially flat state, and
    an expanded state such that the container, in its expanded state, provides an interior storage space for transporting chilled and/or frozen goods.

Embodiment A7

The container as defined in Embodiment A1, wherein
the container is shaped in such a manner that plural containers 20 can be stacked so as to enable transporting a plurality of stacked containers within a certain volume in three dimensional space; said certain volume being smaller than the sum of the individual container volumes.

Embodiment A8

The container as defined in Embodiment A7, wherein an individual container has, at least partly, a cone shape such that two at least partly cone shaped containers can be placed one partly within the other.

Embodiment A9

The container as defined in Embodiment A1, wherein said material layer is a biodegradable material.

Embodiment A10

The container as defined in Embodiment A1, wherein said substantially water vapour impermeable membrane is a biodegradable material.

Embodiment A11

The container as defined in Embodiment A1, wherein said material layer is a biodegradable material; and wherein said substantially water vapour impermeable membrane is a biodegradable material.

Embodiment A12

The container as defined in Embodiment A1, wherein the container, when in use for transporting chilled and/or frozen goods, is shaped and adapted to enable a human to carry the container such that the centre of gravity of the loaded container is less than 10 cm from at least one container wall. This advantageously allows for an ergonomically friendly carrying of the container.

Embodiment A13

The container as defined in Embodiment A1, wherein said wall is shaped and adapted to form said interior storage space to a volume of less than 100 metric litres.

Embodiment A14

The container as defined in Embodiment A1, wherein said wall comprises Kraft paper.

Embodiment A15

The container as defined in Embodiment A1, wherein said wall comprises a Non-woven material
Conventional textiles
Film of foamed/porous thermoplastic.

Embodiment A16

The container as defined in Embodiment A1, wherein said material layer has a tensile strength exceeding 0.133 Newton/square millimeter.

Embodiment A17

The container as defined in Embodiment A1, wherein said wall material is selected from a list comprising:
Film of foamed/porous thermoplastic. The thermoplastic may be a conventional oil-based plastic such as polyethylene, polypropylene or polyurethane. It is also possible to use a bio-based plastic, polylactic acid (PLA)
Film of foamed/porous rubber (rubber can be of many types, but neoprene (chloroprene rubber) are preferred.

Embodiment A18

The container as defined in Embodiment A16, wherein Said non-woven materials and conventional textiles have a tensile index value exceeding 50 kNm/kg and a thermal conductivity of $\lambda<0.2$ W/(m·K).

Embodiment B1

A grocery transport system comprising
a storage facility (600) for goods; The storage facility comprising one or several storage rooms having a controlled environment, in that the temperature and the relative humidity of the air in the storage room is controlled so that it is kept within certain predetermined ranges; wherein the goods comprises a plurality of different types of goods, at least one type of goods being chilled or frozen.

Further embodiments are disclosed below:

Embodiment C1

A collapsible handle-carryable grocery carrier bag (20) for use in an air atmosphere environment (10), the carrier bag (20) having
a collapsed state (20A) for enabling transportation of the carrier bag in a substantially flat state, and
an expanded state (20B, 20C) such that the carrier bag, in its expanded state, provides an interior storage space (100) for transporting chilled and/or frozen grocery packages (40), the carrier bag (20) comprising:
a paper layer (180) being shaped and folded so as to form
a front wall panel (110, S1A),
a back wall panel (120, S1B),
two mutually opposing side wall panels (130A, S2A; 130B, S2B); and
a substantially rectangular bottom panel (140); wherein the wall panels and the bottom panel cooperate to form said interior storage space (100) to a volume of between 10 litres and 50 litres in the expanded state of the carrier bag; and
wherein a rim portion (150) of the wall panels facing away from the bag bottom panel (140) provides a bag opening (160); the carrier bag (20) further comprising
a first handle (170A) adapted to allow gripping by a human hand for enabling carrying of the grocery carrier bag, the first handle comprising a paper strip formed in a U-shape and having two paper strip end portions (200A; 210A); the paper strip end portions (200A; 210A) of the first handle (170A) being attached to said rim portion (150) of said front wall panel (110, S1A); and wherein
said paper layer is a kraft paper layer (180) having a surface weight of at least 100 grams per square meter; said kraft paper layer (180) having a substantially water vapour impermeable membrane (190) bonded to at least one side of the kraft paper layer (180); and wherein
the carrier bag (20) has
a mechanical interlock (240) attached to said rim portion (150); said mechanical interlock (240) being arranged and positioned to provide
an open expanded state (20B) of the carrier bag (20) for loading and/or unloading grocery packages (40) to be transported, and
a closed expanded state (20C) of the carrier bag (20) such that the carrier bag, in its closed expanded state (20C), provides a substantially closed interior storage space (100) for transporting chilled and/or frozen grocery packages; wherein
the mechanical interlock (240) is closable such that, in the closed expanded state (20C) of the carrier bag, the mechanical interlock (240) cooperates with said wall panels and bottom panel so as to close and substantially seal the interior storage space (100) from the environment (10) so as to minimize or prevent entry of air from the environment into the interior storage space (100) such that when a grocery package comprising frozen food is transported in said interior storage space the grocery bag is adapted to minimize or prevent the occurrence of condensation within the interior storage space (100).

This solution advantageously provides a collapsible handle-carryable grocery carrier bag enabling the transport of frozen or chilled groceries while maintaining the frozen or chilled state of the groceries for a dramatically extended duration of time, while preserving the integrity of the carrier bag during transport, even when the bag is transported in tropical environments, e.g. at temperatures of 25 degrees Centigrade or more.

In this context it is to be noted that the air in the atmosphere of the earth inherently has a certain humidity. In other words, the air contains a certain amount of water in vapour form. In this context, it deserves mentioning that the absolute humidity is the mass of water vapour per unit volume of total air and water vapour mixture. Absolute humidity in the atmosphere reaches roughly 30 grams per cubic meter when the air is saturated at 30° C. The absolute humidity in southern Sweden in the month of July (average value for the years 1996 to 2012) ranged from 9 grams/cubic metre to 12 grams/cubic metre, according to the Swedish Meteorological and Hydrological Institute (SMHI).

A relative air humidity of around 50% is common, and during summertime or in subtropical or tropical climate zones the outdoor air humidity may be higher than that. Thus a relative air humidity of around 80% is not unusual. The relative humidity of an air-water mixture is defined as the ratio of the partial pressure of water vapour ($H_2O$) in the mixture to the saturated vapour pressure of water at a given temperature. Thus the relative humidity of air is a function of both water content and temperature. As a rule of thumb, the relative air humidity may be estimated to increase by about 5% when the temperature drops by 1 degree. Accordingly, when the air of the environment has a temperature of +18 degrees C. and a relative air humidity of e.g. 60% and that air meets a cold surface, vapour may condense into liquid water on the surface when the air temperature reaches the dew point, i.e. a relative air humidity of about 100%.

In this context, it also to be noted that heat is released when vapour condenses into liquid water. In fact, one (1) gram of liquid water being formed from vapour releases 2260 J (joule) of energy. When that one gram of liquid water freezes to ice form it releases another 334 J. Thus, the energy released by 1 gram of water vapour being turned into a layer of ice is 2594 J. By comparison, it is to be noted that only 2.2 J is required in order to increase the temperature of 1 gram of ice (frozen water) by one degree. In other words, the energy released by 1 gram of water vapour being turned into a layer of ice on a package containing one kilogram of frozen water is actually sufficient to warm that whole kilogram of frozen water by 1.18 degrees. Thus, if 12 grams of water vapour is allowed to turn into a frost layer of ice on a package of frozen grocery, that energy (just over 31 kJ) suffices to warm that grocery by several degrees. The exact temperature change depends on the specific heat capacity of that particular piece of grocery. Ice has a specific heat capacity of 2200 J/(kg*K), and thus 12 grams of frost being formed would suffices to warm that one kilogram of fresh water ice by about 14 degrees Centigrade.

Thus, whereas a collapsible handle-carryable grocery carrier bag according the state of the art, as disclosed by the German Utility Model Application DE 89 04 678 provides handles for conveniently carrying the groceries, any frozen grocery packages would appear to inherently cause vapour to condense into liquid water when the open carrier bag is transported in a warm air atmosphere environment having air humidity allowing such air to reach the dew point on a frozen grocery package surface. Such a condensation process may actually cause a rapid warming of the frozen grocery. Moreover, if the state of the art carrier bag according to DE 89 04 678 is carried by a walking person in a warm air environment, the movement would appear to inherently cause an exchange of air between the bag interior, which is chilled by the frozen groceries, and the warmer air surrounding the carrier bag, and this air exchange process will further drive the process of condensing vapour into liquid water by supplying new warm air to surfaces of the frozen groceries. Not only does this process cause thawing of initially frozen groceries and warming of initially chilled groceries, but it may also produce liquid water by condensation inside the carrier bag, which may jeopardize the integrity of the bag bottom or side wall, since it is made solely of paper, according to DE 89 04 678. Thus, the strength of carrier bag made solely of paper may decrease, and the risk of breaking increases when the paper-only-carrier bag becomes wet.

By contrast, the collapsible handle-carryable grocery carrier chill bag according to the above defined solution comprises a mechanical interlock which is closable such that, in the closed expanded state of the carrier bag, the mechanical interlock cooperates with said wall panels and said bottom panel so as to close and substantially seal the interior storage space from the environment so as to minimize or prevent entry of air from the environment into the interior storage space such that when a grocery package comprising frozen food is transported in said interior storage space the grocery bag is adapted to minimize or prevent the occurrence of condensation within the interior storage space.

Thus, for example, if a carrier bag, having a volume of 50 litres in the expanded state of the carrier bag, is filled by 75% with frozen groceries, there will remain about 25% of the total volume which can be filled by air in connection with the loading of the bag. Thus, as an example, about 12.5 liters of air having an initial temperature of about 18 degrees Centigrade and, about 10 grams of water per cubic metre (example relating to approximate average absolute outdoor humidity in southern Sweden in the month of July) may be enclosed in the bag when it is sealed after packing. In this connection it is noted that the term "litre" means "metric litre" i.e. one litre equals one cubic decimetre. Accordingly, the 12.5 liters of contained air may include about 0.125 grams of water in vapour form. Air contained within the bag together with frozen groceries may be caused to cool, and during this decreasing of the air temperature the water vapour in that air may first condense into water, releasing 0.2825 kJ of energy, and then it may freeze releasing 0.04175 kJ of energy. Thus, the two phase changes during the transformation of 0.125 grams of water from vapour form into ice may deliver 0.324 kJ. The energy released may suffice to increase the temperature of 10 kg of frozen water by less than half a degree Centigrade. According to an estimate it would be about 0.008 degrees Centigrade. The energy released by cooling the 0.125 grams of water by 19 degrees Centigrade is comparatively small and may actually be regarded as negligible is comparison. In effect, the grocery bag being adapted to minimize or prevent entry of air from the environment into the interior storage space advantageously contributes to maintaining the frozen or chilled state of the groceries for a significantly extended duration of time, while also preserving the integrity of the carrier bag by minimizing or preventing the formation of liquid water within the interior storage space, and by the kraft paper layer having a substantially water vapour impermeable membrane bonded to at least one side of the kraft paper layer, thereby reducing or preventing paper disintegration due to paper wetness.

According to another aspect of the invention, a problem to be addressed is how to achieve an improved, yet cost-efficient, transportation of grocery items.

This problem is addressed by Embodiment C2. A collapsible handle-carryable grocery carrier chill bag (20) for use in an air atmosphere environment, the carrier bag having
- a collapsed state (20A) for enabling transportation of the carrier bag in a substantially flat state, and
- an expanded state such that the carrier bag, in its expanded state, provides an interior storage space for transporting chilled and/or frozen grocery packages, the carrier bag comprising:
- a paper layer being shaped and folded so as to form
  - a front wall panel (S1A),
  - a back wall panel (S1B),
  - two side wall panels (S2A, S2B); and
  - a bottom panel; wherein the wall panels and the bottom panel cooperate to form said interior storage space to a volume larger than 10 litres in the expanded state of the carrier bag; and
- wherein a rim portion of the wall panels facing away from the bag bottom panel provides a bag opening; the carrier bag further comprising
- a first handle being associated with said rim portion of said front wall panel (S1A) so as to allow gripping by a human hand such as to enable carrying of the grocery carrier bag; and wherein
- said paper layer is a kraft paper layer; said kraft paper layer having a substantially water vapour impermeable membrane bonded to at least one side of the kraft paper layer; and wherein
- the carrier bag has
  - an open expanded state for loading and/or unloading grocery packages to be transported, and
  - a closed expanded state such that the carrier bag, in its closed expanded state, provides a substantially closed interior storage space for transporting chilled and/or frozen grocery packages; wherein
- the bag opening is a closable opening which, in the closed expanded state of the carrier bag cooperates with said wall panels and said bottom panel so as to minimize or prevent entry of air from the environment into the interior storage space.

Embodiment C3

The collapsible handle-carryable grocery carrier bag according to Embodiment C1 or C2, wherein
the substantially water vapour impermeable membrane is bonded to the side of the kraft paper layer facing the interior storage space of the bag.

Embodiment C4

The collapsible handle-carryable grocery carrier bag according to Embodiment C1 or C2,
wherein
the substantially water vapour impermeable membrane is bonded to the side of the kraft paper layer facing the outside of the bag.
This solution advantageously allows user to place bag on ground even when its rainy and wet without causing deteriorated strength of the bag, since the water vapour impermeable membrane may prevent or minimize the absorption, by the kraft paper, of any water deposited on the exterior surface of the bag.

Embodiment C5

The collapsible handle-carryable grocery carrier bag according to any preceding Embodiment C, wherein
said substantially water vapour impermeable membrane comprises a polymer layer.

Embodiment C6

The collapsible handle-carryable grocery carrier bag according to any preceding Embodiment C, wherein
said polymer layer is a PE layer.

Embodiment C7

The collapsible handle-carryable grocery carrier bag according to any preceding Embodiment C, wherein
said polymer layer is a layer of Polyethylene.

Embodiment C8

The collapsible handle-carryable grocery carrier bag according to Embodiment C 2 or any preceding Embodiment C when dependent on Embodiment C 2, wherein
the carrier bag has a closure means attached to said rim portion; said closure means being arranged and positioned to allow
the open expanded state of the carrier bag for loading and/or unloading grocery packages to be transported, and
the closed expanded state of the carrier bag such that the carrier bag, in its closed expanded state, provides a substantially sealed interior storage space suitable for transporting chilled and/or frozen grocery packages; wherein
the closure means is closable such that, in the closed expanded state of the carrier bag, the closure means cooperates with said wall panels and bottom panel so as to close and substantially seal the interior storage space from the environment so as to minimize or prevent entry of air from the environment into the interior storage space.

Embodiment C9

The grocery carrier bag according to according to Embodiment C 2 or any preceding Embodiment C when dependent on Embodiment C 2, wherein
the carrier bag has a closure means attached to said rim portion; said closure means, in the closed expanded state of the carrier bag, cooperating with said wall panels and said bottom panel such that, when a grocery package comprising frozen food is transported in said interior storage space, the grocery bag is adapted to minimize or prevent the occurrence of condensation within the interior storage space.

Embodiment C10

The grocery carrier bag according to according to Embodiment C 8 or C9, wherein
Said closure means includes
a first elongated closure element, and
a second elongated closure element.

Embodiment C11

The grocery carrier bag according to according to any preceding Embodiment C when dependent on Embodiment C 1, wherein said mechanical interlock includes
a first elongated closure element, and
a second elongated closure element.

Embodiment C12

The grocery carrier bag according to according to Embodiment C 10 or 11, wherein
the first elongated closure element is attached to an interior surface of the rim portion of the front panel and to a part of an interior surface of the rim portion of a side panel; and wherein
the first and second elongated closure elements are positioned and adapted for mating with each other so as to achieve closing of the opening.

Embodiment C13

The grocery carrier bag according to Embodiment C 12 when dependent on Embodiment C 2; wherein
the first handle comprises a paper strip formed in a U-shape and having two paper strip end portions; the paper strip end portions of the first handle being attached to said rim portion of said front wall panel (S1A).

Embodiment C14

The grocery carrier bag according to Embodiment C 13 or any preceding Embodiment C when dependent on Embodiment C 1, further comprising
a first substantially planar reinforcement sheet having a certain size; the first substantially planar reinforcement sheet having a first sheet surface ( ) and a second sheet surface ( ) on opposite sides of the substantially planar reinforcement sheet; wherein
the first reinforcement sheet is attached to the paper strip end portions of the first handle and to said rim portion of said front wall panel (S1A) such that said paper strip end portions of the first handle are located between the front wall panel (S1A) and the reinforcement sheet.
This first reinforcement sheet advantageously operates to distribute the lifting force from the first handle paper strip end portions to a larger surface area of the front wall panel (S1A).

Embodiment C15

The grocery carrier bag according to Embodiment C 14, wherein
The first surface of the first reinforcement sheet faces the paper strip end portions of the first handle and said rim portion of said front wall panel (S1A); said first surface of the first reinforcement sheet being bonded to the paper strip end portions of the first handle and said rim portion of said front wall panel (S1A) so as to distribute lifting force from said paper strip end portions to said front wall panel via said first reinforcement sheet.

Embodiment C16

The grocery carrier bag according to Embodiment C 14 or 15 when dependent on Embodiment C 12, or any preceding Embodiment C, wherein
the first elongated closure element is integrated with a second substantially planar reinforcement sheet, the second reinforcement sheet having a predetermined area extension which is larger than the certain size of the first substantially planar reinforcement sheet; wherein
the second substantially planar reinforcement sheet is attached to the first reinforcement sheet and to said rim portion of said front wall panel (S1A) such that the first reinforcement sheet is located between the front wall panel (S1A) and the second substantially planar reinforcement sheet.

Embodiment C17

The grocery carrier bag according to Embodiment C 16, wherein
the second substantially planar reinforcement sheet is bonded to the second sheet surface of the first substantially planar reinforcement sheet so as to distribute lifting force from said first substantially planar reinforcement sheet to said front wall panel via said second reinforcement sheet.

Embodiment C18

The grocery carrier bag according to Embodiment C 16 or 17, wherein
the second substantially planar reinforcement sheet comprises polymer material.

Embodiment C19

The grocery carrier bag according to Embodiment C 16, 17, or 18, wherein
the second substantially planar reinforcement sheet comprises paper.

Embodiment C20

The grocery carrier bag according to any of Embodiment Cs 16-19, wherein
a second substantially planar reinforcement sheet is attached to an interior surface of the rim portion of the front panel and to a part of an interior surface of the rim portion of a side panel.

Embodiment C21

The grocery carrier bag according to any of Embodiment Cs 14-20, wherein
the paper strip end portions of the first handle and said first reinforcement sheet are sized and dimensioned so as to withstand a force exceeding 100 Newton.

Embodiment C22

The grocery carrier bag according to Embodiment C 12 when dependent on Embodiment C 2; wherein
said rim portion of said front wall panel (S1A) comprises at least one die cut opening so as to form the first handle; and wherein
the first elongated closure element is attached to an interior surface of the rim portion of the front panel between said at least one die cut opening and said bag bottom panel.
This location of the closure element advantageously enables the provision of a handle formed by a die cut opening while also enabling the closing and sealing of the interior storage space.

Embodiment C23

The grocery carrier bag according to Embodiment C 12 when dependent on Embodiment C 2; wherein
  said rim portion of said front wall panel (S1A) comprises at least one die cut opening so as to form the first handle; and wherein
  the first elongated closure element is attached to an interior surface of the rim portion of the front panel between said at least one die cut opening and said bag bottom panel such that said at least one die cut opening does not interfere with said closable interior storage space.

Embodiment C24

The grocery carrier bag according to any preceding Embodiment C when dependent on Embodiment C 2, wherein
  said paper layer is a kraft paper layer having a surface weight of at least 100 grams per square meter.

Embodiment C25

The grocery carrier bag according to any preceding Embodiment C, wherein
  said kraft paper layer comprises a certain amount of air being trapped within the kraft paper layer.

Embodiment C26

The grocery carrier bag according to any preceding Embodiment C, wherein
  said kraft paper layer comprises a plurality of Kraft Pulp Fibres which are arranged one above the other so as to form plural air gaps within the kraft paper layer.

Embodiment C27

The grocery carrier bag according to any preceding Embodiment C, wherein
  said kraft paper layer comprises a plurality of Kraft Pulp Fibres which are arranged one above the other so as to form plural air gaps within the kraft paper layer; wherein at least some of the Kraft Pulp Fibres have a length in the range between 1 and 3 mm and/or a width in the range between 10 and 50 micrometer; and wherein
  at least some of said plural air gaps have a volume exceeding 200 000 cubic micrometers.

Embodiment C28

The grocery carrier bag according to any preceding Embodiment C, wherein
  said paper layer being shaped and folded so as to form
    the front wall panel (S1A),
    the back wall panel (S1B), and
    the side wall panels (S2A, S2B) consists of said kraft paper layer a single substantially water vapour impermeable membrane bonded to at least one side of the kraft paper layer.
This solution enables an advantageously cost-efficient production of the grocery carrier bag in that few production method steps are required when only a single layer of water vapour impermeable material need be bonded to the kraft paper layer.

Embodiment C29

The grocery carrier bag according to any preceding Embodiment C, wherein
  said paper layer is a kraft paper layer having a surface weight of less than 140 grams per square meter.

Embodiment C30

The grocery carrier bag according to any preceding Embodiment C, wherein
  said paper layer is a kraft paper layer having a surface weight of less than 140 grams per square meter.

Embodiment C31

The collapsible handle-carryable grocery carrier bag according to any preceding Embodiment C, wherein
  the bottom panel is substantially rectangular.

Embodiment C32

The collapsible handle-carryable grocery carrier bag according to any preceding Embodiment C, wherein
  the paper layer is shaped and folded so as to form
    the front wall panel (S1A) such that it exhibits a first certain width at a folding edge where the front wall panel (S1A) meets the bottom panel, and wherein
  the paper layer is shaped and folded such that the front wall panel (S1A) exhibits a second certain width at the rim portion facing away from the bag bottom panel;
  said second certain width being longer than said first certain width.

Embodiment C33

The collapsible handle-carryable grocery carrier bag according to Embodiment C 32, wherein
  the paper layer is shaped and folded so as to form
    the back wall panel (S1B) such that it exhibits substantially said first certain width at a folding edge where the back wall panel (S1B) meets the bottom panel, and wherein
  the paper layer is shaped and folded such that the back wall panel (S1B) exhibits substantially said second certain width at the rim portion facing away from the bag bottom panel.

Embodiment C34

The collapsible handle-carryable grocery carrier bag according to any preceding Embodiment C, wherein
  said substantially water vapour impermeable membrane is bonded to the side of the kraft paper layer facing the interior storage space.

Embodiment C35

The collapsible handle-carryable grocery carrier bag according to any preceding Embodiment C, further comprising:
  a second handle adapted to allow gripping by a human hand for enabling carrying of the grocery carrier bag, the second handle comprising a paper strip formed in a U-shape and having two paper strip end portions; the paper strip end portions of the second handle being attached to said rim portion of said back wall panel (S1A).

Embodiment C36

The collapsible handle-carryable grocery carrier bag according to any preceding Embodiment C, wherein
the interior storage space of the bag, in its expanded state, has a cross-sectional area substantially parallel to the plane of the bag bottom panel,
the cross-sectional area shrinking towards the closable opening such that grocery carrier bag, in its closed and expanded state, has a generally tapered shape, as seen in a line of view substantially parallel to
the plane of the front wall panel and
the plane of the bottom panel.

Embodiment C37

A kit of parts, comprising
a collapsible handle-carryable grocery carrier bag according to any preceding Embodiment C; and
an insulator device for placement towards the front wall panel

Embodiment C38

A kit of parts, comprising
a collapsible handle-carryable grocery carrier bag according to any preceding Embodiment C; and
an insulator device for placement on the bottom panel in the interior storage space so as to reduce heat transfer through said bottom panel.

Embodiment C39

A kit of parts, comprising
a collapsible handle-carryable grocery carrier bag according to any preceding Embodiment C; and
an insulator device for placement towards the front wall panel (S1A) in the interior storage space so as to reduce heat transfer through said front wall panel (S1A).

Embodiment C40

A method for providing a collapsible carrier bag, the method comprising:
providing a substantially planar sheet of a multilayer material; the substantially planar sheet having a first sheet surface and a second sheet surface on opposite sides of the substantially planar sheet; the multilayer material comprising a layer of kraft paper having a substantially water vapour impermeable membrane bonded to at least one side of the kraft paper layer;
cutting the planar sheet according to a pre-determined pattern so that a resulting planar sheet has at least two edges;
forming or folding the multilayer sheet into a substantially tubular shape such that the at least two edges overlap so as to allow a first overlap area of the first sheet surface to meet a second overlap area of the second sheet surface and so that the first sheet surface forms an interior surface of the-bag-to-be;
attaching the first overlap area to the second overlap area, e.g. by gluing or melt-bonding;
forming or folding the multilayer sheet so as to form a front panel (S1A), a back panel (S1B), and two mutually opposing side panels (S2A, S2B) of the-bag-to-be;
forming or folding the multilayer sheet so as to create a bottom portion of the-bag-to-be so that the bottom portion connects the panels (S1A, S1B, S2A, S2B), thereby obtaining a semi-manufactured bag which in an expanded state exhibits four wall panels, a bag bottom panel and a bag opening formed by an opening rim of the four wall panels facing away from the bag bottom;
collapsing the semi-manufactured bag by folding along a folding edge where the front panel (S1A) connects with the bottom panel and providing a mid-fold in each of the side panels (S2A, S2B), the mid-fold of a side panel running in a direction substantially parallel to a fold where that side panel (S2A, S2B) connects with the front panel; wherein the collapsing step is performed such that a side panel mid-fold is bent outwardly so as to cause a front most interior surface portion of that side panel to face a back most secondary interior surface portion of that side panel;
providing a first elongated closure element, and providing a second elongated closure element; the first and second elongated closure elements being adapted for mating with each other;
attaching the first elongated closure element to the interior surface of the front panel and to the interior surface of the front most portion of a side panel substantially in the vicinity of the opening rim; and
attaching the second elongated closure element to the interior surface of the back panel and to the interior surface of the back most portion of a side panel substantially in the vicinity of the opening rim such that the first elongated closure element and the second elongated closure element are aligned with each other so as to form a mechanical interlock which, in a closed state, is adapted to provide a substantially water vapour impermeable seal;
providing a handle for allowing a user to carry the carrier bag; the handle being associated with the front panel (S1A) and the back panel (S1B).

Embodiment C41

A method for providing a carrier bag; the method comprising:
providing a carrier bag having a carrier bag enclosure formed by
a front wall panel (S1A),
a back wall panel (S1B),
two mutually opposing side wall panels (S2A, S2B);
a substantially square bottom portion; wherein the wall panels and the bottom portion cooperate to form said enclosure; and wherein a portion of the wall panels facing away from the bag bottom comprises a closable enclosure opening.

Embodiment C42

A method for providing a carrier bag, the method comprising:
providing a collapsible carrier bag having
a collapsed state for enabling transportation of the carrier bag in a substantially flat state, and
an expanded state for transporting food items in a carrier bag enclosure which, in the expanded state of the carrier bag, has a volume larger than 10 litres; the carrier bag further having a front wall panel (S1A),
a back wall panel (S1B),
two mutually opposing side wall panels (S2A, S2B);
a substantially square bottom portion; wherein the wall panels and the bottom portion cooperate to form said enclosure; and wherein a portion of the wall panels facing away from the bag bottom comprises a closable enclosure opening.

Embodiment C43

A method of delivering chilled groceries, the method comprising:
providing a collapsible grocery carrier bag, e.g. according to any of Embodiment Cs 1-35, in a collapsed state;
expanding the collapsible grocery carrier bag in an environment having a certain relative air humidity;
loading chilled or frozen groceries into the interior storage space; and
transporting the loaded grocery carrier bag to a destination.

Embodiment C44

The collapsible handle-carryable grocery carrier chill bag according to any of Embodiment Cs 1-36, further comprising
an insulator device for placement on the bottom panel in the interior storage space so as to reduce heat transfer through said bottom panel.

Embodiment C45

The chill bag according to Embodiment C 44, wherein the insulator device is arranged and positioned on at least a portion of the bottom panel in the interior storage space so as to reduce heat transfer through said bottom panel.

Embodiment C46

The chill bag according to Embodiment C 44 or 45, wherein
the insulator device comprises a piece of material; said piece of material being shaped and adapted to provide cellular air cushions so as to reduce heat transfer through said bottom panel.

Embodiment C47

The chill bag according to any of Embodiment Cs 44-46, wherein
said piece of material comprises paper.

Embodiment C48

The chill bag according to any of Embodiment Cs 44-47, wherein
said piece of material comprises a substantially water vapour impermeable material.
This solution advantageously enables the insulator device to withstand a damp or wet environment without absorbing water.

Embodiment C49

The chill bag according to any of Embodiment Cs 46-48, wherein
said piece of material comprises at least one layer of a polymer material.

Embodiment C50

The chill bag according to any of Embodiment Cs 46-48, wherein
said piece of material comprises at least one layer of a plastic material.
This solution advantageously enables the insulator device to withstand a damp or wet environment without absorbing water.

Embodiment C51

The chill bag according to any of Embodiment Cs 46-50, wherein
said piece of material comprises BubbleWrap®.

Embodiment C52

The chill bag according to any of Embodiment Cs 47-49, wherein
said piece of paper material has a substantially water vapour impermeable membrane bonded to at least one side of the paper material.
This solution advantageously enables the insulator device to withstand a damp or wet environment without absorbing water.

Embodiment C53

The chill bag according to any of Embodiment Cs 44-49 or 52, wherein
the insulator device comprises a piece of card board paper material; said piece of card board paper material being shaped and adapted to reduce heat transfer through said bottom panel.

Embodiment C54

A kit of parts, comprising
a collapsible handle-carryable grocery carrier bag according to any of Embodiment Cs 1-36; and
an insulator device for placement on the bottom panel in the interior storage space so as to reduce heat transfer through said bottom panel.

Embodiment C55

The kit of parts according to Embodiment C 54, wherein
the insulator device is adapted for positioning on at least a portion of the bottom panel in the interior storage space so as to reduce heat transfer through said bottom panel.

Embodiment C56

The kit of parts according to Embodiment C 54 or 55, wherein
the insulator device comprises a piece of material; said piece of material being shaped and adapted to provide cellular air cushions so as to reduce heat transfer through said bottom panel.

Embodiment C57

The kit of parts according to any of Embodiment Cs 54-56, wherein said piece of material comprises at least one layer of a plastic material.

This solution advantageously enables the insulator device to withstand a damp or wet environment without absorbing water.

Embodiment C58

The kit of parts according to any of Embodiment Cs 54-56, wherein
said piece of material comprises a paper layer; said paper layer having a substantially water vapour impermeable membrane bonded to at least one side of the paper layer.

This solution advantageously enables the insulator device to withstand a damp or wet environment without absorbing water.

Embodiment C59

The kit of parts according to any of Embodiment Cs 54-58, wherein
said piece of material comprises a piece of BubbleWrap®.

Embodiment C60

A collapsible grocery inner chill bag ( );
the inner chill bag having
a collapsed state (20A) for enabling transportation of the inner chill bag in a substantially flat state, and
an expanded state such that the inner chill bag, in its expanded state, provides a second interior storage space for transporting chilled and/or frozen grocery packages, the inner chill bag comprising:
a inner wall panels (S1A); and
an inner bottom panel; wherein the inner wall panels and the inner bottom panel cooperate to form said second interior storage space; and
wherein a second rim portion of the inner wall panels facing away from the inner bottom panel provides an inner bag opening; and wherein
the inner chill bag has
an open expanded state for loading and/or unloading grocery packages to be transported, and
a closed expanded state such that the inner chill bag, in its closed expanded state, provides a substantially closed second interior storage space for transporting chilled and/or frozen grocery packages; wherein
the inner bag opening is a closable opening which, in the closed expanded state of the inner chill bag cooperates with said inner wall panels and said inner bottom panel so as to minimize or prevent entry of air from the environment into the second interior storage space.

Embodiment C61

A collapsible grocery inner chill bag ( ) for use inside of the carrier bag according to any of Embodiment Cs 1-36 and/or any of Embodiment Cs 44-53;
the inner chill bag having
a collapsed state (20A) for enabling transportation of the inner chill bag in a substantially flat state, and
an expanded state such that the inner chill bag, in its expanded state, provides a second interior storage space for transporting chilled and/or frozen grocery packages, the inner chill bag comprising:
inner walls and an inner bottom cooperating to form said second interior storage space; and
wherein a second rim portion of the inner walls facing away from the inner bottom provides an inner bag opening; and wherein
the inner chill bag has
an open expanded state for loading and/or unloading grocery packages to be transported, and
a closed expanded state such that the inner chill bag, in its closed expanded state, provides a substantially closed second interior storage space for transporting chilled and/or frozen grocery packages; wherein
the inner bag opening is a closable opening which, in the closed expanded state of the inner chill bag cooperates with said inner walls and said inner bottom so as to minimize or prevent entry of air from the environment into the second interior storage space.

Embodiment C62

The collapsible grocery inner chill bag according to Embodiment C 60 or 61; wherein
the inner chill bag, in its expanded state, is shaped and dimensioned to fit inside of the carrier bag according to any of Embodiment Cs 1-36 and/or any of Embodiment Cs 44-53.

Embodiment C63

The collapsible grocery inner chill bag according to any of Embodiment Cs 60-62; wherein
the inner walls comprise
an inner front wall panel (S1A),
an inner back wall panel (S1B),
two inner side wall panels (S2A, S2B); and wherein
the inner bottom comprises an inner bottom panel; wherein the inner wall panels and the inner bottom panel cooperate to form said second interior storage space.

Embodiment C64

The collapsible grocery inner chill bag according to any of Embodiment C 63; wherein
the carrier bag comprises a paper layer being shaped and folded so as to form
said inner front wall panel (S1A),
said inner back wall panel (S1B),
said inner two side wall panels (S2A, S2B); and
said inner bottom panel.

Embodiment C65

The collapsible grocery inner chill bag according to any of Embodiment Cs 60-64; wherein
the wall panels and the bottom panel cooperate to form said interior storage space to a volume larger than 2 litres in the expanded state of the carrier bag;

Embodiment C66

The collapsible grocery inner chill bag according to any of Embodiment Cs 60-65; wherein
a first handle is associated with said rim portion of said front wall panel (S1A) so as to allow gripping by a human hand such as to enable carrying of the grocery carrier bag.

Embodiment C67

The collapsible grocery inner chill bag according to Embodiment C 64 or any of Embodiment Cs 65 or 66 when dependent on Embodiment C 64; wherein
said paper layer is a kraft paper layer; said kraft paper layer having a substantially water vapour impermeable membrane bonded to at least one side of the kraft paper layer;

Embodiment C68

The collapsible grocery inner chill bag according to any of Embodiment Cs 60-67; wherein
the substantially water vapour impermeable membrane is bonded to the side of the kraft paper layer facing the second interior storage space of the bag.

Embodiment C69

The collapsible grocery inner chill bag according to any of Embodiment Cs 60-68; wherein
the substantially water vapour impermeable membrane is bonded to the side of the kraft paper layer facing the outside of the bag.
This solution advantageously prevents or minimizes absorption, by the kraft paper, of any water deposited on the exterior surface of the bag.

Embodiment C70

The collapsible grocery inner chill bag according to any of Embodiment Cs 60-69; wherein
said substantially water vapour impermeable membrane comprises a polymer layer.

Embodiment C71

The collapsible grocery inner chill bag according to Embodiment C 70; wherein
said polymer layer is a PE layer.

Embodiment C72

The collapsible grocery inner chill bag according to Embodiment C 70; wherein
said polymer layer is a layer of Polyethylene.

Embodiment C73

The collapsible grocery inner chill bag according to any of Embodiment Cs 60-72; wherein
the inner chill bag has an inner closure means attached to said rim portion; said inner closure means being arranged and positioned to allow
a) the open expanded state of the inner chill bag for loading and/or unloading grocery packages to be transported, and
b) the closed expanded state of the inner chill bag such that the inner chill bag, in its closed expanded state, provides a substantially sealed second interior storage space suitable for transporting chilled and/or frozen grocery packages; wherein
the inner closure means is closable such that, in the closed expanded state of the inner chill bag, the inner closure means cooperates with said inner wall panels and said inner bottom panel so as to close and substantially seal the second interior storage space from the environment so as to minimize or prevent entry of air from the environment into the interior storage space.

Embodiment C74

The collapsible grocery inner chill bag according to any of Embodiment Cs 60-73; wherein
the chill bag has an inner closure means attached to said rim portion; said inner closure means, in the closed expanded state of the inner chill bag, cooperating with said inner wall panels and said inner bottom panel such that, when a grocery package comprising frozen food is transported in said interior storage space, the inner chill bag is adapted to minimize or prevent the occurrence of condensation within the second interior storage space.

Embodiment C 75

The collapsible grocery inner chill bag according to Embodiment C 73 or 74; wherein
Said inner closure means includes
a first elongated inner bag closure element, and
a second elongated inner bag closure element.

Embodiment C 76

The collapsible grocery inner chill bag according to according to Embodiment C 75, wherein
the first elongated inner bag closure element is attached to an interior surface of the rim portion of the inner front wall panel and to a part of an interior surface of the rim portion of an inner side wall panel; and wherein
the first and second elongated inner bag closure elements are positioned and adapted for mating with each other so as to achieve closure of the opening.

Embodiment C 77

The collapsible grocery inner chill bag according to Embodiment C 66; wherein
the first inner bag handle comprises a paper strip formed in a U-shape and having two paper strip end portions; the paper strip end portions of the first inner bag handle being attached to said rim portion of said inner front wall panel (S1A).

Embodiment C78

The collapsible grocery inner chill bag according to Embodiment C 77; further comprising:
a first substantially planar inner bag reinforcement sheet having a certain size; the first substantially planar inner bag reinforcement sheet having a first sheet surface ( ) and a second sheet surface ( ) on opposite sides of the substantially planar inner bag reinforcement sheet; wherein
the first inner bag reinforcement sheet is attached to the paper strip end portions of the first handle and to said rim portion of said inner front wall panel (S1A) such that said paper strip end portions of the first handle are located between the inner front wall panel (S1A) and the inner bag reinforcement sheet.
This first inner bag reinforcement sheet advantageously operates to distribute the lifting force from the first handle paper strip end portions to a larger surface area of the front wall panel (S1A).

Embodiment C 79

The collapsible grocery inner chill bag according to Embodiment C 78, wherein
the first surface of the first reinforcement sheet faces the paper strip end portions of the first handle and said rim portion of said front wall panel (S1A); said first surface of the first reinforcement sheet being bonded to the paper strip end portions of the first handle and said rim portion of said front wall panel (S1A) so as to distribute lifting force from said paper strip end portions to said front wall panel via said first reinforcement sheet.

Embodiment C 80

The collapsible grocery inner chill bag according to Embodiment C 14 or 15 when dependent on Embodiment C 12, or any preceding Embodiment C, wherein
the first elongated closure element is integrated with a second substantially planar reinforcement sheet, the second reinforcement sheet having a predetermined area extension which is larger than the certain size of the first substantially planar reinforcement sheet; wherein
the second substantially planar reinforcement sheet is attached to the first reinforcement sheet and to said rim portion of said front wall panel (S1A) such that the first reinforcement sheet is located between the front wall panel (S1A) and the second substantially planar reinforcement sheet.

Embodiment C81

The collapsible grocery inner chill bag according to Embodiment C 80, wherein
the second substantially planar reinforcement sheet is bonded to the second sheet surface of the first substantially planar reinforcement sheet so as to distribute lifting force from said first substantially planar reinforcement sheet to said front wall panel via said second reinforcement sheet.

Embodiment C82

The collapsible grocery inner chill bag according to Embodiment C 80 or 81, wherein
the second substantially planar reinforcement sheet comprises polymer material.

Embodiment C 83

The collapsible grocery inner chill bag according to Embodiment C 80, 81, or 82, wherein
the second substantially planar reinforcement sheet comprises paper.

Embodiment C 84

The collapsible grocery inner chill bag according to any of Embodiment Cs 80-83, wherein
the second substantially planar reinforcement sheet is attached to an interior surface of the rim portion of the front panel and to a part of an interior surface of the rim portion of a side panel.

Embodiment C 85

The collapsible grocery inner chill bag according to any of Embodiment Cs 78-84, wherein
the paper strip end portions of the first handle and said first reinforcement sheet are sized and dimensioned so as to withstand a force exceeding 100 Newton.

Embodiment C86

The collapsible grocery inner chill bag according to any of Embodiment Cs 60-76; wherein
said rim portion of said inner front wall panel (S1A) comprises at least one first die cut opening, and said rim portion of said inner back wall panel (S1A) comprises at least one second die cut opening said first and second die cut openings being shaped and adapted to form the first handle.

This solution advantageously allows for a cost effective manufacturing process of the inner chill bag, since the handle may be produced by cutting openings in the rim portions of the inner front and back wall panels.

Embodiment C87

The collapsible grocery inner chill bag according to Embodiment C 86 when dependent on Embodiment C 75 or 76; wherein
said rim portion of said front wall panel (S1A) comprises at least one die cut opening so as to form the first handle; and wherein
the first elongated inner bag closure element is attached to an interior surface of the rim portion of the front panel between said at least one die cut opening and said bag bottom panel such that said at least one die cut opening does not interfere with said second interior storage space.

According to an embodiment the first elongated closure element is attached to an interior surface of the rim portion of the front panel between said at least one die cut opening and said bag bottom panel.

This location of the closure element advantageously enables the provision of a handle formed by a die cut opening while also enabling the closing and sealing of the interior storage space.

Embodiment C88

The collapsible grocery inner chill bag according to any of Embodiment Cs 60-87; wherein
said paper layer is a kraft paper layer having a surface weight of at least 80 grams per square meter, or preferably a surface weight of at least 100 grams per square meter.

Embodiment C89

The collapsible grocery inner chill bag to any of Embodiment Cs 60-88; wherein
said kraft paper layer comprises a certain amount of air being trapped within the kraft paper layer.

Embodiment C90

The collapsible grocery inner chill bag according to any of Embodiment Cs 60-89; wherein
said kraft paper layer comprises a plurality of Kraft Pulp Fibres which are arranged one above the other so as to form plural air gaps within the kraft paper layer.

Embodiment C91

The collapsible grocery inner chill bag according to any of Embodiment Cs 60-90; wherein said kraft paper layer comprises a plurality of Kraft Pulp Fibres which are arranged one above the other so as to form plural air gaps within the kraft paper layer; wherein at least some of the Kraft Pulp Fibres have a length in the range between 1 and 3 mm and/or a width in the range between 10 and 50 micrometer; and wherein at least some of said plural air gaps have a volume exceeding 200 000 cubic micrometers.

Embodiment C92

The collapsible grocery inner chill bag according to any of Embodiment Cs 64-91; wherein
said paper layer being shaped and folded so as to form
the inner front wall panel (S1A),
the inner back wall panel (S1B), and
the inner side wall panels (S2A, S2B)
consists of said kraft paper layer and a single substantially water vapour impermeable membrane bonded to at least one side of the kraft paper layer.

This solution enables an advantageously cost-efficient production of the grocery chill bag in that few production method steps are required when only a single layer of water vapour impermeable material need be bonded to the kraft paper layer.

Embodiment C93

The collapsible grocery inner chill bag according to any of Embodiment Cs 64-92; wherein
said paper layer is a kraft paper layer having a surface weight of less than 140 grams per square meter.

Embodiment C94

The collapsible grocery inner chill bag according to any of Embodiment Cs 60-93; wherein
the inner bottom panel is substantially rectangular.

Embodiment C95

The grocery inner chill bag according to any of Embodiment Cs 60-94; wherein
the paper layer is shaped and folded so as to form
the inner front wall panel (S1A) such that it exhibits a first certain width at a folding edge where the front wall panel (S1A) meets the bottom panel, and
wherein
the paper layer is shaped and folded such that the inner front wall panel (S1A) exhibits a second certain width at the rim portion facing away from the inner bag bottom panel;
said second certain width being longer than said first certain width.

Embodiment C96

The grocery inner chill bag according to Embodiment C 95, wherein
the paper layer is shaped and folded so as to form
the inner back wall panel (S1B) such that it exhibits substantially said first certain width at a folding edge where the inner back wall panel (S1B) meets the inner bag bottom panel, and wherein
the paper layer is shaped and folded such that the inner back wall panel (S1B) exhibits substantially said second certain width at the rim portion facing away from the inner bag bottom panel.

Embodiment C97

The grocery inner chill bag according to any preceding Embodiment C when dependent on Embodiment C 77; further comprising:
a second handle adapted to allow gripping by a human hand for enabling carrying of the grocery inner chill bag, the second handle comprising a paper strip formed in a U-shape and having two paper strip end portions; the paper strip end portions of the second handle being attached to said rim portion of said inner back wall panel (S1A).

Embodiment C98

The inner chill bag according to any of Embodiment Cs 60-97; wherein
the second interior storage space of the bag, in its expanded state, has a second cross-sectional area substantially parallel to the plane of the inner bag bottom panel,
the second cross-sectional area shrinking towards the closable opening such that grocery inner chill bag, in its closed and expanded state, has a generally tapered shape, as seen in a line of view substantially parallel to
the plane of the front wall panel and
the plane of the bottom panel.

Embodiment C99

The inner chill bag according to any of Embodiment Cs 60-98; further comprising
an inner bag insulator device for placement on the bottom panel in the second interior storage space so as to reduce heat transfer through said bottom panel.

Embodiment C100

The inner chill bag according to Embodiment C 99, wherein the inner bag insulator device is arranged and positioned on at least a portion of the inner bottom panel in the second interior storage space so as to reduce heat transfer through said inner bottom panel.

Embodiment C101

The inner chill bag according to Embodiment C 99 or 100, wherein
the inner bag insulator device comprises a piece of material; said piece of material being shaped and adapted to provide cellular air cushions so as to reduce heat transfer through said inner bag bottom panel.

Embodiment C102

The inner chill bag according to Embodiment C 101, wherein
said piece of material comprises paper.

Embodiment C103

The inner chill bag according to any of Embodiment Cs 101-102, wherein said piece of material comprises a substantially water vapour impermeable material.

This solution advantageously enables the insulator device to withstand a damp or wet environment without absorbing water.

Embodiment C104

The inner chill bag according to any of Embodiment Cs 101-103, wherein
said piece of material comprises at least one layer of a polymer material.

Embodiment C105

The inner chill bag according to any of Embodiment Cs 101-104, wherein
said piece of material comprises at least one layer of a plastic material.

This solution advantageously enables the insulator device to withstand a damp or wet environment without absorbing water.

Embodiment C106

The inner chill bag according to any of Embodiment Cs 101-105, wherein
said piece of material comprises BubbleWrap®.

Embodiment C107

The inner chill bag according to any of Embodiment Cs 101-104, wherein
said piece of paper material has a substantially water vapour impermeable membrane bonded to at least one side of the paper material.

This solution advantageously enables the insulator device to withstand a damp or wet environment without absorbing water.

Embodiment C108

The inner chill bag according to any of Embodiment Cs 99-105 or 107, wherein
the inner bag insulator device comprises a piece of card board paper material; said piece of card board paper material being shaped and adapted to reduce heat transfer through said bottom panel.

Embodiment C109

A kit of parts, comprising
an inner chill bag according to any of Embodiment Cs 60-98; and
an inner bag insulator device for placement on the inner bag bottom panel in the second interior storage space so as to reduce heat transfer through said inner bag bottom panel.

Embodiment C110

The kit of parts according to Embodiment C 109, wherein
the inner bag insulator device is adapted for positioning on at least a portion of the inner bag bottom panel in the second interior storage space so as to reduce heat transfer through said inner bag bottom panel.

Embodiment C111

The kit of parts according to Embodiment C 109 or 110, wherein
the inner bag insulator device comprises a piece of material; said piece of material being shaped and adapted to provide cellular air cushions so as to reduce heat transfer through said inner bag bottom panel.

Embodiment C112

The kit of parts according to Embodiment C 111, wherein
said piece of material comprises at least one layer of a plastic material.

This solution advantageously enables the insulator device to withstand a damp or wet environment without absorbing water.

Embodiment C113

The kit of parts according to any of Embodiment Cs 109-111, wherein
said piece of material comprises a paper layer; said paper layer having a substantially water vapour impermeable membrane bonded to at least one side of the paper layer.

This solution advantageously enables the insulator device to withstand a damp or wet environment without absorbing water.

Embodiment C114

The kit of parts according to any of Embodiment Cs 109-112, wherein
said piece of material comprises a piece of BubbleWrap®.

Embodiment C115

A handle-carryable grocery carrier chill bag package comprising
a collapsible handle-carryable grocery carrier chill bag according to any of Embodiment Cs 1-36 and/or any of Embodiment Cs 44-53; and
a collapsible grocery inner chill bag ( ) according to any of Embodiment Cs 60-108; wherein,
the handle-carryable grocery carrier chill bag package, in use, includes
the collapsible grocery inner chill bag in its closed expanded state; and
the collapsible handle-carryable grocery carrier chill bag in its closed expanded state; and wherein
the collapsible grocery inner chill bag is placed in the interior storage space of the collapsible handle-carryable grocery carrier chill bag.

This solution advantageously enables the packing of frozen grocery packages in the second interior storage space. This solution therefore enjoys a high thermal resistance from a frozen grocery package in the second interior storage space to the environment outside of the outer handle-carryable grocery carrier bag, since any air inside of the first interior storage space (100) functions as insulation between the second interior storage space and the environment outside of the outer handle-carryable grocery carrier bag. Additionally, there are double barriers for minimizing or preventing entry of air from the environment outside of the outer handle-carryable grocery carrier bag into the second interior storage space when both of the bags are in their closed expanded states, since the second interior storage space is sealed by the closed inner bag as well as by the closed outer bag.

Embodiment C116

The handle-carryable grocery carrier chill bag package according to Embodiment C 115, wherein,
the handle-carryable grocery carrier chill bag package, in use, further comprises:
a means for cooling the interior (100) of the bag (20).

Embodiment C117

The handle-carryable grocery carrier chill bag package according to Embodiment C 116, wherein,
the means for cooling the interior of the bag comprises a cooling agent Embodiment C118

The handle-carryable grocery carrier chill bag package according to Embodiment C 116 or 117, wherein,
the means for cooling the interior of the bag comprises a piece of dry ice.

Embodiment C119

The handle-carryable grocery carrier chill bag package according to Embodiment C 116, 117, or 118; wherein
the means for cooling the interior of the bag comprises a container holding a pressurized gas; said container having a valve which is settable to a valve state in which the valve allows pressurized gas to flow out from the pressurized container so as to attain a cooling effect.

Embodiment C120

The handle-carryable grocery carrier chill bag package according to Embodiment C 119; wherein
the pressurized gas comprises pressurized carbon dioxide.

Embodiment C 121

The handle-carryable grocery carrier chill bag package according to Embodiment C 119; wherein
the pressurized gas comprises pressurized air.

Embodiment C122

The handle-carryable grocery carrier chill bag package according to any of Embodiment Cs 119-121; wherein
one of the walls of the collapsible handle-carryable grocery carrier chill bag (20) comprises a valve adapted to allow passage of gas in the direction from the interior storage space (100) to the surrounding environment.

Embodiment C123

The handle-carryable grocery carrier chill bag package according any of Embodiment Cs 116-122; wherein
the means for cooling the interior of the bag comprises an ice pack.

Embodiment C124

The handle-carryable grocery carrier chill bag package according to Embodiment C 123; wherein
the ice pack comprises a sachet containing a gel that can be frozen and that, in use, retains a frozen temperature for an extended period of time.

Embodiment C125

The handle-carryable grocery carrier chill bag package according any of Embodiment Cs 116-124; wherein
the means for cooling the interior of the bag, in use, is placed in the second interior storage space of the inner chill bag.

Embodiment C126

The handle-carryable grocery carrier chill bag package according any of Embodiment Cs 116-125; wherein
the means for cooling the interior of the bag, in use, is placed in the interior storage space (100) of the collapsible handle-carryable grocery carrier chill bag (20).

Embodiment C127

A kit of parts, comprising
a collapsible handle-carryable grocery carrier chill bag (20) according to any of Embodiment Cs 1-36 and/or any of Embodiment Cs 44-53; and
a collapsible grocery inner chill bag 0 according to any of Embodiment Cs 60-108.

Embodiment C128

The kit of parts according to Embodiment C 127, further comprising
means for cooling the interior of the bag.

Embodiment C129

The collapsible handle-carryable grocery carrier chill bag according to any of Embodiment Cs 1-36 and/or any of Embodiment Cs 44-53; wherein,
the collapsible handle-carryable grocery carrier chill bag, in use in its closed expanded state, further includes means for cooling the interior of the bag.

Embodiment C130

The collapsible handle-carryable grocery carrier chill bag according to Embodiment C 129; wherein the means for cooling the interior of the bag comprises a cooling agent Embodiment C131

The collapsible handle-carryable grocery carrier chill bag according to Embodiment C 129 or 130, wherein,
the means for cooling the interior of the bag comprises a piece of dry ice.

Embodiment C132

The collapsible handle-carryable grocery carrier chill bag according to Embodiment C 129, 130, or 131; wherein
the means for cooling the interior of the bag comprises a container holding a pressurized gas; said container having a valve which is settable to a valve state in which the valve allows pressurized gas to flow out from the pressurized container so as to attain a cooling effect.

Embodiment C133

The collapsible handle-carryable grocery carrier chill bag according to Embodiment C 132; wherein
the pressurized gas comprises pressurized carbon dioxide.

Embodiment C134

The collapsible handle-carryable grocery carrier chill bag according to Embodiment C 132; wherein
the pressurized gas comprises pressurized air.

Embodiment C135

The collapsible handle-carryable grocery carrier chill bag according to any of Embodiment Cs 132-134; wherein
one of the walls of the collapsible handle-carryable grocery carrier chill bag (20) comprises a valve adapted to allow passage of gas in the direction from the interior storage space (100) to the surrounding environment.

Embodiment C136

The collapsible handle-carryable grocery carrier chill bag according any of Embodiment Cs 129-135; wherein
the means for cooling the interior of the bag comprises an ice pack.

Embodiment C137

The collapsible handle-carryable grocery carrier chill bag according to Embodiment C 136; wherein
the ice pack comprises a sachet containing a gel that can be frozen and that, in use, retains a frozen temperature for an extended period of time.

Embodiment C138

The collapsible handle-carryable grocery carrier chill bag according any of Embodiment Cs 129-137; wherein
the means for cooling the interior of the bag, in use, is placed in the interior storage space (100) of the collapsible handle-carryable grocery carrier chill bag (20).

Embodiment C139

A kit of parts, comprising
a collapsible handle-carryable grocery carrier chill bag (20) according to any of Embodiment Cs 1-36 and/or any of Embodiment Cs 44-53 and/or any of Embodiment Cs129-138; and
a means for cooling the interior of the bag.

Embodiment C140

A kit of parts according to Embodiment C 139, further comprising
a collapsible grocery inner chill bag ( ) according to any of Embodiment Cs 60-108.

Embodiment C141

The collapsible handle-carryable grocery carrier chill bag according to any of Embodiment Cs 1-36 and/or any of Embodiment Cs 44-53; wherein,
the collapsible handle-carryable grocery carrier chill bag, in use in its closed expanded state, further includes an insulator device as defined in any of Embodiment Cs 54-59.

Embodiment D1

A method for providing a collapsible transport container, wherein said collapsible carrier bag has a collapsed state for enabling transportation of the transport container in a substantially flat state, and an expanded state for transporting food items in a transport container enclosure which, the method comprising:
providing a substantially planar sheet comprising kraft paper; the substantially planar sheet having a first sheet surface and a second sheet surface on opposite sides of the substantially planar sheet; the kraft paper having a substantially water vapour impermeable membrane bonded to at least one side of the kraft paper layer;
cutting the planar sheet according to a pre-determined pattern so that a resulting planar sheet has at least two edges;
forming or folding the substantially planar sheet such that the at least two edges overlap so as to allow a first overlap area of the first sheet surface to meet a second overlap area of the second sheet surface and so that the first sheet surface forms an interior surface of the-bag-to-be;
attaching the first overlap area to the second overlap area, e.g. by gluing or melt-bonding;
forming or folding the sheet so as to form outer surfaces of the transport container;
providing closure means suitable for closing the transport container.

Embodiment D2

The method according to Embodiment D 1, further comprising providing a handle for allowing a user to carry the transport container.

Embodiment D3

The method according to any of the previous Embodiment Ds, further comprising forming or folding the sheet so as to form a front panel (S1A), a back panel (S1B), and two mutually opposing side panels (S2A, S2B) of the transport container-to-be.

Embodiment D4

The method according to any of the previous Embodiment Ds, further comprising forming or folding the sheet so as to create a bottom portion (BP) of the transport container-to-be.

Embodiment D5

A method according to the previous Embodiment D, where the bottom portion is formed or folded in so that the bottom portion (BP) connects to the panels (S1A, S1B, S2A, S2B), thereby obtaining a semi-manufactured transport container which in an expanded state exhibits four wall panels, a bag bottom panel and a bag opening formed by an opening rim of the four wall panels facing away from the bag bottom.

Embodiment D6

The method according to any of the previous Embodiment Ds, further comprising the step of collapsing the semi-manufactured transport container.

Embodiment D7

The method according to the previous Embodiment D when used in combination with Embodiment D 3, wherein the collapsing is done by folding along a folding edge where the front panel (S1A) connects with the bottom panel (BP) and providing a mid-fold in each of the side panels (S2A, S2B), the mid-fold of a side panel running in a direction substantially parallel to a fold where that side panel (S2A, S2B) connects with the front panel.

Embodiment D8

The method according to the previous Embodiment D wherein the collapsing step is performed such that a side panel mid-fold is bent outwardly so as to cause a front most interior surface portion of that side panel to face a back most secondary interior surface portion of that side panel.

The invention claimed is:

1. A goods transport system comprising:
   a storage facility for storing chilled goods and/or frozen goods at an initial goods temperature, the storage facility comprising one or several storage rooms having a controlled environment in that the temperature and the relative humidity of the air in the storage room are controlled so as to be kept within certain predetermined ranges, wherein the chilled goods and/or frozen goods comprise a plurality of different types of chilled goods and/or frozen goods, sorted into different temperature ranges, each type of chilled goods and/or frozen goods being stored in a corresponding storage room having a temperature in accordance with a temperature range of the corresponding chilled goods and/or frozen goods, wherein the chilled goods having the initial goods temperature of equal to or less than eight degrees Centigrade and the frozen goods having the initial goods temperature of equal to or less than zero degrees Centigrade;
   at least one closable and sealable bag for use in distribution of the chilled goods and/or frozen goods, wherein said closable and sealable bag is collapsible so as to have (a) a collapsed state for enabling transportation of the bag in a substantially flat state and (b) an expanded state such that the bag, in the expanded state, provides an interior storage space for transporting chilled goods and/or frozen goods;
   the storage facility further comprising a loading facility for enabling an amount of the chilled goods and/or frozen goods to be packed into said closable and sealable bag,
   wherein said bag comprises:
   a wall configured to enclose said interior storage space and comprising:
   a) a biodegradable paper layer having a thermal conductivity of less than 0.2 W/(K*m) and a tensile strength exceeding 0.133 Newton/square millimeter ($mm^2$), wherein the biodegradable paper layer is shaped and configured to form the interior storage space to a volume of between ten metric liters and one hundred metric liters in the expanded state; and
   b) a substantially water vapor impermeable membrane bonded to at least one side of said biodegradable paper layer; and
   c) a closable opening such that the bag has a closed expanded packed state, wherein the closable opening cooperates with the wall to substantially seal the chilled goods and/or frozen goods in the interior storage space from the environment so as to minimize or prevent entry of said air humidity from the environment into the interior storage space so as to minimize or prevent an occurrence of condensation on chilled goods and/or frozen goods such that condensation process heating is minimized or prevented in the interior storage space in the closed and expanded state; and
   a delivery vehicle configured to transport the bag in the closed expanded state in an air atmosphere environment from the storage facility to a delivery destination, wherein the air atmosphere environment has an air temperature equal to or greater than ten degrees Centigrade.

2. The goods transport system according to claim 1 comprising:
   a server computer having a communications port for communication via the Internet.

3. The goods transport system according to claim 1, wherein said biodegradable paper layer comprises a Kraft paper layer.

4. The goods transport system according to claim 1, wherein
   said substantially water vapor impermeable membrane comprises a biodegradable material.

5. The goods transport system according to claim 1, wherein the wall consists of one or more biodegradable materials and the biodegradable paper layer comprises a Kraft paper layer.

6. The goods transport system according to claim 1, wherein the bag, when in use for transporting chilled and/or frozen goods, is configured to enable a human to carry the bag such that a center of gravity of the closed packed bag is less than 10 centimeters (cm) from at least one bag wall.

7. The goods transport system according to claim 1, wherein said biodegradable paper layer consists of Kraft paper.

8. The goods transport system according to claim 1, wherein said wall comprises at least one material selected from a group consisting of:
   a non-woven material;
   a textile material; and
   a film of foamed/porous thermoplastic.

9. The goods transport system according to claim 1, wherein said wall comprises at least one material selected from a group consisting of:
   a film of thermoplastic; and
   a film of foamed and/or porous rubber.

10. The goods transport system according to claim 1, wherein said delivery vehicle is configured to transport the closed packed bag in an uncontrolled air atmosphere environment.

11. The goods transport system according to claim 1, wherein said delivery vehicle is configured to transport the closed packed bag in the air atmosphere environment which is not actively cooled by a cooling or freezing device.

12. The method according to claim 1, wherein said delivery vehicle is configured to transport the closed packed bag in the air atmosphere environment which is not actively cooled by a cooling or freezing device.

13. A method of delivering chilled goods in a sealable bag, comprising the steps of:
prov255ing, at a storage facility, chilled goods having an initial goods temperature, chilled goods comprising at least one selected from the group consisting of:
(i) chilled non-frozen goods having the initial goods temperature of equal to or less than 8 degrees Centigrade, and
(ii) frozen goods having the initial goods temperature of equal to or less than 0 degrees Centigrade;
receiving an order for an amount of said chilled goods;
providing a closable bag having a wall configured to enclose an interior storage space for transporting said chilled goods the wall comprising:
a) a biodegradable paper layer having a thermal conductivity of less than 0.2 W/(K*m) and a tensile strength exceeding 0.133 Newton/square millimeter (mm$^2$), the biodegradable paper layer being shaped and configured to form the interior storage space to a volume between ten metric liters and 100 metric liters; and
b) a substantially water vapor impermeable membrane bonded to at least one side of said biodegradable paper layer; and
c) a closable opening such that the bag has a closed state in which the bag substantially seals the interior storage space from the environment;
the method further comprising the steps of:
packing, at the storage facility, at least some of the ordered amount of chilled goods into the interior storage space of the closeable bag;
closing the closable opening so as to provide a closed packed bag such that the closed opening substantially seals said packed amount of chilled goods in the interior storage space from the environment;
transporting, in a delivery vehicle, the closed packed bag in an air atmosphere environment having an air temperature of equal to or greater than ten degrees Centigrade; and
maintaining, during the transporting, the closed packed bag in a closed packed state so as to minimize or prevent entry of air humidity from the air atmosphere environment into the interior storage space so as to minimize or prevent an occurrence of condensation on said packed amount of chilled goods such that condensation process heating is minimized or prevented in the interior storage space.

14. The method according to claim 13, wherein said substantially water vapor impermeable membrane comprises a biodegradable material.

15. The method according to claim 13, wherein the wall consists of one or more biodegradable materials and the biodegradable paper layer comprises a Kraft paper layer.

16. The method according to claim 13, wherein the bag, when in use for transporting chilled and/or frozen goods, is configured to enable a human to carry the bag such that a center of gravity of the closed packed bag is less than 10 centimeters (cm) from at least one bag wall.

17. The method according to claim 13, wherein said biodegradable paper layer comprises Kraft paper.

18. The method according to claim 13, wherein said wall comprises at least one material selected from a group consisting of:
a non-woven material;
a textile material; and
a film of foamed/porous thermoplastic.

19. The method according to claim 13, wherein said wall material comprises at least one selected from a group consisting of:
a film of thermoplastic; and
a film of foamed and/or porous rubber.

20. The method according to claim 13, wherein said delivery vehicle is configured to transport the closed packed bag in an uncontrolled air atmosphere environment.

* * * * *